United States Patent [19]

Hershey et al.

[11] Patent Number: 5,586,266

[45] Date of Patent: Dec. 17, 1996

[54] SYSTEM AND METHOD FOR ADAPTIVE, ACTIVE MONITORING OF A SERIAL DATA STREAM HAVING A CHARACTERISTIC PATTERN

[75] Inventors: Paul C. Hershey, Manassas, Va.; John G. Waclawsky, Frederick, Md.

[73] Assignee: International Business Machines Corporation, Armonk, N.Y.

[21] Appl. No.: 138,045

[22] Filed: Oct. 15, 1993

[51] Int. Cl.⁶ ........................................ G06F 11/30
[52] U.S. Cl. .................. 395/200.11; 395/183.15; 395/183.18; 395/184.01; 364/550; 364/DIG. 1; 364/242.46; 364/264; 364/264.1; 364/264.2; 370/252
[58] Field of Search .................. 364/550, 579–580; 395/200.11, 183.15, 183.18, 184.01, 800; 370/13

[56] References Cited

U.S. PATENT DOCUMENTS

| | | | |
|---|---|---|---|
| 4,227,245 | 10/1980 | Edbland et al. | 364/468 |
| 4,458,309 | 7/1984 | Wilder, Jr. | 395/183.06 |
| 4,459,656 | 7/1984 | Wilder, Jr. | 395/550 |
| 4,521,849 | 6/1985 | Wilder, Jr. | 395/183.06 |
| 4,779,194 | 10/1988 | Jennings et al. | 395/650 |
| 4,792,753 | 12/1988 | Iwai | 370/13 |
| 4,805,089 | 2/1989 | Lane et al. | 364/188 |
| 4,851,998 | 7/1989 | Hospodor | 364/580 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.5 |
| 4,980,824 | 12/1990 | Tulpule et al. | 395/650 |
| 5,035,302 | 7/1991 | Thangavelu | 187/382 |
| 5,051,886 | 9/1991 | Kawaguchi et al. | 395/600 |
| 5,062,055 | 10/1991 | Chinnaswamy et al. | 364/551.01 |
| 5,067,107 | 11/1991 | Wade | 395/550 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,247,517 | 9/1993 | Ross et al. | 370/85.5 |
| 5,377,196 | 12/1994 | Godlew et al. | 371/20.1 |

FOREIGN PATENT DOCUMENTS 61-53855   3/1986   Japan .

Primary Examiner—Lance Leonard Barry
Attorney, Agent, or Firm—John E. Hoel; John D. Flynn

[57] ABSTRACT

An adaptive, active monitor invention is useful in detecting characteristic data patterns in messages on a high speed data network, such as starting delimiters, tokens, various types of frames, and protocol information. Such serial data streams include serial patterns of binary bits, and can also include serial patterns of multiple state symbols, such as in token ring networks and FDDI networks.

The adaptive, active monitor includes two finite state machines (FSM) which are constructed to detect the occurrence of a characteristic data pattern having multiple component bit patterns. A first FSM is the predecessor FSM, and it is configured to detect the first occurring component pattern. A second FSM is called the successor FSM, and it is configured to detect the second occurring component pattern. The first FSM will send a starting signal to the second FSM, when the first FSM has successfully detected the first component pattern. The starting signal initializes the second FSM, to take over the analysis of the portion of the bit stream which follows the first component pattern. If the second FSM successfully detects the second component pattern, it then outputs a pattern alarm signal, indicating the successful detection of the entire characteristic data pattern.

24 Claims, 75 Drawing Sheets

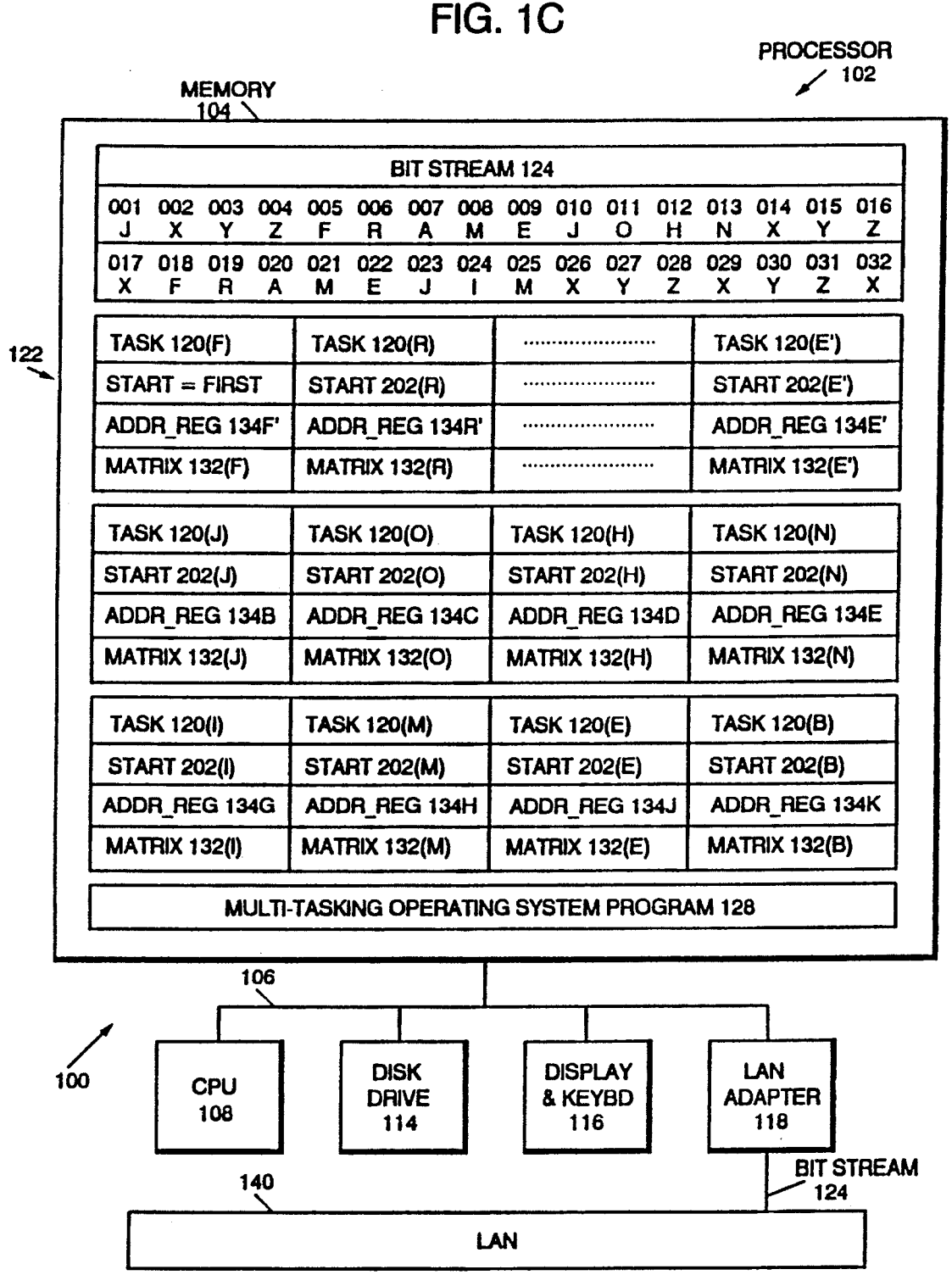

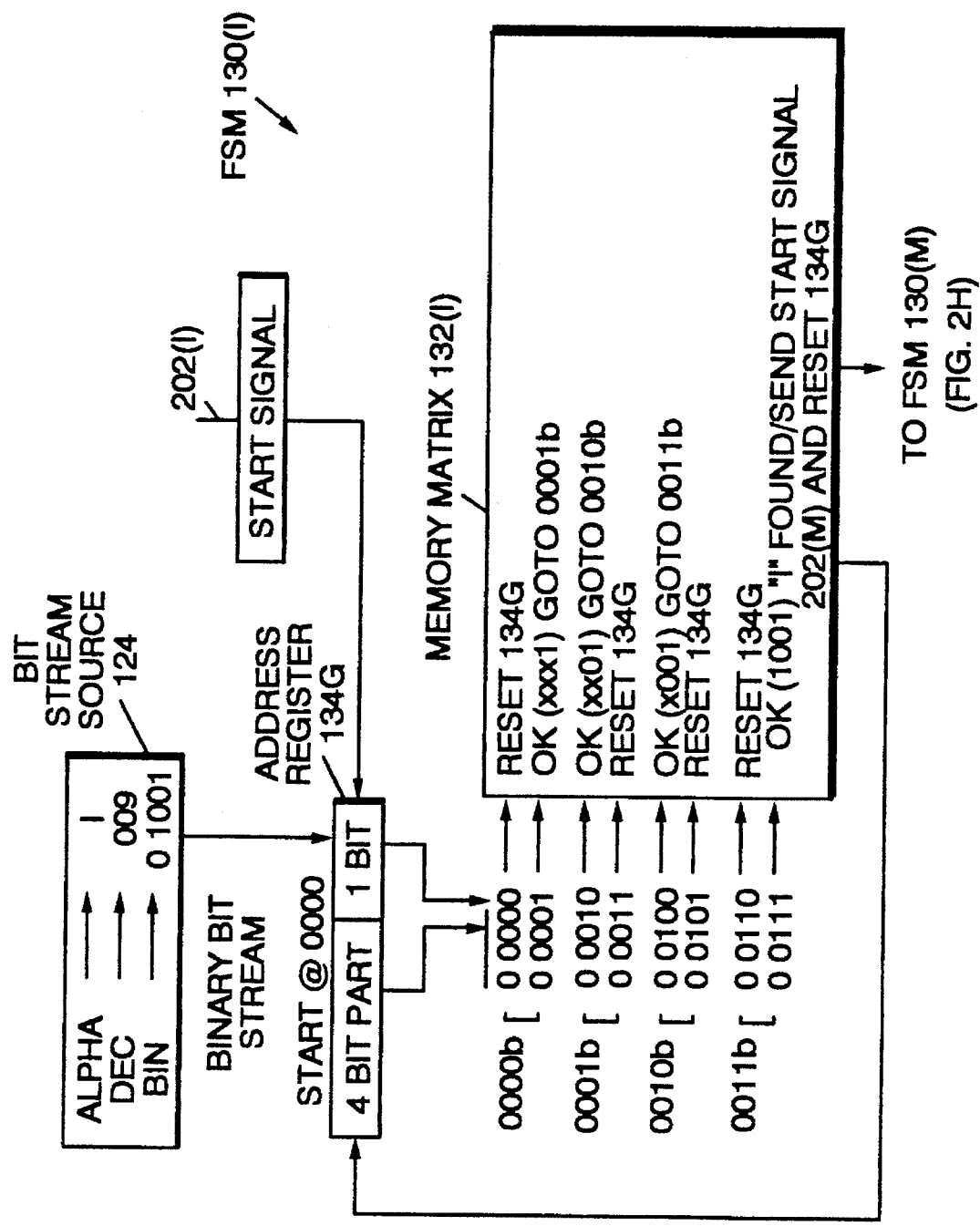

MANCHESTER CODING TABLE 150'

| PRESENT STATE | NEXT STATE {J,K,0,1} | | | | OUTPUT (BINARY) |
|---|---|---|---|---|---|
| | J | K | 0 | 1 | |
| S0 | S0 | S1 | S3 | S2 | 00 |
| S1 | S1 | S0 | S2 | S3 | 11 |
| S2 | S1 | S0 | S2 | S3 | 01 |
| S3 | S3 | S1 | S3 | S2 | 10 |

124 MANCHESTER ENCODED DATA STREAM (J,K,0,1)

124' BINARY BIT PAIR DATA STREAM {b}, {b}

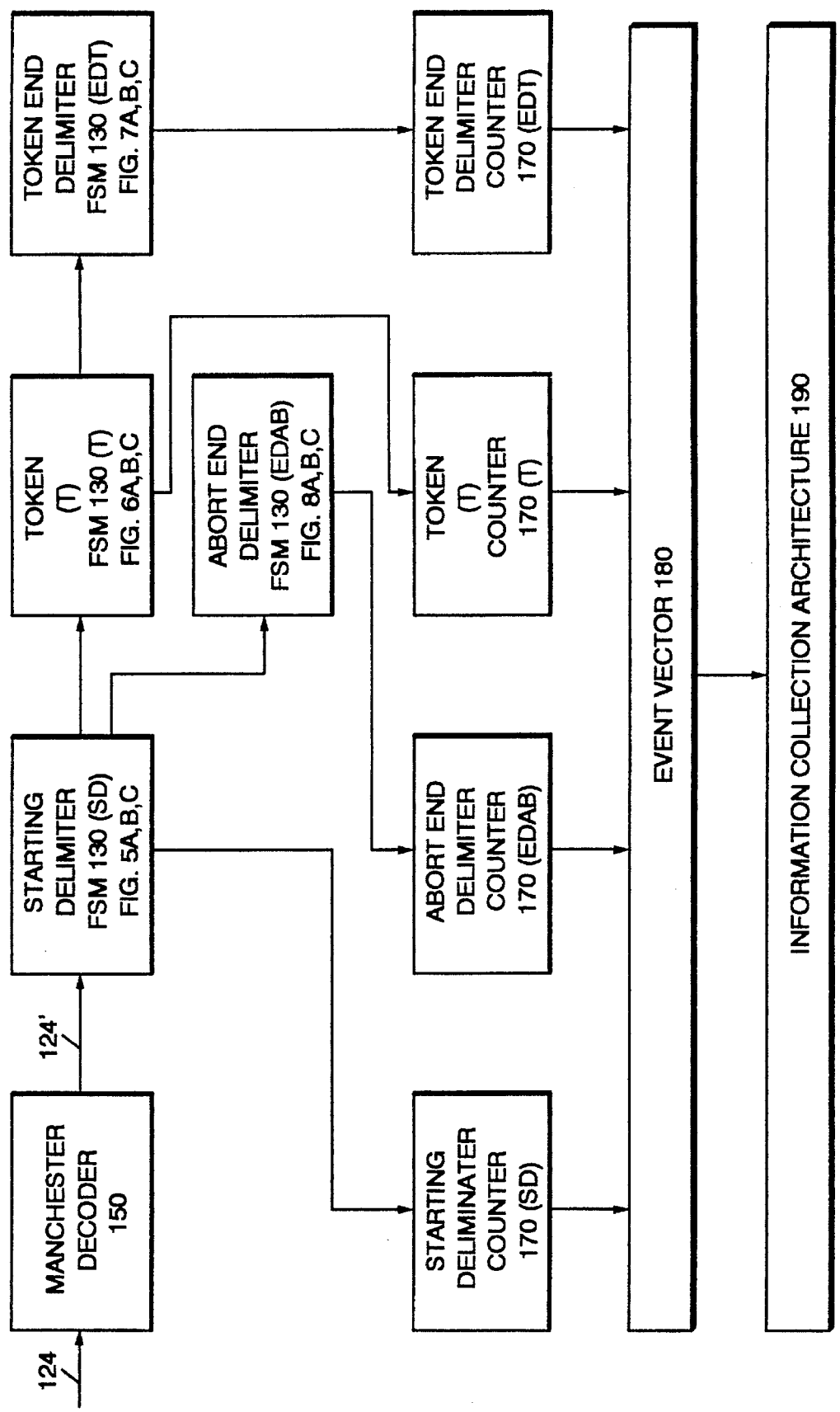

FIG. 5CA

FSM 130 (SD)'

STARTING DELIMITER (SD)
BINARY BIT-PAIRS REPRESENTING
NON-BINARY INPUT SYMBOL STRING {J,K,0,1}
WHERE {J,K,0,1} - - → (BINARY FROM MANCHESTER CODE OF FIG. 4A,B,C)

(LOOKING FOR "JK0JK000" =
"11 00 10 00 11 01 01 01")

|  |  | SERIAL BINARY BIT PAIRS 124' | | | | | | | | MEMORY MATRIX 132 (SD)' |
|---|---|---|---|---|---|---|---|---|---|---|
| GLOBAL RESET 204 | FIRST FSM 206 | ADDRESS REGISTER 134 (SD)' | | | | | | | |  |
| 01 01 01 01 01 01 bb | | 01 | 01 | 01 | 01 | 01 | 01 | 01 | 11 | GOTO 01 01 01 01 01 01 11 b |
|  |  | 01 | 01 | 01 | 01 | 01 | 01 | 01 | 00 | RESET 134 (SD)' |
|  |  | 01 | 01 | 01 | 01 | 01 | 01 | 01 | 10 | RESET 134 (SD)' |
|  |  | 01 | 01 | 01 | 01 | 01 | 01 | 01 | 01 | RESET 134 (SD)' |
| 01 01 01 01 01 11 bb | | 01 | 01 | 01 | 01 | 01 | 01 | 11 | 11 | RESET 134 (SD)' |
|  |  | 01 | 01 | 01 | 01 | 01 | 01 | 11 | 00 | GOTO 01 01 01 01 01 11 00 b |
|  |  | 01 | 01 | 01 | 01 | 01 | 01 | 11 | 10 | RESET 134 (SD)' |
|  |  | 01 | 01 | 01 | 01 | 01 | 01 | 11 | 01 | RESET 134 (SD)' |
| 01 01 01 01 01 11 00 bb | | 01 | 01 | 01 | 01 | 01 | 11 | 00 | 11 | RESET 134 (SD)' |
|  |  | 01 | 01 | 01 | 01 | 01 | 11 | 00 | 00 | RESET 134 (SD)' |
|  |  | 01 | 01 | 01 | 01 | 01 | 11 | 00 | 10 | GOTO 01 01 01 01 01 11 00 10 b |
|  |  | 01 | 01 | 01 | 01 | 01 | 11 | 00 | 01 | RESET 134 (SD)' |
| 01 01 01 01 11 00 10 bb | | 01 | 01 | 01 | 01 | 11 | 00 | 10 | 00 | GOTO 01 01 01 01 11 00 10 00 b |
|  |  | 01 | 01 | 01 | 01 | 11 | 00 | 10 | 11 | RESET 134 (SD)' |
|  |  | 01 | 01 | 01 | 01 | 11 | 00 | 10 | 01 | RESET 134 (SD)' |
|  |  | 01 | 01 | 01 | 01 | 11 | 00 | 10 | 10 | RESET 134 (SD)' |

FIG. 5CB

```
01 01 01 11 00 10 00 bb | 01 01 01 11 00 10 00 00 | RESET 134 (SD)'
                        | 01 01 01 11 00 10 00 11 | GOTO 01 01 11 00 10 00 11 b
                        | 01 01 01 11 00 10 00 10 | RESET 134 (SD)'
                        | 01 01 01 11 00 10 00 01 | RESET 134 (SD)'

01 01 11 00 10 00 11 bb | 01 01 11 00 10 00 11 11 | RESET 134 (SD)'
                        | 01 01 11 00 10 00 11 00 | RESET 134 (SD)'
                        | 01 01 11 00 10 00 11 01 | GOTO 01 11 00 10 00 11 01 b
                        | 01 01 11 00 10 00 11 10 | RESET 134 (SD)'

01 11 00 10 00 11 01 bb | 01 11 00 10 00 11 01 11 | RESET 134 (SD)'
                        | 01 11 00 10 00 11 01 00 | RESET 134 (SD)'
                        | 01 11 00 10 00 11 01 01 | GOTO 11 00 10 00 11 01 01 b
                        | 01 11 00 10 00 11 01 10 | RESET 134 (SD)'

11 00 10 00 11 01 01 bb | 11 00 10 00 11 01 01 11 | RESET 134 (SD)'
                        | 11 00 10 00 11 01 01 00 | RESET 134 (SD)'
                        | 11 00 10 00 11 01 01 01 | SEND START SIGNALS TO
                        |                         | FSM 130 (T)' & FSM 130 (EDAB)'
                        | 11 00 10 00 11 01 01 10 | RESET 134 (SD)'
```

FIG. 5C

| FIG. 5CA |
|----------|
| FIG. 5CB |

TOKEN (T)

(NOTE: IN ADDITION TO PROVIDING THE TOKEN PATTERN, THE INPUT SEQUENCE ALSO PROVIDES THE NPR4 PATTERN AND THE NRES PATTERN)

NON-BINARY INPUT SYMBOL STRING {J,K,0,1}    FSM 130 (T)

ASSUME THAT THE T SYMBOL SEQUENCE IS "1000000".

| | | |
|---|---|---|
| | 0 0 0 0 1 0 0 1 | RESET 134 (T) |
| 0 0 0 1 0 0 0 b | 0 0 0 1 0 0 0 J | RESET 134 (T) |
| | 0 0 0 1 0 0 0 K | RESET 134 (T) |
| | 0 0 0 1 0 0 0 0 | GOTO 0 0 1 0 0 0 0 b |
| | 0 0 0 1 0 0 0 1 | RESET 134 (T) |
| 0 0 1 0 0 0 0 b | 0 0 1 0 0 0 0 J | RESET 134 (T) |
| | 0 0 1 0 0 0 0 K | RESET 134 (T) |
| | 0 0 1 0 0 0 0 0 | GOTO 0 1 0 0 0 0 0 b |
| | 0 0 1 0 0 0 0 1 | RESET 134 (T) |
| 0 1 0 0 0 0 0 b | 0 1 0 0 0 0 0 J | RESET 134 (T) |
| | 0 1 0 0 0 0 0 K | RESET 134 (T) |
| | 0 1 0 0 0 0 0 0 | GOTO 1 0 0 0 0 0 0 b |
| | 0 1 0 0 0 0 0 1 | RESET 134 (T) |
| 1 0 0 0 0 0 0 b | 1 0 0 0 0 0 0 J | RESET 134 (T) |
| | 1 0 0 0 0 0 0 K | RESET 134 (T) |
| | 1 0 0 0 0 0 0 0 | SEND START SIGNALS TO FSM 130 (EDT)' |
| | 1 0 0 0 0 0 0 1 | RESET 134 (T) |

FIG. 6CA

TOKEN (T)
ASSUME THAT THE SD BINARY BIT SEQUENCE IS "11 00 10 00 11 01 01 01"
ASSUME THAT THE TOKEN BINARY BIT SEQUENCE IS "10 01 01 01 01 01 01 01"
BINARY BIT-PAIRS REPRESENTING                                    FSM 130 (T)'
NON-BINARY INPUT SYMBOL STRING {J,K,0,1}

WHERE {J,K,0,1} ---→ (BINARY FROM MANCHESTER CODE OF FIG. 4A,B,C)

```
                                                          (LOOKING FOR "10000000" =
                                    SERIAL                 "10 01 01 01 01 01 01 01")
                      ADDRESS       BINARY
                      REGISTER      BIT PAIRS
                      134 (T)'      124'
                                    ↓    ↓
START                 |01 01 01 01 01 01 01 11|    RESET 134 (T)'
SIGNAL                |01 01 01 01 01 01 01 00|    RESET 134 (T)'
FROM     01 01 01 01 01 01 bb  |01 01 01 01 01 01 01 01|    GOTO 01 01 01 01 01 01 11 01 b
FSM 130 (SD)                   |01 01 01 01 01 01 01 10|    RESET 134 (T)'
202 (T)

|01 01 01 01 01 11 11|    RESET 134 (T)'
                               |01 01 01 01 01 11 00|    RESET 134 (T)'
         01 01 01 01 11 01 bb  |01 01 01 01 01 11 11 01|   GOTO 01 01 01 01 01 11 01 01 b
                               |01 01 01 01 01 11 10|    RESET 134 (T)'

|01 01 01 01 11 01 11|    RESET 134 (T)'
                               |01 01 01 01 11 01 00|    RESET 134 (T)'
         01 01 01 11 01 01 bb  |01 01 01 01 11 01 01|    GOTO 01 01 01 11 01 01 01 b
                               |01 01 01 01 11 01 10|    RESET 134 (T)'

|01 01 01 11 01 01 11|    RESET 134 (T)'
                               |01 01 01 11 01 01 00|    RESET 134 (T)'
         01 01 11 01 01 01 bb  |01 01 01 11 01 01 01|    GOTO 01 11 01 01 01 01 b
                               |01 01 01 11 01 01 10|    RESET 134 (T)'
                                    MEMORY MATRIX 132 (T)'
```

```
01 01 01 11 01 01 01 bb | 01 01 01 01 01 01 01 11 |   RESET 134 (T)'
                        | 01 01 01 01 01 01 01 00 |   RESET 134 (T)'
                        | 01 01 01 01 01 01 01 01 |   GOTO 01 01 11 01 01 01 01 b
                        | 01 01 01 01 01 01 01 10 |   RESET 134 (T)'

01 01 11 01 01 01 01 bb | 01 01 01 01 11 01 01 11 |   RESET 134 (T)'
                        | 01 01 01 01 11 01 01 00 |   RESET 134 (T)'
                        | 01 01 01 01 11 01 01 01 |   GOTO 01 11 01 01 01 01 01 b
                        | 01 01 01 01 11 01 01 10 |   RESET 134 (T)'

01 11 01 01 01 01 01 bb | 01 01 11 01 01 01 01 11 |   RESET 134 (T)'
                        | 01 01 11 01 01 01 01 00 |   RESET 134 (T)'
                        | 01 01 11 01 01 01 01 01 |   GOTO 11 01 01 01 01 01 01 b
                        | 01 01 11 01 01 01 01 10 |   RESET 134 (T)'

11 01 01 01 01 01 01 bb | 11 01 01 01 01 01 01 11 |   RESET 134 (T)'
                        | 11 01 01 01 01 01 01 00 |   RESET 134 (T)'
                        | 11 01 01 01 01 01 01 01 |   SEND START SIGNALS TO
                        |                         |   FSM 130 (EDT)
                        | 11 01 01 01 01 01 01 10 |   RESET 134 (T)'
```

| FIG. 6CA |
|----------|
| FIG. 6CB |

|  |  |  |
|---|---|---|
|  | 0 0 0 0 J K 1 1 | RESET 134 (EDT) |
| 0 0 0 J K 1 J b | 0 0 0 J K 1 J J | RESET 134 (EDT) |
|  | 0 0 0 J K 1 J K | GOTO 0 0 J K 1 J K b |
|  | 0 0 0 J K 1 J 0 | RESET 134 (EDT) |
|  | 0 0 0 J K 1 J 1 | RESET 134 (EDT) |
| 0 0 J K 1 J K b | 0 0 J K 1 J K J | RESET 134 (EDT) |
|  | 0 0 J K 1 J K K | RESET 134 (EDT) |
|  | 0 0 J K 1 J K 0 | RESET 134 (EDT) |
|  | 0 0 J K 1 J K 1 | GOTO 0 J K 1 J K 1 b |
| 0 J K 1 J K 1 b | 0 J K 1 J K 1 J | RESET 134 (EDT) |
|  | 0 J K 1 J K 1 K | RESET 134 (EDT) |
|  | 0 J K 1 J K 1 0 | GOTO J K 1 J K 1 0 b |
|  | 0 J K 1 J K 1 1 | GOTO J K 1 J K 1 1 b |
| J K 1 J K 1 0 b | J K 1 J K 1 0 J | RESET 134 (EDT) |
|  | J K 1 J K 1 0 K | RESET 134 (EDT) |
|  | J K 1 J K 1 0 0 | SEND START SIGNALS TO FSM 130 (SD) |
|  | J K 1 J K 0 0 1 | RESET 134 (EDT) |

| | | | | | | | | |
|---|---|---|---|---|---|---|---|---|
| 01 01 01 11 00 01 11 bb | 01 | 01 | 01 | 11 | 00 | 01 | 11 | RESET 134 (EDT)' |
| | 01 | 01 | 01 | 11 | 00 | 01 | 11 | GOTO 01 01 11 00 01 11 00 b |
| | 01 | 01 | 01 | 11 | 00 | 01 | 11 | RESET 134 (EDT)' |
| | 01 | 01 | 01 | 11 | 00 | 01 | 10 | RESET 134 (EDT)' |
| 01 01 11 00 01 11 00 bb | 01 | 01 | 11 | 00 | 01 | 11 | 00 | RESET 134 (EDT)' |
| | 01 | 01 | 11 | 00 | 01 | 11 | 00 | RESET 134 (EDT)' |
| | 01 | 01 | 11 | 00 | 01 | 11 | 00 | RESET 134 (EDT)' |
| | 01 | 01 | 11 | 00 | 01 | 11 | 00 | GOTO 01 11 00 01 11 00 01 b |
| 01 11 00 01 11 00 01 bb | 01 | 11 | 00 | 01 | 11 | 00 | 01 | RESET 134 (EDT)' |
| | 01 | 11 | 00 | 01 | 11 | 00 | 01 | RESET 134 (EDT)' |
| | 01 | 11 | 00 | 01 | 11 | 00 | 01 | GOTO 11 00 01 11 00 01 01 b |
| | 01 | 11 | 00 | 01 | 11 | 00 | 10 | GOTO 11 00 01 11 00 01 10 b |
| 11 00 01 11 00 01 01 bb | 11 | 00 | 01 | 11 | 00 | 01 | 01 | RESET 134 (EDT)' |
| | 11 | 00 | 01 | 11 | 00 | 01 | 01 | RESET 134 (EDT)' |
| | 11 | 00 | 01 | 11 | 00 | 01 | 01 | SEND START SIGNALS TO FSM 130 (SD)' |
| | 11 | 00 | 01 | 11 | 00 | 01 | 10 | RESET 134 (EDT)' |

FIG. 8BA

ENDING DELIMITER ABORT (EDAB)

NON-BINARY INPUT SYMBOL STRING {J,K,0,1}    FSM 130 (EDAB)

ASSUME THAT THE EDAB SYMBOL SEQUENCE IS "JK1JK100"

| START SIGNAL FROM FSM 130 (SD) 202 (EDAB) | ADDRESS REGISTER 134 (EDAB) | SERIAL DATA STREAM ↓ 124 | (LOOKING FOR "JK1JK100") MEMORY MATRIX 132 (EDAB) |
|---|---|---|---|
| 0 0 0 0 0 0 0 b | 0 0 0 0 0 0 0 J | | GOTO 0 0 0 0 0 0 J b |
| | 0 0 0 0 0 0 0 K | | RESET 134 (EDAB) |
| | 0 0 0 0 0 0 0 0 | | RESET 134 (EDAB) |
| | 0 0 0 0 0 0 0 1 | | RESET 134 (EDAB) |
| 0 0 0 0 0 0 J b | 0 0 0 0 0 0 J J | | RESET 134 (EDAB) |
| | 0 0 0 0 0 0 J K | | GOTO 0 0 0 0 0 J K b |
| | 0 0 0 0 0 0 J 0 | | RESET 134 (EDAB) |
| | 0 0 0 0 0 0 J 1 | | RESET 134 (EDAB) |
| 0 0 0 0 0 J K b | 0 0 0 0 0 J K J | | RESET 134 (EDAB) |
| | 0 0 0 0 0 J K K | | RESET 134 (EDAB) |
| | 0 0 0 0 0 J K 0 | | RESET 134 (EDAB) |
| | 0 0 0 0 0 J K 1 | | GOTO 0 0 0 0 J K 1 b |
| 0 0 0 0 J K 1 b | 0 0 0 0 J K 1 J | | GOTO 0 0 0 J K 1 J b |
| | 0 0 0 0 J K 1 K | | RESET 134 (EDAB) |
| | 0 0 0 0 J K 1 0 | | RESET 134 (EDAB) |

|  |  |  |
|---|---|---|
|  | 0 0 0 0 J K 1 1 | RESET 134 (EDAB) |
| 0 0 0 J K 1 J b | 0 0 0 J K 1 J J | RESET 134 (EDAB) |
|  | 0 0 0 J K 1 J K | GOTO 0 0 J K 1 J K b |
|  | 0 0 0 J K 1 J 0 | RESET 134 (EDAB) |
|  | 0 0 0 J K 1 J 1 | RESET 134 (EDAB) |
| 0 0 J K 1 J K b | 0 0 J K 1 J K J | RESET 134 (EDAB) |
|  | 0 0 J K 1 J K K | RESET 134 (EDAB) |
|  | 0 0 J K 1 J K 0 | RESET 134 (EDAB) |
|  | 0 0 J K 1 J K 1 | GOTO 0 J K 1 J K 1 b |
| 0 J K 1 J K 1 b | 0 J K 1 J K 1 J | RESET 134 (EDAB) |
|  | 0 J K 1 J K 1 K | RESET 134 (EDAB) |
|  | 0 J K 1 J K 1 0 | GOTO J K 1 J K 1 0 b |
|  | 0 J K 1 J K 1 1 | RESET 134 (EDAB) |
| J K 1 J K 1 0 b | J K 1 J K 1 0 J | RESET 134 (EDAB) |
|  | J K 1 J K 1 0 K | RESET 134 (EDAB) |
|  | J K 1 J K 1 0 0 | SEND START SIGNAL TO FSM 130 (SD) |
|  | J K 1 J K 0 0 1 | RESET 134 (EDAB) |

| | | |
|---|---|---|
| 01 01 01 11 00 01 11 bb | 01 01 01 01 01 11 11 | RESET 134 (EDAB)' |
| | 01 01 01 01 11 11 00 | GOTO 01 01 01 11 00 01 11 00 b |
| | 01 01 01 01 11 11 01 | RESET 134 (EDAB)' |
| | 01 01 01 01 11 11 10 | RESET 134 (EDAB)' |
| 01 01 11 00 01 11 00 bb | 01 01 01 11 00 11 00 11 | RESET 134 (EDAB)' |
| | 01 01 01 11 00 11 00 00 | RESET 134 (EDAB)' |
| | 01 01 01 11 00 11 00 10 | RESET 134 (EDAB)' |
| | 01 01 01 11 00 11 00 01 | GOTO 01 11 00 01 11 00 01 b |
| 01 11 00 01 11 00 01 bb | 01 11 00 01 11 00 01 11 | RESET 134 (EDAB)' |
| | 01 11 00 01 11 00 01 00 | RESET 134 (EDAB)' |
| | 01 11 00 01 11 00 01 01 | RESET 134 (EDAB)' |
| | 01 11 00 01 11 00 01 10 | GOTO 11 00 01 11 00 01 01 b |
| 11 00 01 11 00 01 01 bb | 11 00 01 11 00 01 01 11 | RESET 134 (EDAB)' |
| | 11 00 01 11 00 01 01 00 | RESET 134 (EDAB)' |
| | 11 00 01 11 00 01 01 01 | SEND START SIGNALS TO FSM 130 (SD) |
| | 11 00 01 11 00 01 01 10 | RESET 134 (EDAB)' |

FIG. 8CB

| FIG. 8CA |
|---|
| FIG. 8CB |

FIG. 8C

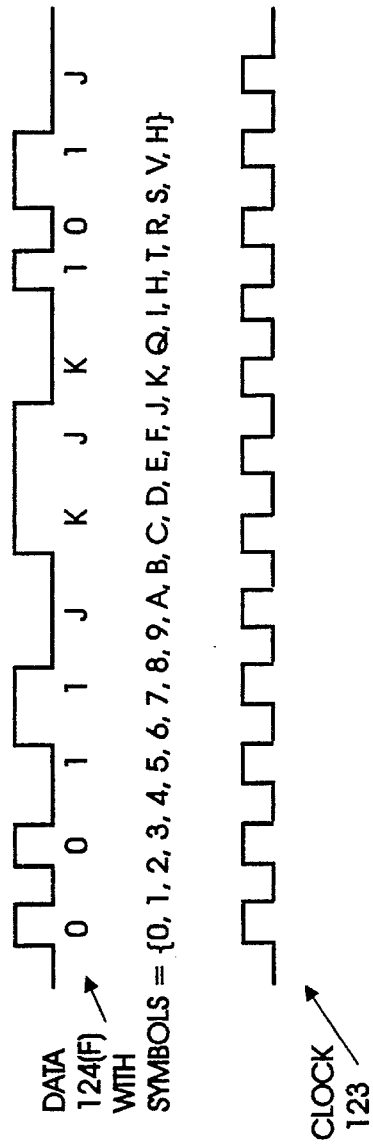
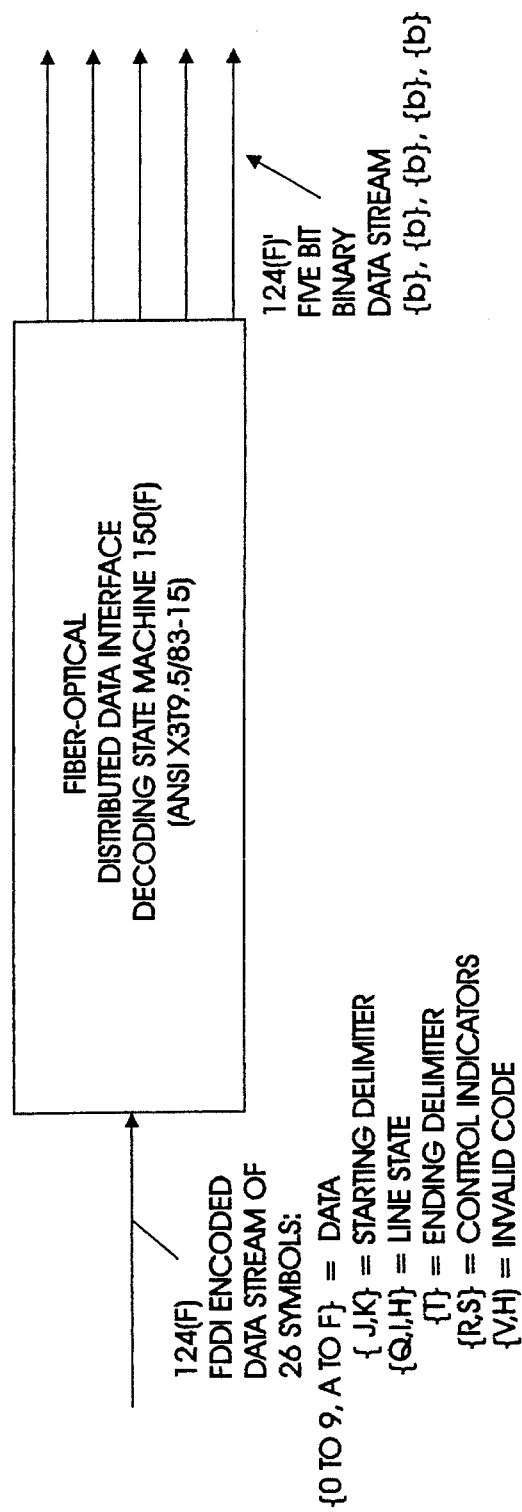

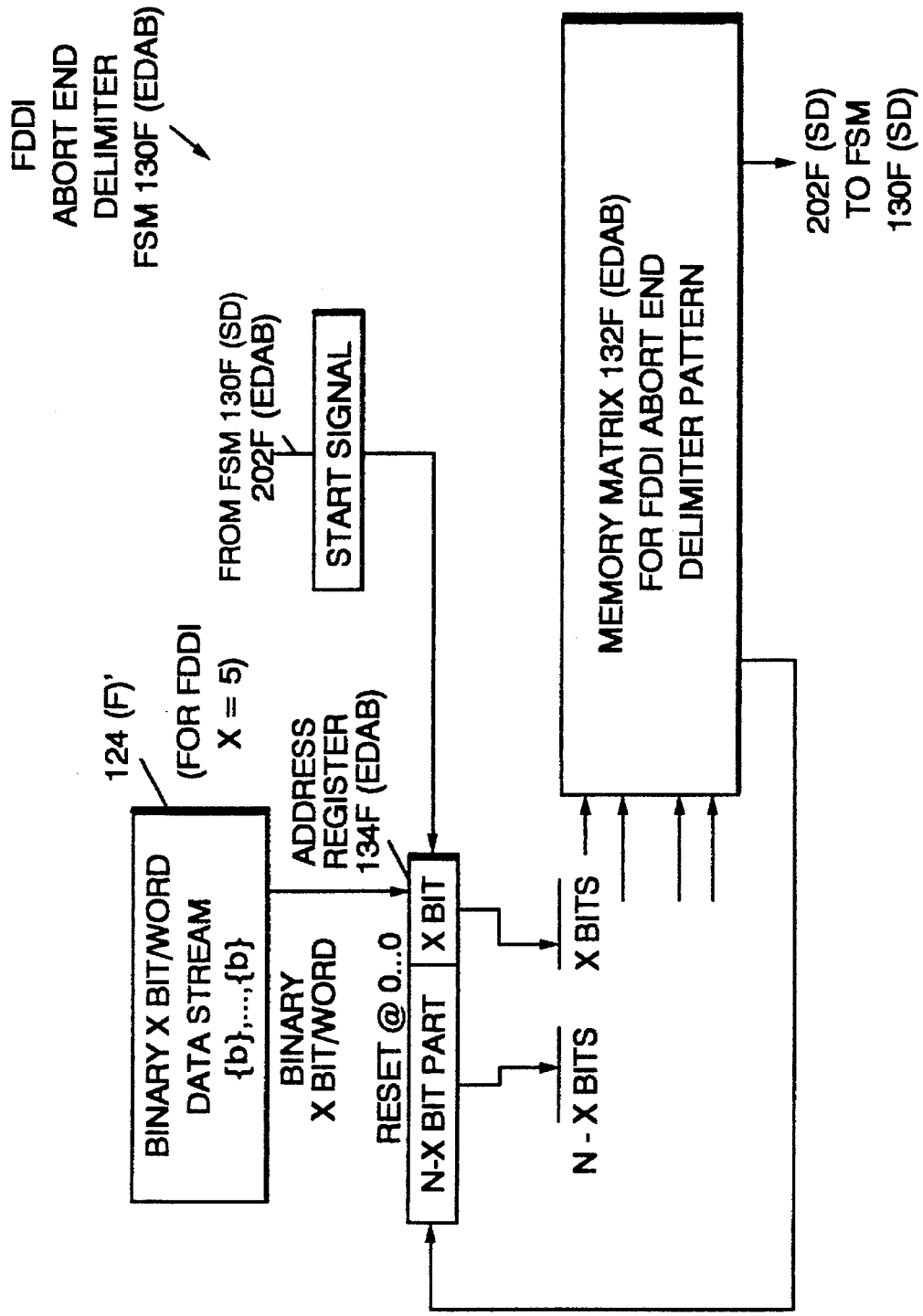

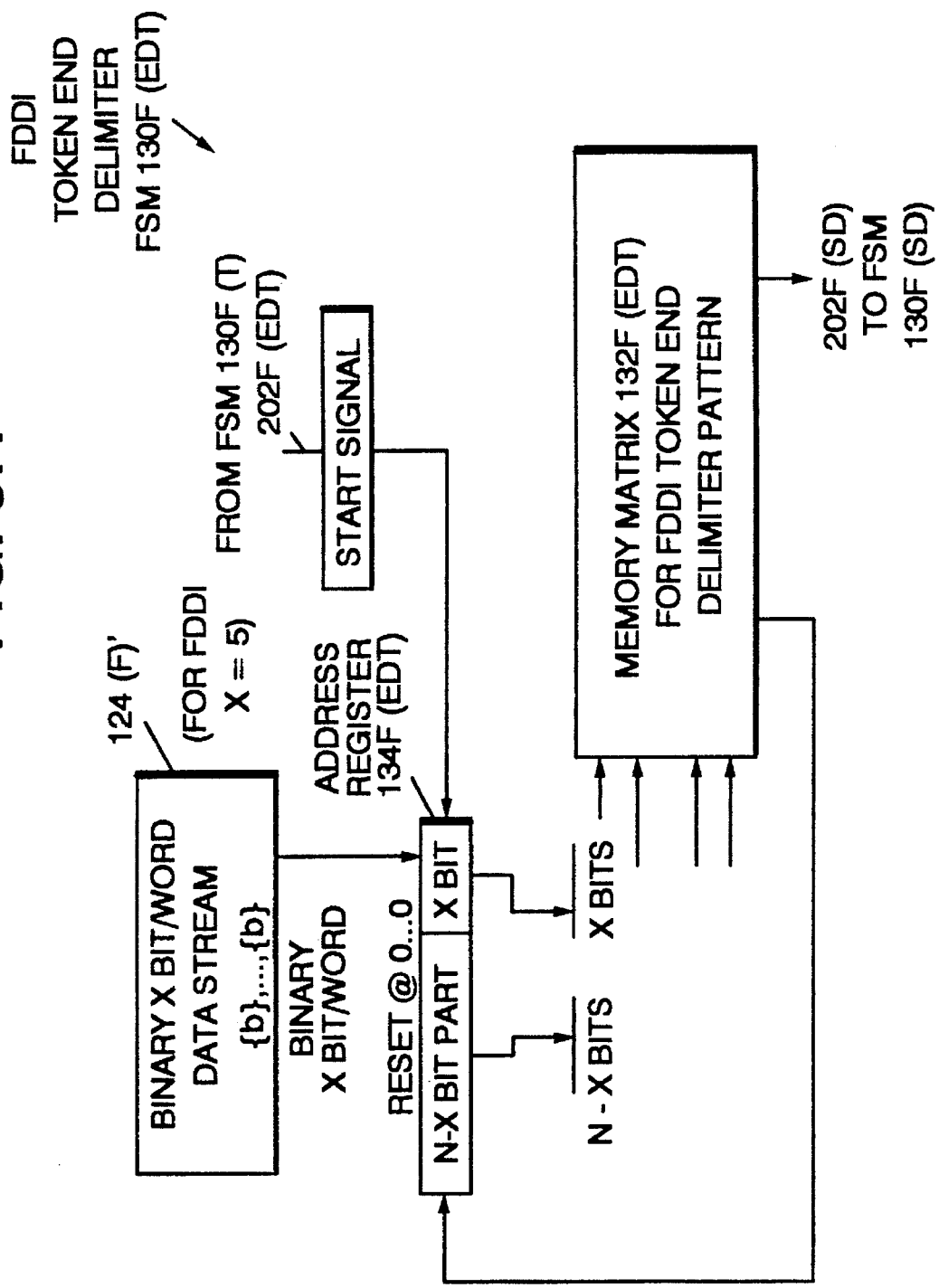

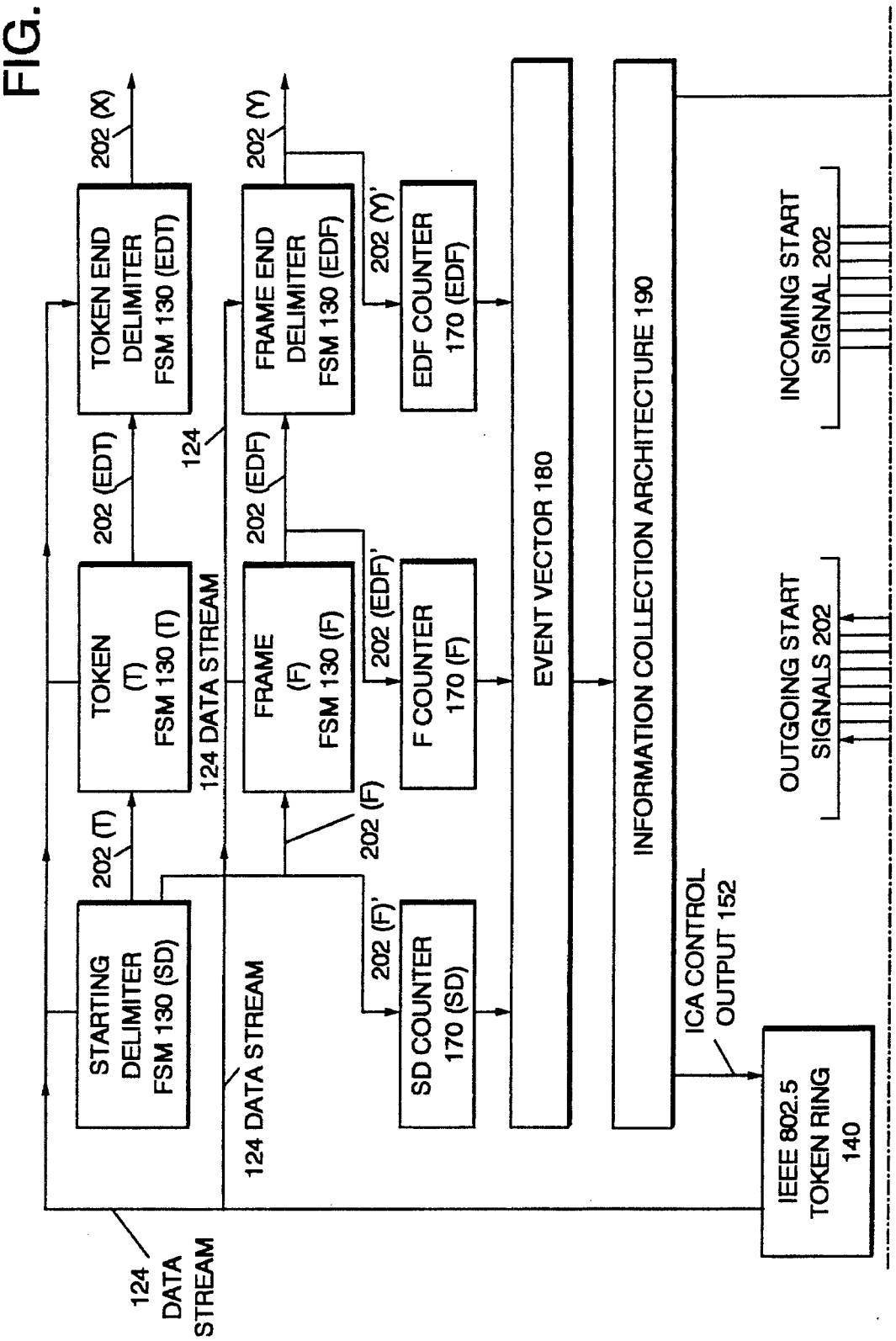

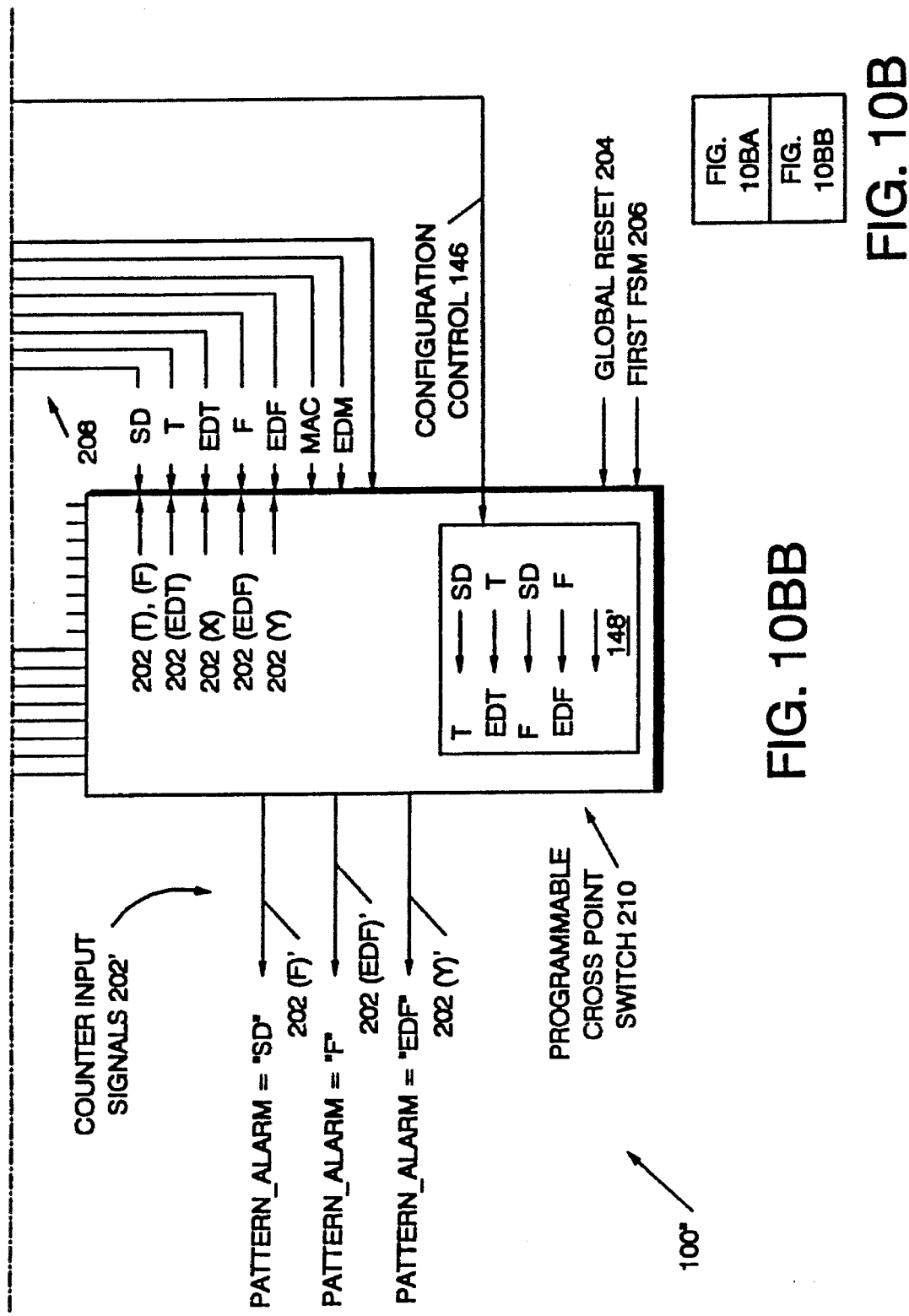

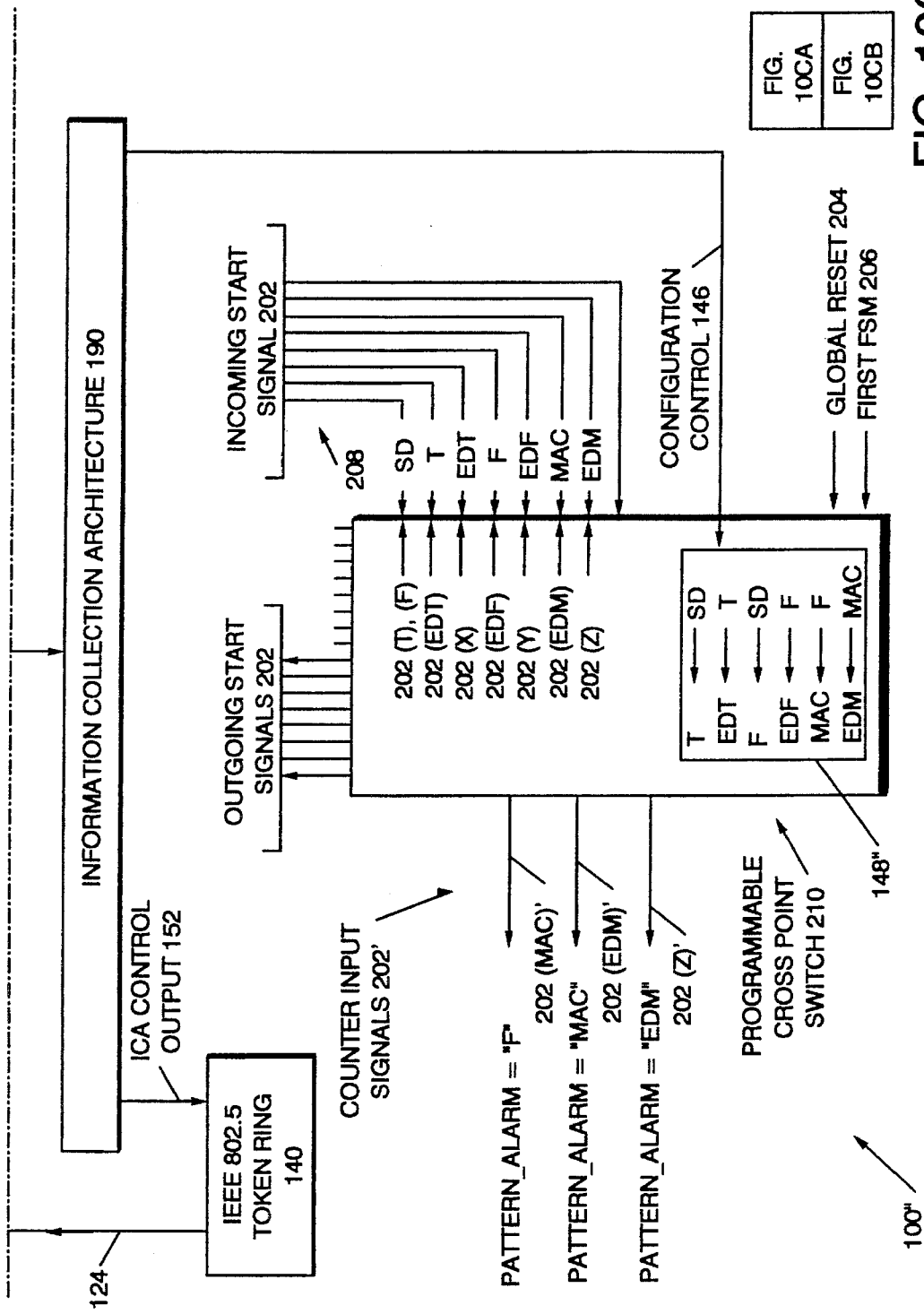

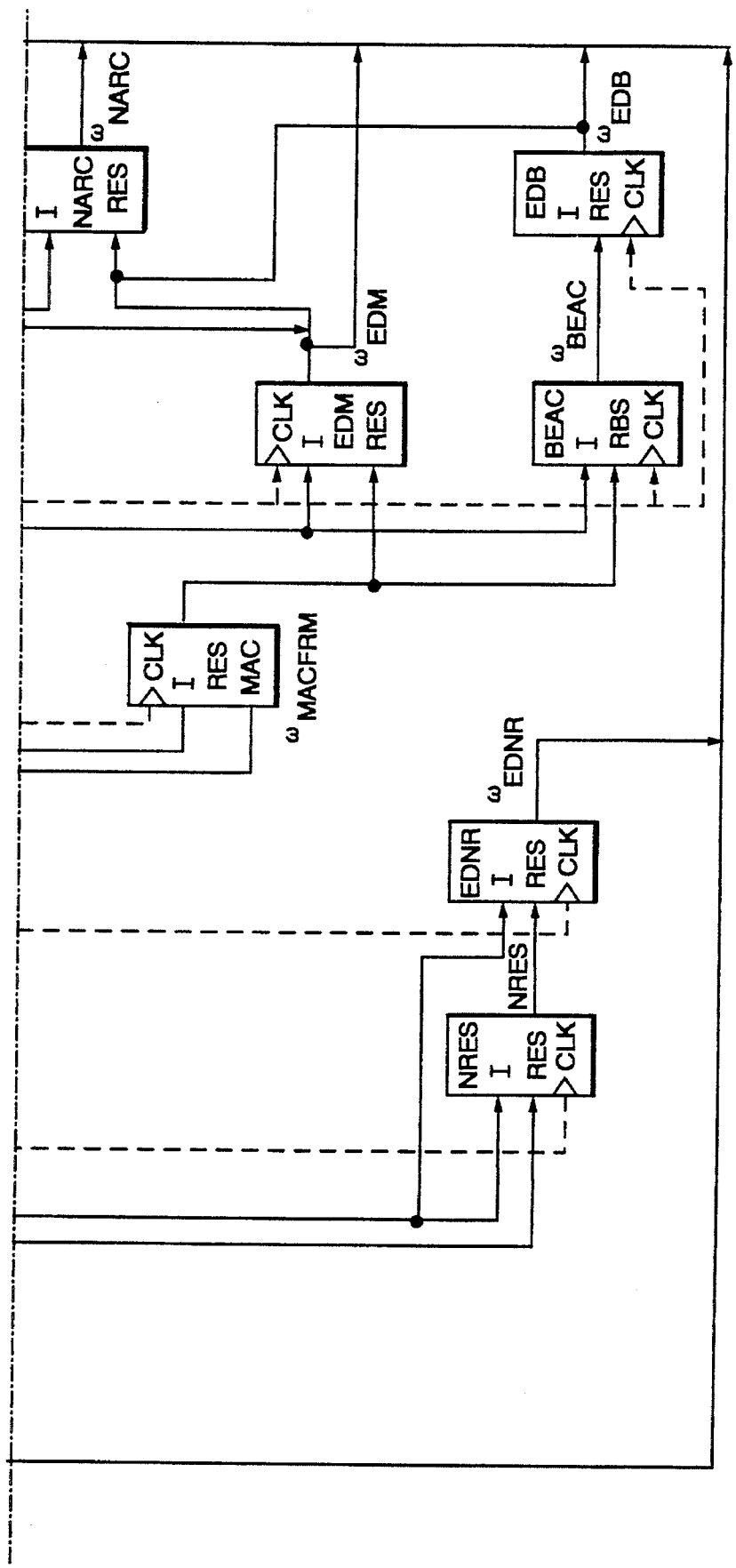

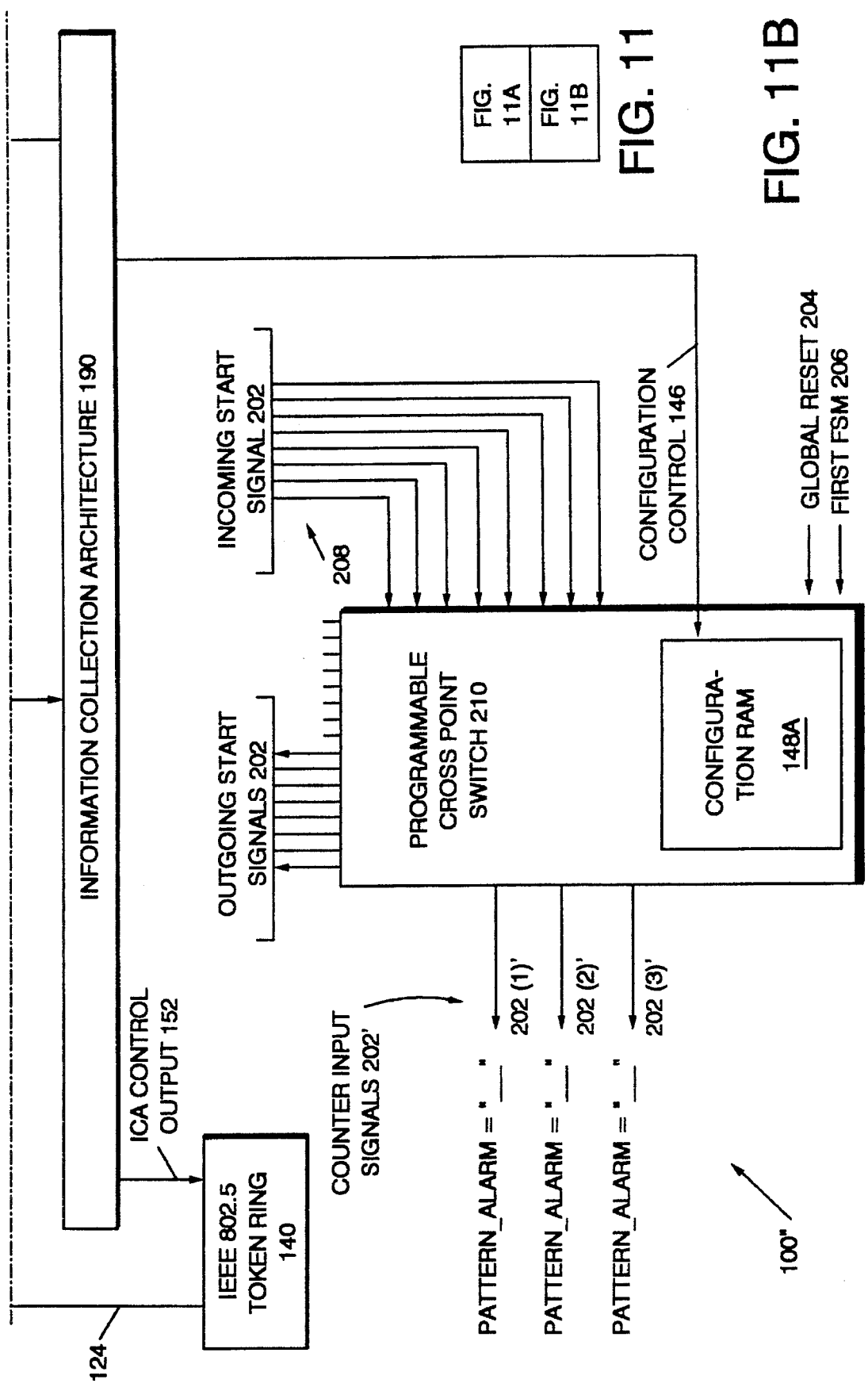

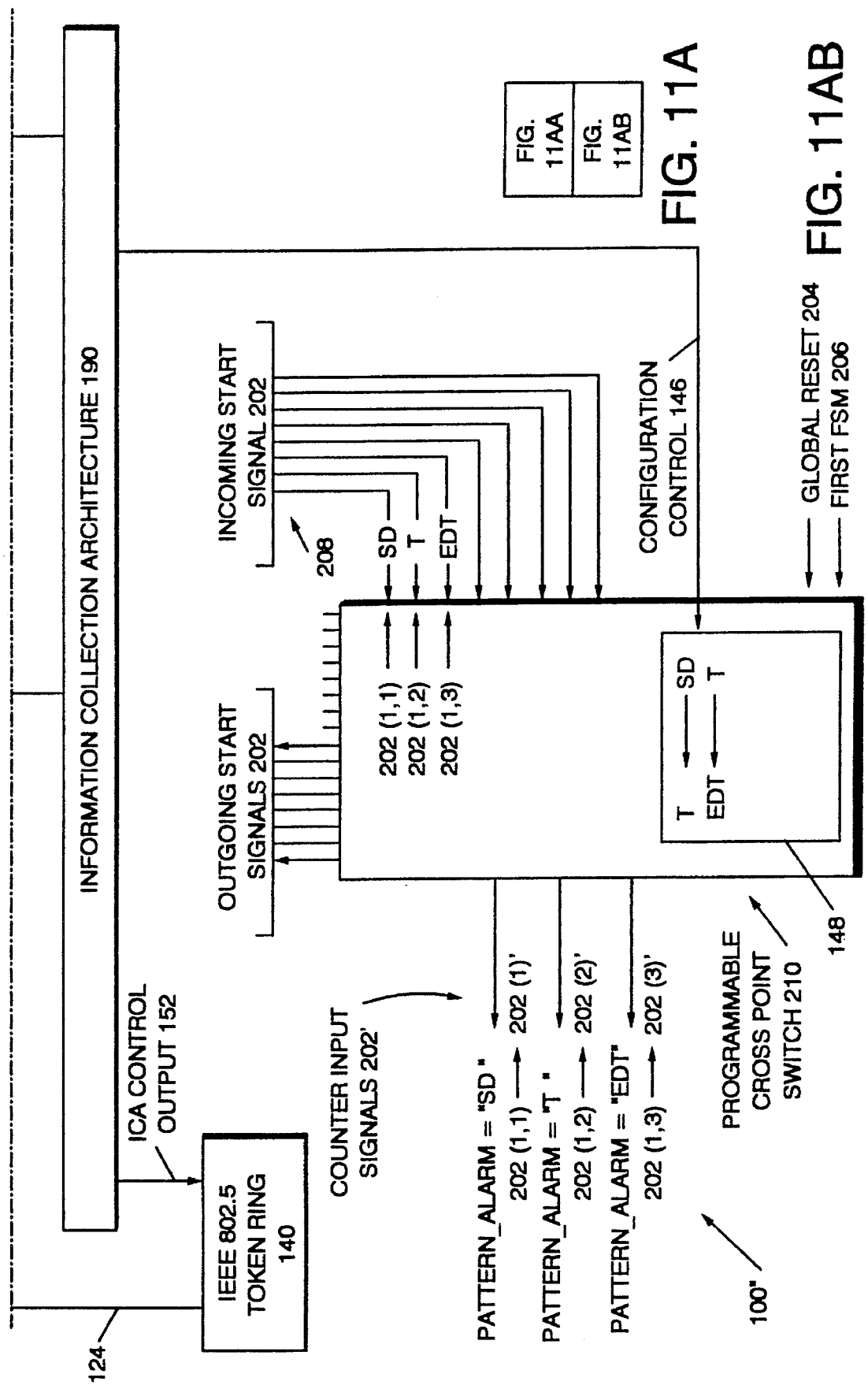

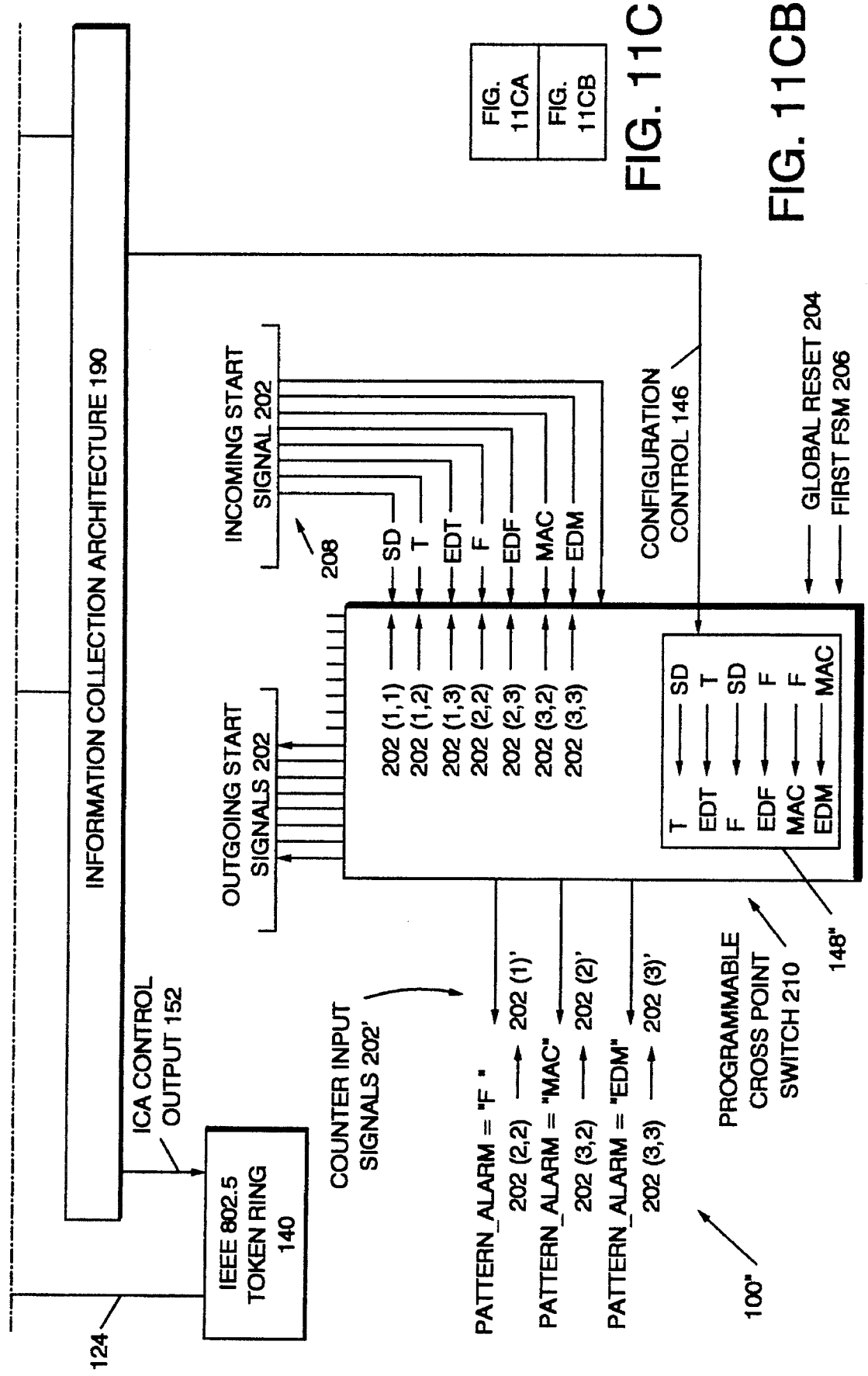

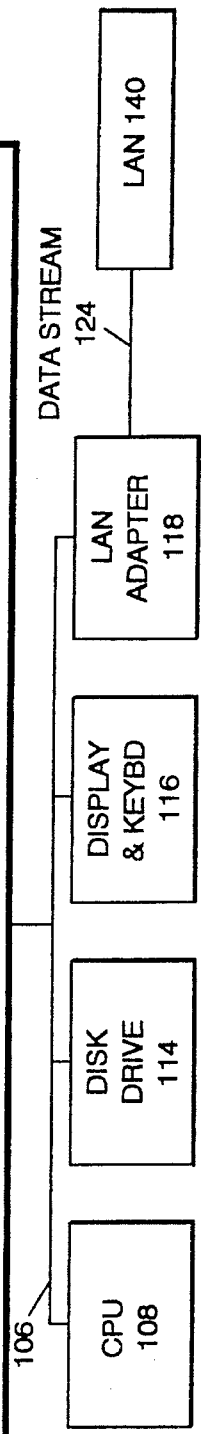
FIG. 12A3
FIG. 12A1
| FIG. 12A2 | FIG. 12A3 |
| TASK 120 (3,1) | TASK 120 (3,2) | TASK 120 (3,3) | ⋯ |
|---|---|---|---|
| START 202 (_,_) | START 202 (_,_) | START 202 (_,_) | ⋯ |
| ADDR 134 (3,1) | ADDR 134 (3,2) | ADDR 134 (3,3) | ⋯ |
| FSM MATRIX 132 (3,1) | FSM MATRIX 132 (3,2) | FSM MATRIX 132 (3,3) | ⋯ |
| INPUT 202 (1)' | INPUT 202 (2)' | INPUT 202 (3)' | ⋯ |
|---|---|---|---|
| COUNTER 170 (1) | COUNTER 170 (2) | COUNTER 170 (2) | |
EVENT VECTOR 180
INFORMATION COLLECTION ARCHITECTURE 190
MULTI-TASKING OPERATING SYSTEM PROGRAM 128

FIG. 12A2

| BIT STREAM 124 | CONFIGURATION DATA 142 | CONFIG. CTL. DATA 146 |
|---|---|---|
| TASK 120 (1,1) | TASK 120 (1,2) | TASK 120 (1,3) |
| START 202 (_,_) | START 202 (_,_) | START 202 (_,_) |
| ADDR 134 (1,1) | ADDR 134 (1,2) | ADDR 134 (1,3) |
| FSM MATRIX 132 (1,1) | FSM MATRIX 132 (1,2) | FSM MATRIX 132 (1,3) |
| TASK 120 (2,1) | TASK 120 (2,2) | TASK 120 (2,3) |
| START 202 (_,_) | START 202 (_,_) | START 202 (_,_) |
| ADDR 134 (2,1) | ADDR 134 (2,2) | ADDR 134 (2,3) |
| FSM MATRIX 132 (2,1) | FSM MATRIX 132 (2,2) | FSM MATRIX 132 (2,3) |

MEMORY 104

PROCESSOR 102

FIG. 12AA

| BIT STREAM 124 | CONFIGURATION DATA 142 | | | CONFIG. CTL DATA 146 |
|---|---|---|---|---|
| TASK 120 (1,1) | TASK 120 (1,2) | TASK 120 (1,3) | | ............ |
| START = FIRST | START 202 (1,1) | START 202 (1,2) | | ............ |
| ADDR 134 (1,1) | ADDR 134 (1,2) | ADDR 134 (1,3) | | ............ |
| STARTING DELIMITER FSM 132 (SD) | TOKEN (T) FSM 132 (T) | TOKEN END DELIMITER FSM 132 (EDT) | | |
| TASK 120 (2,1) | TASK 120 (2,2) | TASK 120 (2,3) | | ............ |
| START 202 (_,_) | START 202 (_,_) | START 202 (_,_) | | ............ |
| ADDR 134 (2,1) | ADDR 134 (2,2) | ADDR 134 (2,3) | | ............ |
| FSM MATRIX 132 (2,1) | FSM MATRIX 132 (2,2) | FSM MATRIX 132 (2,3) | | |

MEMORY 104 / 102

| | | |
|---|---|---|
| TASK 120 (3,1) | TASK 120 (3,2) | TASK 120 (3,3) |
| START 202 (_,_) | START 202 (_,_) | START 202 (_,_) |
| ADDR 134 (3,1) | ADDR 134 (3,2) | ADDR 134 (3,3) |
| FSM MATRIX 132 (3,1) | FSM MATRIX 132 (3,2) | FSM MATRIX 132 (3,3) |
| INPUT 202 (1,1) | INPUT 202 (1,2) | INPUT 202 (1,3) |
| SD COUNTER 170 (SD) | T COUNTER 170 (T) | EDT COUNTER 170 (EDT) |

EVENT VECTOR 180

INFORMATION COLLECTION ARCHITECTURE 190

MULTI-TASKING OPERATING SYSTEM PROGRAM 128

CPU 108 — DISK DRIVE 114 — DISPLAY & KEYBD 116 — LAN ADAPTER 118 — DATA STREAM 124 — LAN 140

FINE MEASUREMENT OF LAN UTILIZATION USING FRAME ACTIVITY

MEMORY 104

/ 102

| BIT STREAM 124 | CONFIGURATION DATA 142 | | | CONFIG. CTL DATA 146 |
|---|---|---|---|---|
| TASK 120 (1,1) | TASK 120 (1,2) | TASK 120 (1,3) | | ...... |
| START = FIRST | START 202 (1,1) | START 202 (1,2) | | ...... |
| ADDR 134 (1,1) | ADDR 134 (1,2) | ADDR 134 (1,3) | | ...... |
| STARTING DELIMITER FSM 132 (SD) | TOKEN (T) FSM 132 (T) | TOKEN END DELIMITER FSM 132 (EDT) | | ...... |
| TASK 120 (2,1) | TASK 120 (2,2) | TASK 120 (2,3) | | ...... |
| START 202 (_,_) | START 202 (1,1) | START 202 (2,2) | | ...... |
| ADDR 134 (2,1) | ADDR 134 (2,2) | ADDR 134 (2,3) | | ...... |
| FSM MATRIX 132 (2,1) | FRAME (F) FSM 132 (F) | FRAME END DELIMITER FSM 132 (EDF) | | ...... |

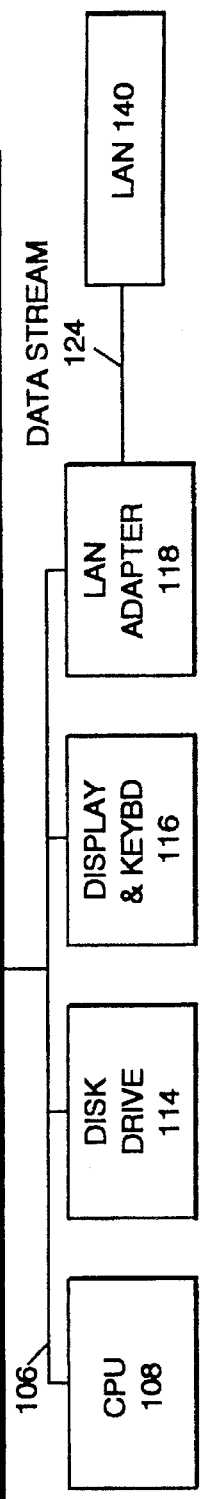

FIG. 12CA

MEMORY 104 → 102

| BIT STREAM 124 | CONFIGURATION DATA 142 | | CONFIG. CTL DATA 146 |
|---|---|---|---|
| TASK 120 (1,1) | TASK 120 (1,2) | TASK 120 (1,3) | ........ |
| START = FIRST | START 202 (1,1) | START 202 (1,2) | ........ |
| ADDR 134 (1,1) | ADDR 134 (1,2) | ADDR 134 (1,3) | ........ |
| STARTING DELIMITER FSM 132 (SD) | TOKEN (T) FSM 132 (T) | TOKEN END DELIMITER FSM 132 (EDT) | ........ |
| TASK 120 (2,1) | TASK 120 (2,2) | TASK 120 (2,3) | ........ |
| START 202 (_,_) | START 202 (1,1) | START 202 (2,2) | ........ |
| ADDR 134 (2,1) | ADDR 134 (2,2) | ADDR 134 (2,3) | ........ |
| FSM MATRIX 132 (2,1) | FRAME (F) FSM 132 (F) | FRAME END DELIMITER FSM 132 (EDF) | ........ |

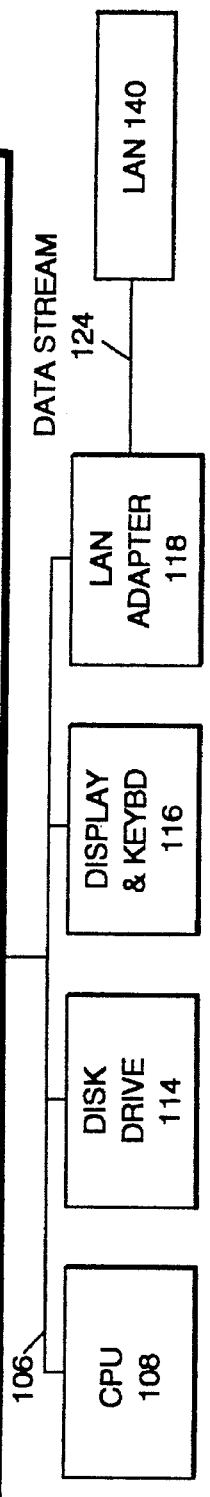

SYSTEM AND METHOD FOR ADAPTIVE, ACTIVE MONITORING OF A SERIAL DATA STREAM HAVING A CHARACTERISTIC PATTERN

BACKGROUND OF THE INVENTION

1. Technical Field

The invention disclosed broadly relates to data processing systems and more particularly relates to system and method for finite state machine processing in a data communications environment.

2. Related Patent Applications

This patent application is related to the copending U.S. patent application Ser. No. 08/024,572, filed Mar. 1, 1993, entitled "Information Collection Architecture and Method for a Data Communications Network," by J. G. Waclawsky, Paul C. Hershey, Kenneth J. Barker and Charles S. Lingafelt, Sr., assigned to the IBM Corporation and incorporated herein by reference now U.S. Pat. No. 5,375,070.

This patent application is also related to the copending U.S. patent application Ser. No. 08/024,563, filed Mar. 1, 1993, entitled "Event Driven Interface for a System for Monitoring and Controlling a Data Communications Network," by Paul C. Hershey, John G. Waclawsky, Kenneth J. Barker and Charles S. Lingafelt, Sr., assigned to the IBM Corporation and incorporated herein by reference now U.S. Pat. No. 5,365,514.

This patent application is also related to the copending U.S. patent application Ser. No. 08/024,575, filed Mar. 1, 1993, entitled "System and Method for Configuring an Event Driven Interface and Analyzing Its Output for Monitoring and Controlling a Data Communications Network," by John G. Waclawsky and Paul C. Hershey, assigned to the IBM Corporation and incorporated herein by reference now U.S. Pat. No. 5,493,689.

3. Background Art

Finite state machines (FSM) are commonly used in the implementation of telecommunications protocols and of input/output processors, because finite state machines can define all possible conditions completely and unambiguously. However, a problem with finite state machines is defining the sequence of states and the accompanying actions to be accomplished with each state. Conventional implementations of finite state machines result in program code sets which are extensive and complex.

OBJECTS OF THE INVENTION

It is therefore an object of the invention to increase the speed of detection of a characteristic data pattern to obtain effective, realtime control for high speed data networks.

It is another object of the invention to detect the occurrence of multiple component data patterns simultaneously, in a characteristic data pattern.

It is another object of the invention to detect a component data pattern which is common to two or more distinctly different characteristic data patterns.

It is another object of the invention to provide programmability for the finite state machines and programmability of their interconnection, to detect a variety of characteristic data patterns.

It is another object of the invention to detect diverse sized characteristic data patterns.

It is another object of the invention to detect characteristic data patterns in a communications medium which is encoded with two or more bits per symbol.

It is another object of the invention to detect encoded voice signals in a communications medium.

SUMMARY OF THE INVENTION

A system and method are disclosed for adaptive, active monitoring of a serial data stream having a characteristic pattern. The adaptive, active monitor invention is useful in detecting characteristic data patterns in messages on a high speed data network, such as starting delimiters, tokens, various types of frames, and protocol information. Such serial data streams include serial patterns of binary bits, and can also include serial patterns of multiple state symbols, such as the J, K, 0, 1 symbols (four states) of token ring networks. Such serial data streams can further include multiple state symbols in fiber optical distributed data interface (FDDI) networks.

Characteristic data patterns such as these, include component bit patterns, some of which are common among several characteristic data patterns. For example, a starting delimiter bit pattern is a common component which begins many other characteristic data patterns such as a token, a MAC frame, and a beacon frame in the IEEE 802.5 token ring protocol. The occurrence of multiple component bit patterns in a characteristic data pattern can be generalized by referring to a first component pattern which is followed by and a second component pattern.

In accordance with the invention, the adaptive, active monitor comprises two finite state machines (FSM) which are constructed to detect the occurrence of a characteristic data pattern having two consecutive component bit patterns. The first FSM is called the predecessor FSM, and it is configured to detect the first component pattern. The second FSM is called the successor FSM, and it is configured to detect the second component pattern. The first FSM will send a starting signal to the second FSM, when the first FSM has successfully detected the first component pattern. The staffing signal initializes the second FSM, to take over the analysis of the portion of the bit stream which follows the first component pattern. If the second FSM successfully detects the second component pattern, it then outputs a pattern alarm signal, indicating the successful detection of the entire characteristic data pattern.

Another feature of the adaptive, active monitor invention is the accommodation of a component bit pattern which is common to two or more distinctly different characteristic data patterns. For example, a first characteristic data pattern is composed of a first-type component bit pattern followed by a second-type component bit pattern. A second characteristic data pattern is composed of the same first-type component bit pattern followed by a third-type component bit pattern. A first FSM is configured to detect the first component pattern, a second FSM is configured to detect the second component pattern, and a third FSM is configured to detect the third component pattern. The objective is to detect either one of the two characteristic data patterns. In accordance with the invention, the predecessor FSM will have a plurality of successor FSMs which run simultaneously in parallel. The first FSM will send a starting signal to both the second FSM and to the third FSM, when the first FSM has successfully detected the first component pattern. The starting signal initializes the second FSM, to take over the analysis of the bit stream which follows the first component pattern, to look for the second component bit pattern. And the starting signal initializes the third FSM, to take over the analysis of the same bit stream which follows the first component pattern, to look for the third component bit pattern. The second FSM and the third FSM run simultaneously in parallel and are mutually independent. They both run until one of them fails or one of them succeeds in finding its designated component bit pattern.

In this manner, the speed of detection of a characteristic data pattern is increased, the number of components is decreased, and effective, realtime control can be achieved for high speed data networks.

Still another feature of the adaptive, active monitor invention is the programmability of the FSMs and the programmability of their interconnection. Each FSM consists of an address register and a memory. The address register has two portions, an n-1 bit wide first portion and a X-bit wide second portion X. X is one bit for binary data, X is a word of two bits for Manchester encoded data, or X is a word of five bits for FDDI encoded data. The X-bit wide portion is connected to the input data stream which contains the characteristic data pattern of interest. The n-X bit wide portion contains data which is output from the memory. The next address to be applied by the address register to the memory is made up of the X-1 bit wide portion and the next arriving X-bit word from the input data stream.

Each memory has a plurality of data storage locations, each having a first portion with n-X bits, to be output to the address register as part of the next address. Many of the memory locations have a second portion which stores a command to reset the address register if the FSM fails to detect its designated component bit pattern.

In accordance with the invention, a terminal location in the memory of an FSM will include a start signal value to signal another FSM to start analyzing the data stream. If the terminal location in a predecessor FSM memory is successful in matching the last bit of its designated component bit pattern, then it will output a starting signal to a succeeding FSM. The succeeding FSM will begin analyzing the data stream for the next component bit pattern of the characteristic data pattern. The memory of an FSM can be a writable RAM, enabling its reconfiguration to detect different component bit patterns.

Another feature contributing to the programmability of the adaptive, active monitor invention is the inclusion of a programmable cross point switch, which enables the starting signals from predecessor FSMs to be directed to different successor FSMs. This enables changing the order and combination of FSMs performing analysis of a bit stream, to detect differently organized characteristic data patterns.

Another feature of the invention is its functioning in an information collection architecture, to monitor the traffic on a network and to provide event counts for the occurrence of data patterns which are used to control the characteristics of the network.

Further in accordance with the invention, diverse sized characteristic data patterns can be detected. For example, if when monitoring the 10-bit pattern it is determined that more than 10 bits of information are required, the adaptive monitor feature may be dynamically altered to change the length of the pattern that can be detected. This ability provides increased insight into the characteristics of the data stream.

Another feature of the invention is its ability to receive serial data streams which include serial patterns of multiple state symbols such as in token ring networks and in fiber optical distributed data interface (FDDI) networks.

The adaptive, active monitor invention can be embodied as a plurality of FSM integrated circuit chips which are connected in common to receive the input bit stream and which are programmably interconnected to transfer start signals. The adaptive, active monitor invention can also be embodied as a unitary VLSI circuit chip. And the adaptive, active monitor invention can also be embodied as a plurality of FSM program task partitions in the memory of a multitasking processor.

An additional feature of the invention is an information collection architecture system, with an adaptable, simultaneously parallel array of finite state machines, for monitoring a data communications network. The system includes an array of at least three finite state machines, embodied on a VLSI circuit chip or alternately in separate task partitions of a multi-tasked data processor. Each finite state machine in the array, includes a memory, an address register coupled to the network, a start signal input and a pattern detection output coupled to a counter, the memory thereof storing a finite state machine definition for detecting a unique data pattern on the network. Each machine can detect a different pattern. A programmable interconnection means is coupled to the finite state machines in the array, for selectively interconnecting the pattern detection outputs to the start signal inputs. An event vector assembly means, has inputs coupled to the counters, for assembling an event vector from an accumulated count value in the counters, representing a number of occurrences of the data patterns on the network. An information collection means, has an input coupled to the event vector assembly means, an array output coupled to the memories of the finite state machines, and a configuration output coupled to the programmable interconnection means, for receiving the event vector and in response thereto, changing the array to change data patterns to be detected on the network.

In accordance with the invention, the information collection means, in response to receiving the event vector, changes a first interconnection arrangement of the first pattern detection output being connected to the second start signal input, to a second interconnection arrangement of the first pattern detection output being connected to the third start signal input. This changes the composite pattern to be detected.

Further in accordance with the invention, the information collection means, in response to receiving the event vector, changes a first interconnection arrangement of the first pattern detection output being connected to the second start signal input, to a second interconnection arrangement of the first pattern detection output being connected to both the second start signal input and to the third start signal input. This creates a simultaneous, parallel finite state machine operation.

Further in accordance with the invention, the information collection means, in response to receiving the event vector, outputs new finite machine definition data to at least the first memory to change the first data pattern to be detected.

Further in accordance with the invention, the information collection means is coupled to the network, and in response to receiving the event vector, outputs a control signal to the network to alter communication characteristics thereof.

The resulting information collection architecture system provides a flexible, rapidly reconfigurable means to monitor and control data communications networks, through realtime monitoring of the data patterns in their traffic.

Another feature of the invention is its applicability to detecting encoded voice signals on a data communications medium.

DESCRIPTION OF THE FIGURES

These and other objects, features and advantages will be more fully appreciated with reference to the accompanying figures.

FIG. 1C illustrates a processor implementation of the invention wherein a plurality of finite state machines are embodied.

FIG. 2G illustrates the finite state machine 130(I).

FIG. 4E illustrates a functional block diagram example of the information collection architecture for the IEEE 802.5 token ring network.

FIG. 5C illustrates the starting delimiter of FIG. 5A, using binary bit pairs representing non-binary input symbol strings.

FIG. 9A shows a timing diagram for a fiber optical distributed data interface coding.

FIG. 9B shows a schematic diagram of the fiber optical distributed data interface decoding state machine.

FIG. 9G shows the FDDI abort end delimiter detection finite state machine.

FIG. 9H shows the FDDI token and delimiter detection finite state machine.

FIG. 10B is a functional block diagram of the information collection architecture controlling token ring traffic by fine measurement of LAN utilization using frame activity.

FIG. 11 is a schematic block diagram of an array of finite state machines before they are configured by the information collection architecture.

FIG. 12 is a functional block diagram of the data processor 102 performing a multi-tasking operation on an array of finite state machines, corresponding to the array of FIG. 11.

FIG. 12A is a functional block diagram of the data processor of FIG. 12, configured by the information collection architecture to perform coarse measurement of LAN utilization using token activity.

FIG. 12B is a functional block diagram of the data processor of FIG. 12, configured by the information collection architecture to perform a fine measurement of LAN utilization using frame activity.

FIG. 12C is a functional block diagram of the data processor of FIG. 12, configured by the information collection architecture to perform a measurement of LAN utilization using control frame activity.

DISCUSSION OF THE PREFERRED EMBODIMENT

The principle of the adaptive active monitoring invention is shown in FIGS. 1A–1F. The adaptive active monitoring invention, monitors a serial data stream having a characteristic pattern. It detects characteristic data patterns in messages on a high speed data network, starting delimiters, tokens, various types of frames such as a MAC frame, a beacon frame, message frames, etc., and other protocol information. Such data streams typically include serial patterns of binary bits. However, some communications protocols, such as the IEEE 802.5 token ring protocol, have multiple state symbols such as the J, K, 0 and 1 symbols (four states), and they can also be accommodated by the invention. The IEEE 802.5 token ring protocol is described in the IEEE Standard 802.5, token ring access method, available from IEEE Incorporated, New York, N.Y., 1989.

Figures 4C, 4D:
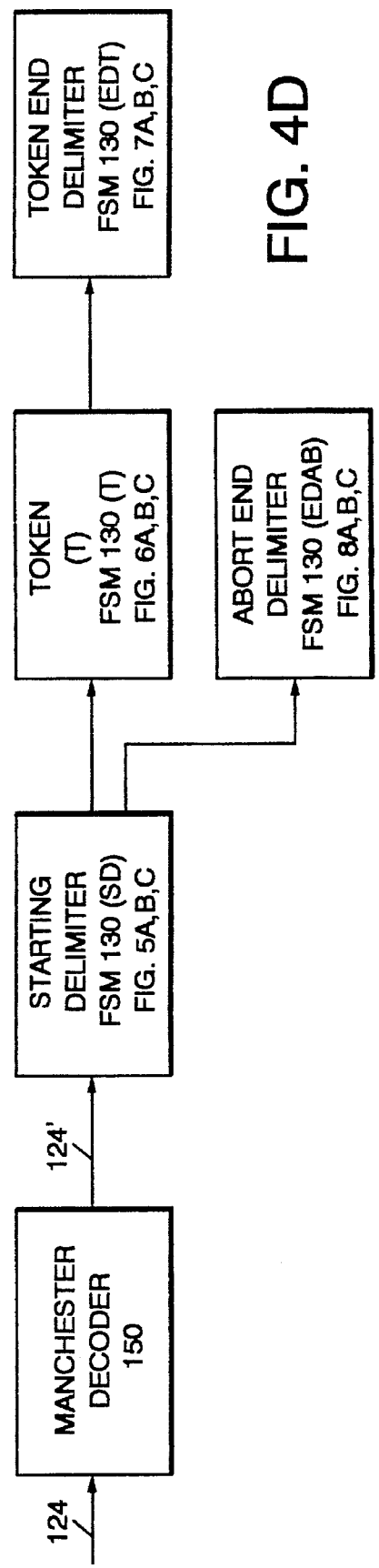
FIG. 4C is a tabular diagram of a Manchester decoding table.
FIG. 4D illustrates a functional block diagram example of a finite state machine sequence for the IEEE 802.5 token ring.
Figure 5A:
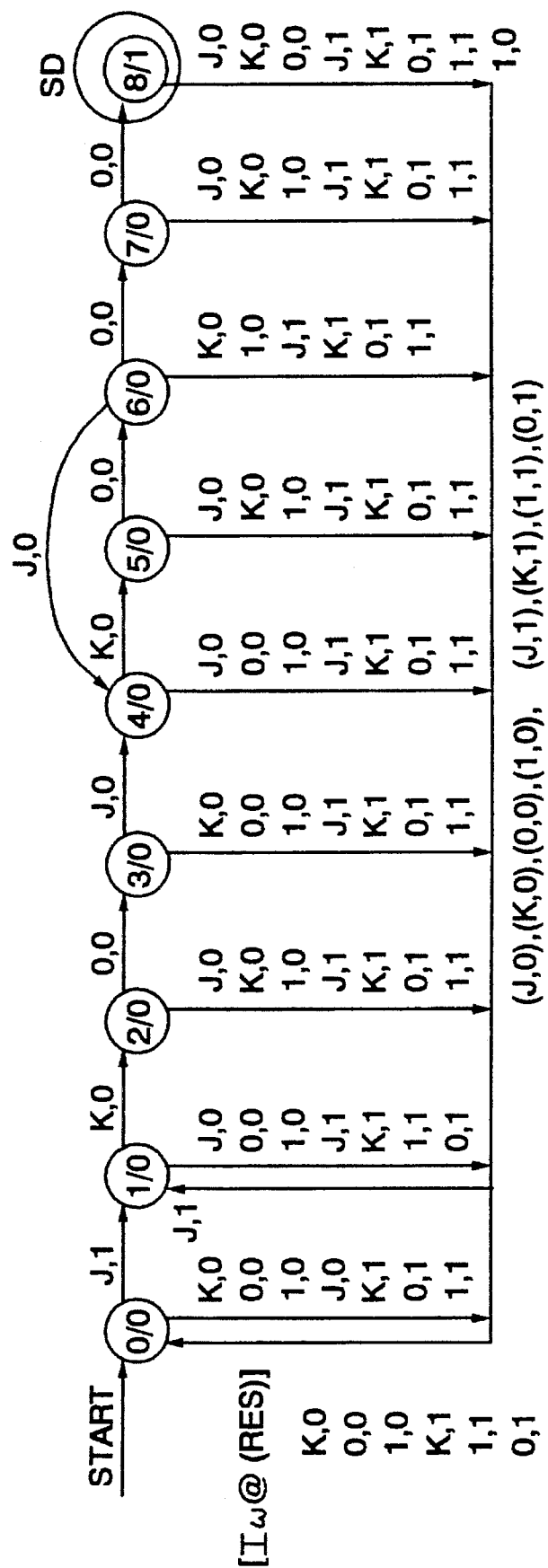
FIG. 5A illustrates a state diagram for a starting delimiter finite state machine.

Characteristic data patterns such as these include component bit patterns, some of which are common among several characteristic data patterns. For example, a starting delimiter bit pattern, such as that shown in FIG. 5A, is a common component which begins many other characteristic data patterns such as a token, an ending delimiter abort (EDAB) in FIG. 4D, and other communication messages in a token ring protocol. The occurrence of multiple bit patterns in a characteristic data pattern can be generalized by referring to a first component pattern which is immediately followed by a second component pattern for a first characteristic data pattern. A second characteristic data pattern can employ the same first component pattern which will then immediately be followed by a third component pattern which is different from the second component pattern.

In protocols having two characteristic data patterns with some of the component bit patterns being the same, on the objective of pattern detection will be to detect either one of the two characteristic data patterns. In accordance with the adaptive active monitoring invention, the predecessor finite state machine will have a plurality of successor finite state machines which run simultaneously and parallel. The predecessor finite state machine will send a starting signal to both of the successor finite state machines, when the predecessor finite state machine has successfully detected the first component data pattern. The starting signal initializes both of the successor finite state machines to take over the analysis of the bit stream which follows the first component pattern, in order to look for the second component bit pattern or alternately the third component bit pattern. Both successor finite state machines run simultaneously and parallel and are mutually independent. They both run until one of them fails or one of them succeeds in finding its designated component bit pattern. In this manner, the speed of detection of a characteristic data pattern is increased, the number of components of the finite state machine array is decreased, and the effective realtime control can be achieved for high speed data networks.

Figures 1, 1A:
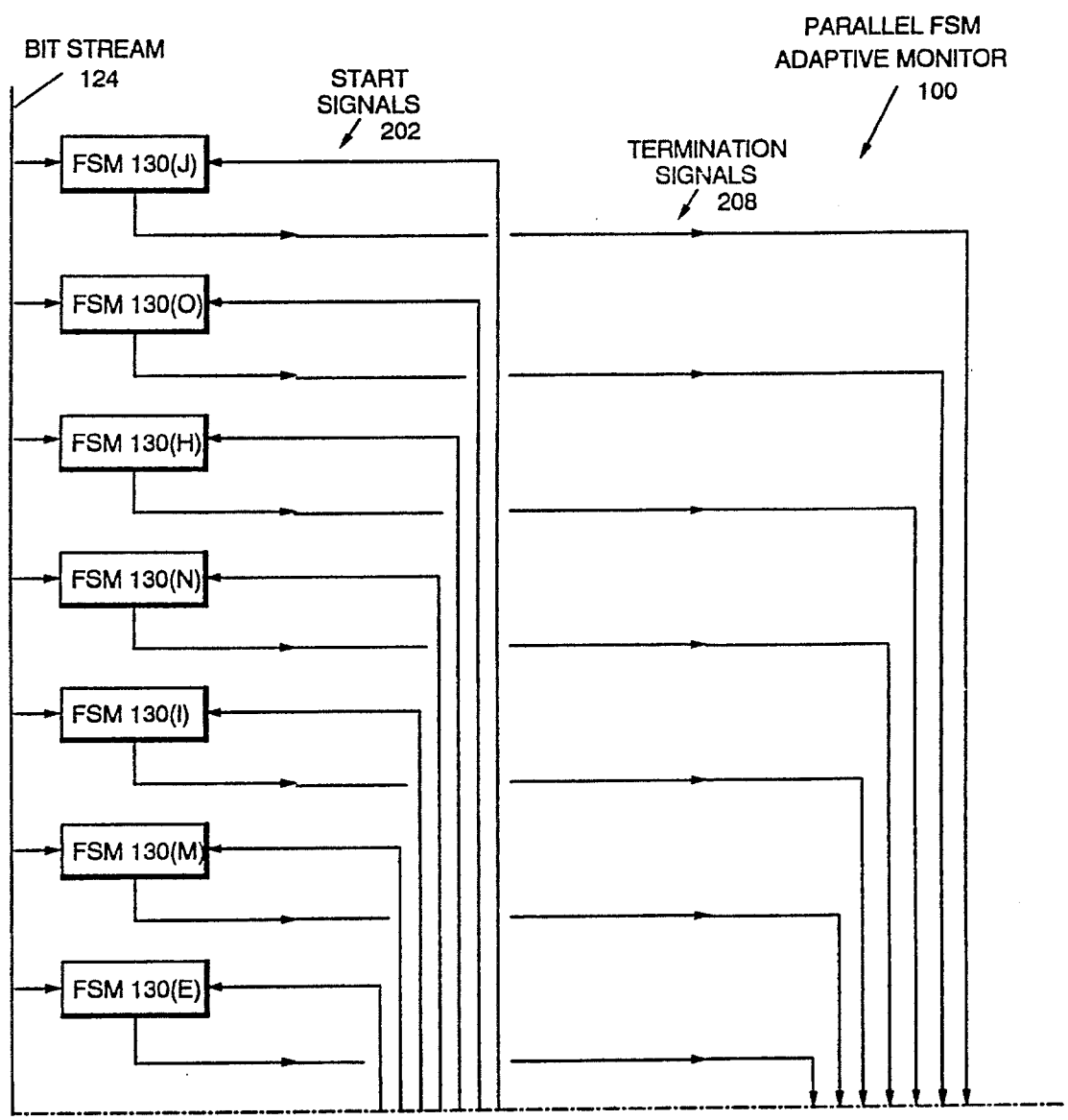
FIG. 1A is a functional block diagram of a parallel finite state machine adaptive monitor, in accordance with the invention.

Turning now to FIG. 1A, a parallel finite state machine adaptive monitor 100 is shown. The bit stream 124 which comes from the communications network, is commonly connected to the input of all of the finite state machines FSM 130(J), 130(O), 130(H), 130(N), 130(I), 130(M), 130(E) and 130(B). The starting signal 202 applied to a finite state machine for example FSM 130(J), comes from the termination signal 208 generated by another finite state machine in the array 100. For example, the finite state machine FSM 130(O) has its start signal 202(O) derived from the starting signal 202(O) output by the finite state machine 130(J). The interconnection of the output termination signal 208 of a predecessor finite state machine, to the starting signal input 202 of a successor finite state machine, is accomplished by the programmable cross point switch 210 shown in FIG. 1A. The cross point switch 210 is configured to interconnect the starting signal input of a successor finite state machine to the termination signal output of the predecessor finite state machine, in order to accomplish a desired sequential analysis of component bit patterns making up consecutive portions of a data pattern of interest.

Also included in the adaptive monitor 100 of FIG. 1A, is a global reset signal 204 which is applied to the first occurring finite state machine connected to the bit stream 124. As will be seen in the discussion of FIG. 1E, the first finite state machine will be FSM(F). Also shown in FIG. 1A, is the first FSM 206 designation. Once again, this designation will be applied to one of the plurality of the finite state machines in the array, designating it as the first connected finite state machine to the bit stream being analyzed. The significance of being finite state machine is that no starting signal is applied to it. Instead, the first finite state machine connected to a data stream, continuously analyzes the bits in that data stream. All successor finite state machines to the first, predecessor finite state machine, require input starting signals to initiate their respective analyses of the bit stream 124.

FIG. 1A also shows the pattern alarms 144, 144' and 144" which result from the satisfactory completion of the analysis of a corresponding characteristic data pattern. The finite state machines FSM 130(J) through FSM 130(B) in FIG. 1A, can be each embodied as a large scale integrated circuit (LSI) chip, connected by means of a bus for conducting the start signals 202 and the termination signals 208 with the programmable cross point switch 210. The programmable cross point, switch 210 can also be a separate LSI circuit chip. In another embodiment of the invention, the finite state machines FSM 130(J) through 130(B) and the programmable cross point switch 210, can collectively be integrated into a very large integrated circuit VLSI circuit chip.

Figures 1, 1A, 2:
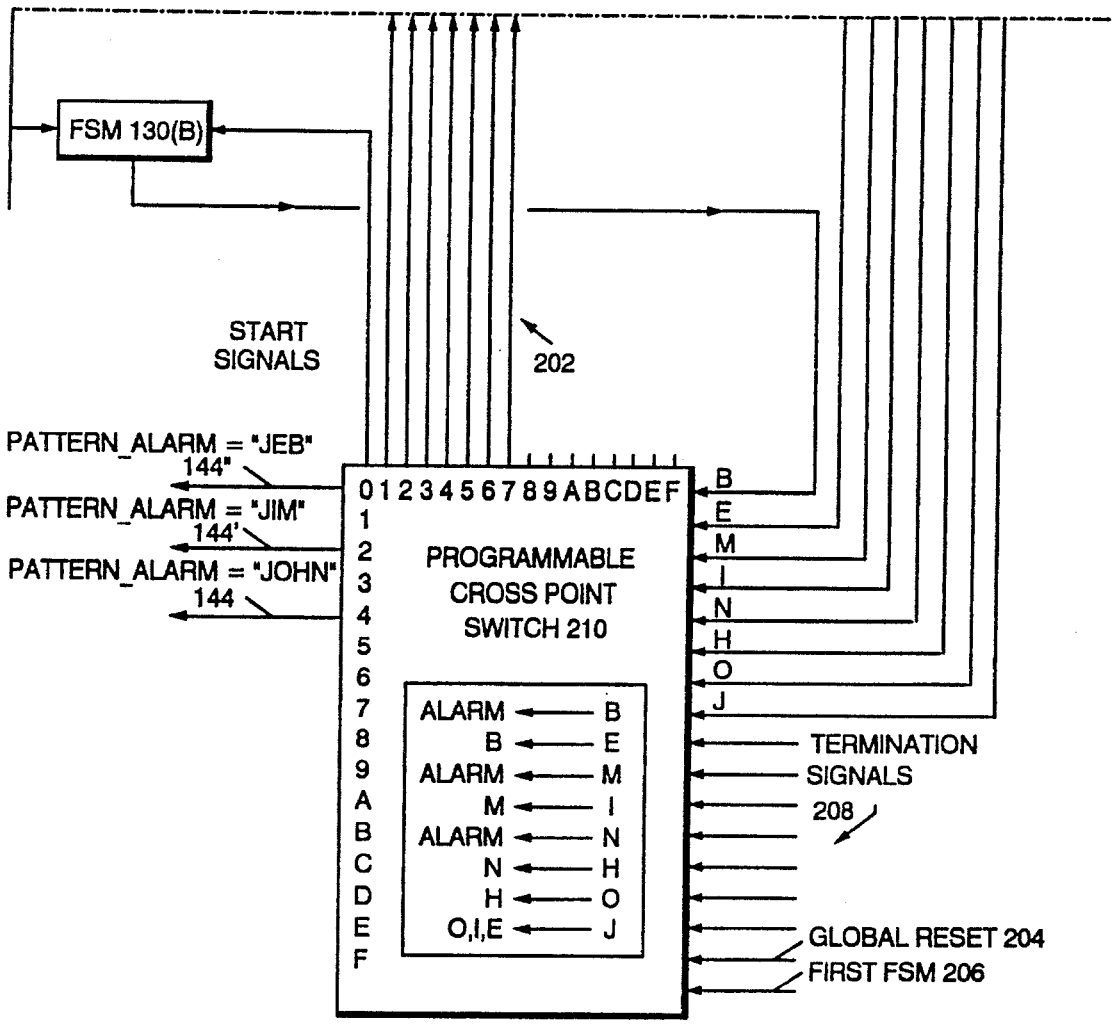
FIGS. 2 illustrates an example of an array of finite state machines including a predecessor finite state machine 130(J) which starts a plurality of successor finite state machines, in parallel.
Figures 1, 1B:
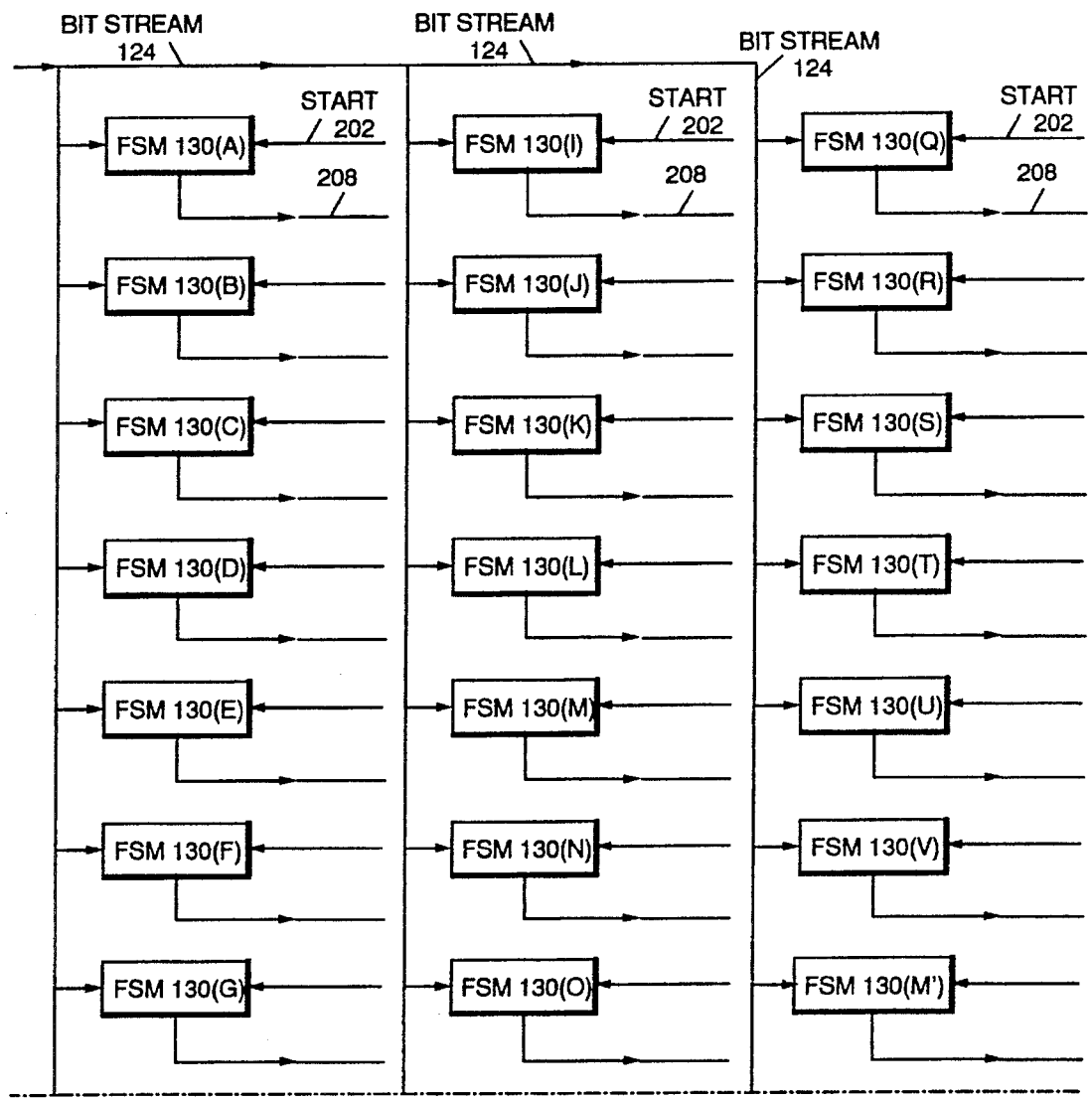
FIG. 1B is a functional block diagram showing a plurality of finite state machines that can be interconnected by means of a cross point switch.
Figures 1, 1B, 2:
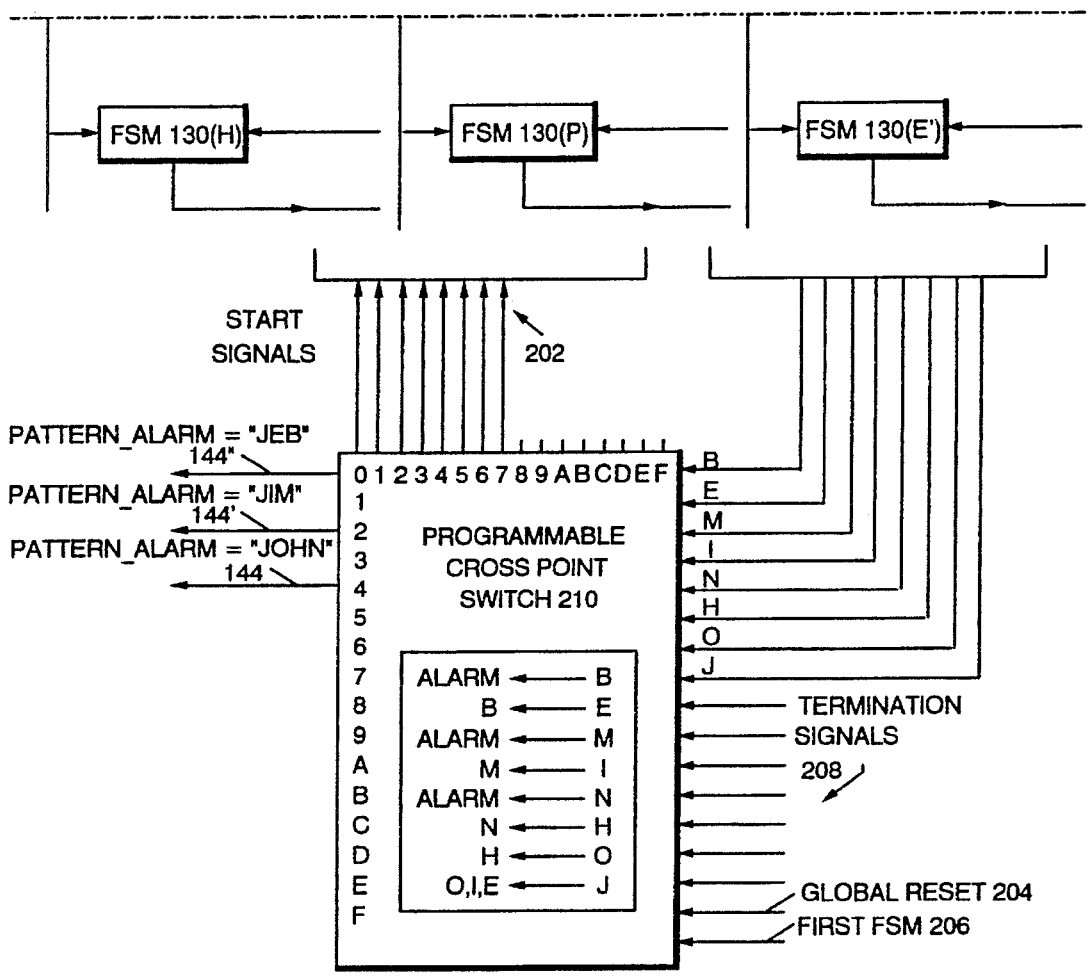

FIG. 1B shows another embodiment of the finite state machine array 100 shown in FIG. 1A, wherein it provides for a large array of selectively interconnectable finite state machines. In FIG. 1B, the programmable cross point switch 210 can selectively interconnect the termination signals from predecessor finite state machines to the start signal inputs 202 of successor finite state machines in a flexible, programmable manner. By configuring the interconnection pattern in the cross point switch 210, predecessor finite state machines may be selected for applying starting signals to successor finite state machines. A particular pattern of interconnection is shown in FIG. 1E and another particular pattern is shown in FIG. 1F. The embodiment shown in FIG. 1B can also be implemented as a plurality of LSI circuit chips or alternately all of the elements shown in FIG. 1B can be integrated onto the same very large scale integrated circuit chip.

FIG. 1C shows a data processor implementation of the adaptive, active monitoring invention. FIG. 1C shows the processor 102 which includes the memory 104 connected by means of the bus 106 to the CPU 108, the disk drive 114, the display and keyboard 116 and the LAN adaptor 118. The LAN adaptor 118 is connected by means of the bit stream 124 to the local area network 140.

The memory 104 includes a bit stream partition 124, and a plurality of task partitions 120F, 120(R), 120(E'), 120(J), 120(O), 120(H), 120(N), 120(I), 120(M), 120(E) and 120(B). Each task partition, such as task partition 120(F) includes a start partition 202, an address register partition 134, and a matrix partition 132. For example, task 120(F) includes the address register 134F' and the matrix 132(F). In order to designate a first FSM, the start partition 122 for the task 120(F) stores the designation "FIRST." The memory 104 also includes a multi-tasking operation system program 128. In accordance with the invention, each task 120(F), 120(R), 120(E'), 120(J), 120(K), etc., will be executed in parallel in a multi-tasking mode. Each task will have applied to it the current bit from the bit stream 124. The respective task 120 will operate in the same manner as the finite state machines 130(J), 130(O), 130(H), 130(N), 130(I), 130(M), 130(E), 130(B), for example in FIG. 1A. The task 120 in FIG. 1C will pass starting signals from a predecessor finite state machine operating in a first task, for example task (F) to a successor finite state machine operating in a next task, for example task 120(R).

In accordance with the invention, the task 120(J) will issue a starting signal upon satisfactory termination of its matrix 132(J), to three parallel tasks, task 120(O), 120(I), and 120(E). This will launch simultaneous, independent, parallel operation of the tasks 120(O), 120(I) and 120(E) as three parallel successor tasks to the task 120(J).

Figure 1D:
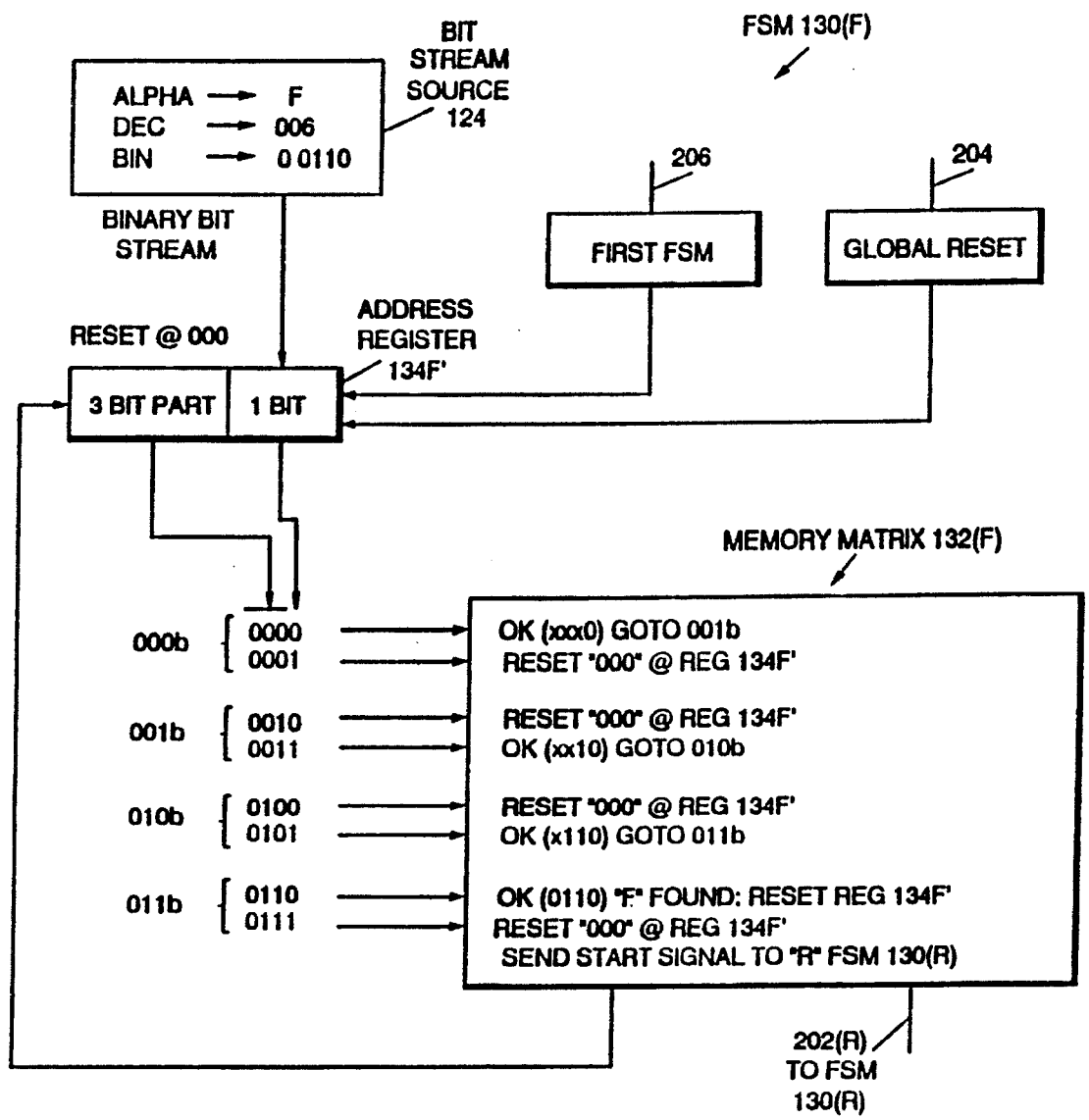
FIG. 1D illustrate a first finite state machine serving as the first pattern analysis stage in a plurality of finite state machines.
Figure 1E:
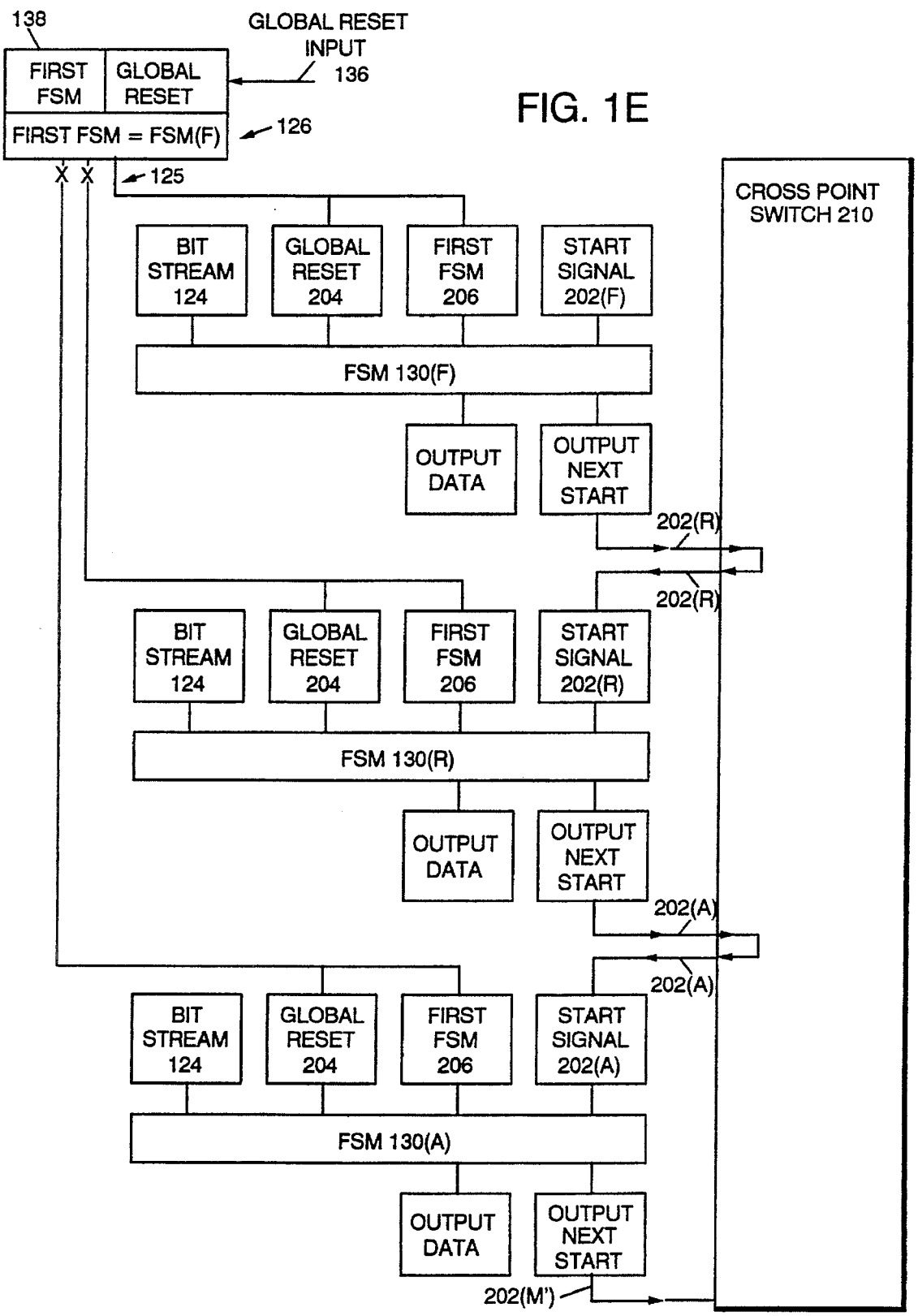
FIG. 1E illustrates the interconnection of a first finite state machine with successor finite state machines, using a cross point switch.
Figure 1F:
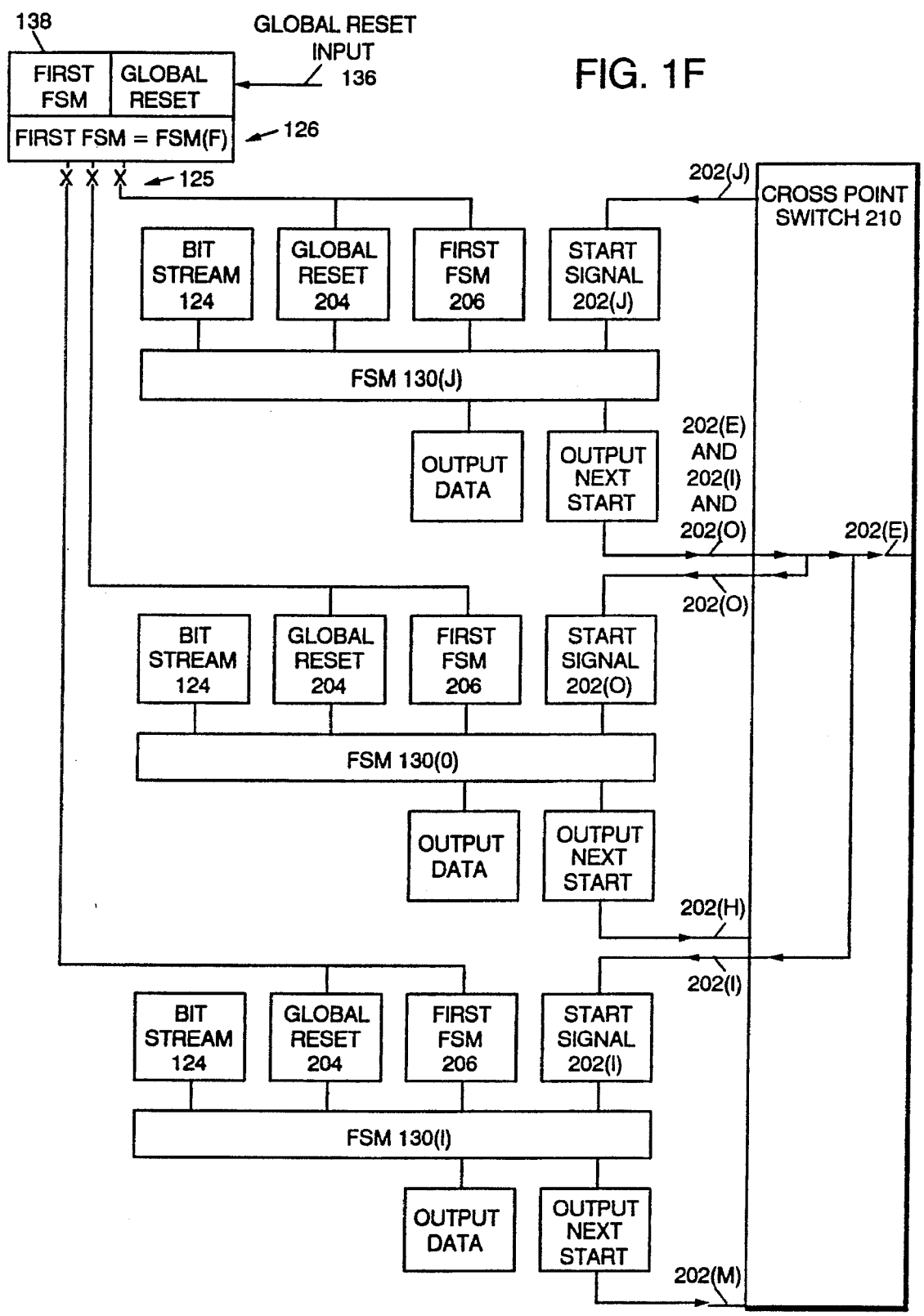
FIG. 1F illustrates the interconnection of a predecessor finite state machine and a plurality of successor, parallel finite state machines using a cross point switch.

FIG. 1D illustrates the finite state machine FSM 130(F), which is the first finite state machine connected to the bit stream 124. This can be more clearly seen with reference to FIG. 1E and also with reference to FIG. 2. Referring to FIG. 1E, a standard, modular, finite state machine configuration is shown for the FSM 130(F), the FSM 130(R) and the FSM 130(A). Each modular, finite state machine 130 shown in FIG. 1E, includes a bit stream 124 input, a global reset 204 input, a first FSM 206 input, a start signal 202(F) input, an output data port and an output next start port. By interconnecting a plurality of modular, finite state machines FSM 130(F), 130(R), 130(A), etc. by using the cross point switch 210 in FIG. 1E, a desired interconnection of predecessor and successor finite state machines can be achieved. The register file 138 distributes the global reset input 204 and the first FSM 206 designation. The register 126 stores the identity of the first FSM in the array. For the example given in FIG. 1E, the first FSM is FSM(F). The register file 138 has a selectable output 125 which is controlled by the contents of the register 126, which stores the identity of the first FSM. The designation of first FSM and the global reset input 136 are connected over the output 125 to only one of the finite state machines, based upon the identity of the first FSM in register 126. The rest of the finite state machines in the array are not connected to the global reset input 136 and they do not have the designation as "first FSM." In the example shown in FIG. 1E, the FSM 130(F) is designated as the first FSM and it receives the global reset signal from input 136. The corresponding connections from the register file 138 to the rest of the finite state machines in the array are disabled, in response to the designation in register 126. This prevents a global reset input 204 and a first FSM input 206 from being applied to the FSMs 130(R) and 130(A) in FIG. 1E. Note also that there is no starting signal 202(F) applied to the first FSM 130(F). Starting signals are only applied to successor finite state machines in the array. Thus, the first finite state machine FSM 130(F) continuously analyzes the input bit stream 124, without the necessity of being restarted with a start signal.

It is seen that in FIG. 1E, the output next start signal 202(R) from the first FSM 130(F) is connected by means of the cross point switch 210, to the start signal input of the second FSM 130(R). Similarly, the output next start signal 202(A) from the FSM 130(R) is input to the start signal input 202(A) of the FSM 130(A), by means of the cross point switch 210. The cross point switch 210 is able to selectively reconfigure the interconnection of the finite state machines in the array shown in FIG. 1B. It is seen in FIG. 1E that the register 126 selectively designates one of the finite state machines in the array of FIG. 1B as the first finite state machine. In the example shown in FIG. 1E, the first finite state machine is designated as FSM(F). That first finite state machine will receive the global reset 204 and the first FSM designation 206.

FIG. 1F continues the illustration, showing a significant feature of the invention. The finite state machine FSM 130(J) has an output next start signal which consists of three starting signals, 202(E), 202(I), and 202(O). They respectively start the FSM 130(E), FSM 130(I) and FSM 130(0). This is accomplished the selective configuration of the cross point switch 210 in FIG. 1F. It is seen that the register 126 continues to designate the FSM(F) of FIG. 1E, as the first FSM. Therefore, no global reset or first FSM designation is given to FSM 130(J), FSM 130(O) or FSM 130(I) of FIG. 1F. Thus, it is the start signal 202(J) which starts the analysis of FSM 130(J) of the bit stream 124. Similarly, it is the start signal 202(O) which starts the analysis by FSM 130(O) of the bit stream 124. Similarly, it is the start signal 202(I) which starts the analysis by FSM 130(I) of the bit stream 124.

Turning now to FIG. 2, it is seen how the finite state machine array is interconnected to perform three parallel data pattern analyses in the bit stream 124. The frame detector 110 consists of the FSM 130(F), 130(R), 130(A), 130(M) and 130(E'). These finite state machines look for the consecutive characters "F," "R," "A," "M" and "E" in the bit stream 124. If they are found, then the start signal 202(J) is passed from the FSM 130(E') to the FSM 130(J), which is shown in greater detail in FIG. 2B.

The frame type detector 112, which consists of the FSM 130(J), 130(O), 130(H), 130(N), 130(I), 130(M), 130(E) and 130(B), performs frame type detection for three frame type character patterns in the bit stream 124, which can immediately follow the "FRAME" frame designation in the bit stream 124. In accordance with the invention, the FSM 130(J) outputs three starting signals, 202(O), 202(I), and 202(E), to start three parallel, simultaneous, independently operating finite state machine sequences shown in FIG. 2. In the example shown in FIG. 2, the frame detector 110 searches for the character pattern "FRAME." If that pattern is found in the bit stream of 124, then the FSM 130(J) starts the three parallel simultaneous sequences which look for the character pattern "JOHN," or "JIM," or "JEB." The output alarm "FRAME_JOHN," is output from the FSM 130(N) if that character pattern is identified. The output alarm "FRAME_JIM," is output from the FSM 130(M), if that character pattern "JIM," is found in the bit stream 124. The output alarm "FRAME_JEB," is output from FSM 130(B), if "JEB" is found in the bit stream 124. Each of these frame type character patterns must follow the first pattern of "FRAME."

Figure 2:
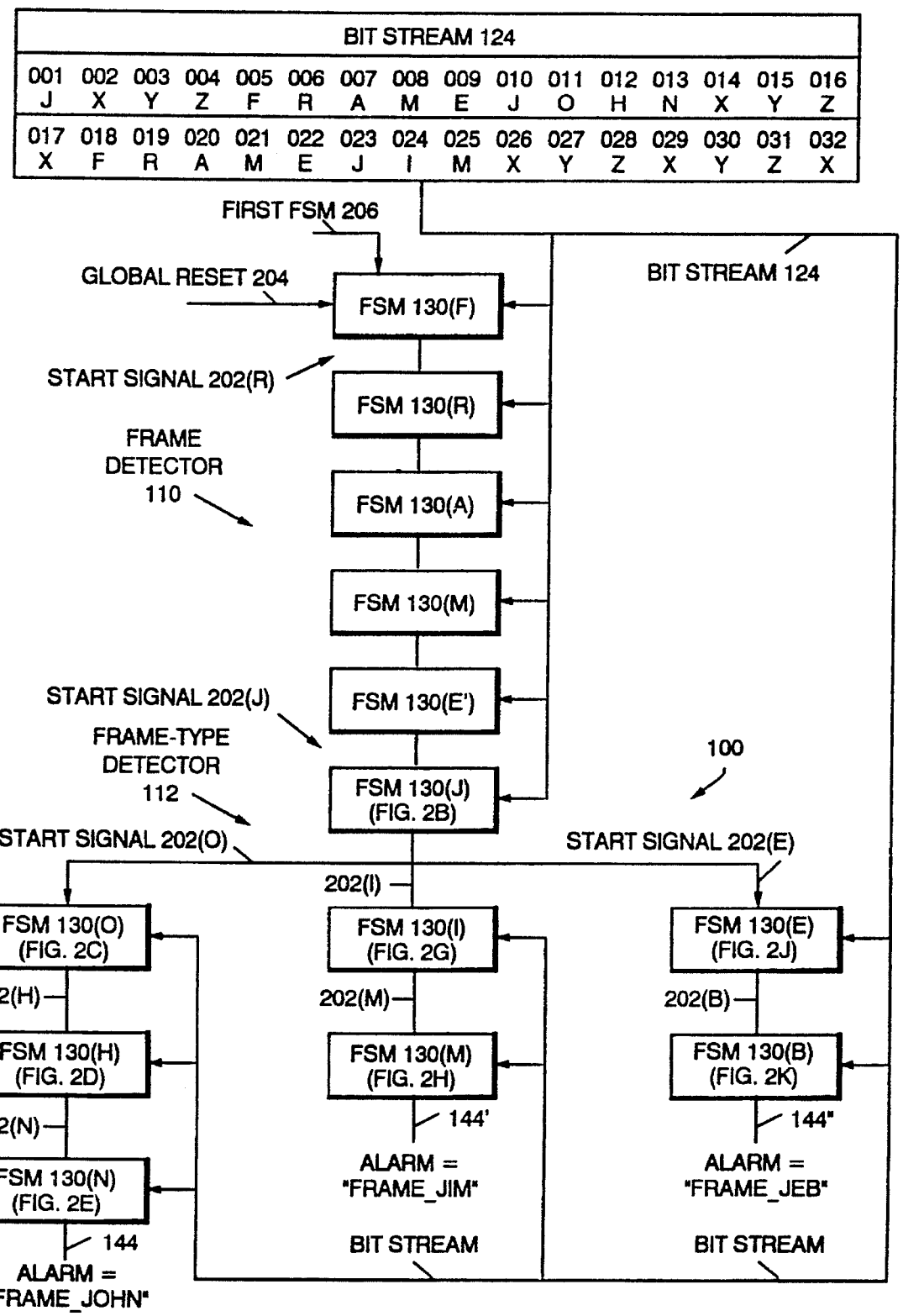
Figure 2A:
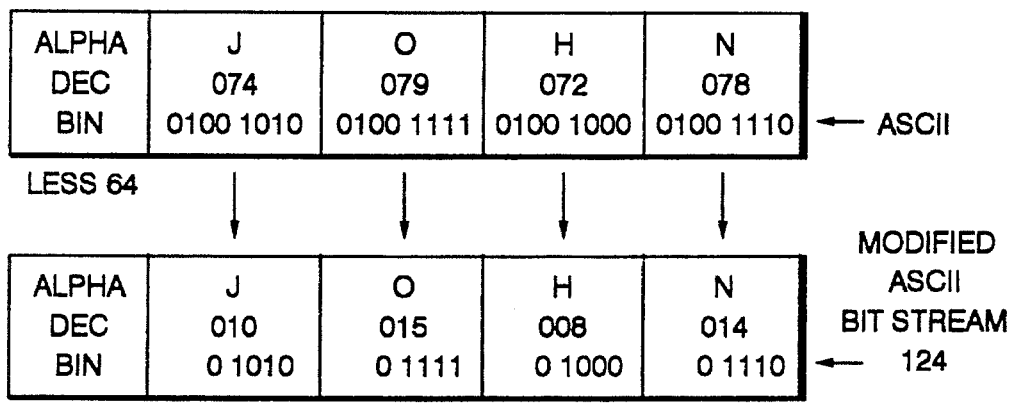
FIG. 2A illustrates an example characteristic pattern to be analyzed and its transformation into a modified bit stream.

This example is further illustrated with reference to FIG. 2A which shows the ASCII bit configuration for the character pattern "JOHN." It is modified by subtracting the numerical value of 64 from each respective ASCII representation, resulting in a modified ASCII bit stream 124 shown in FIG. 2A. It is the modified ASCII bit stream 124 which is applied to the inputs of all of the finite state machines in the array of FIGS. 1A, 1B and 1C.

Figure 2B:
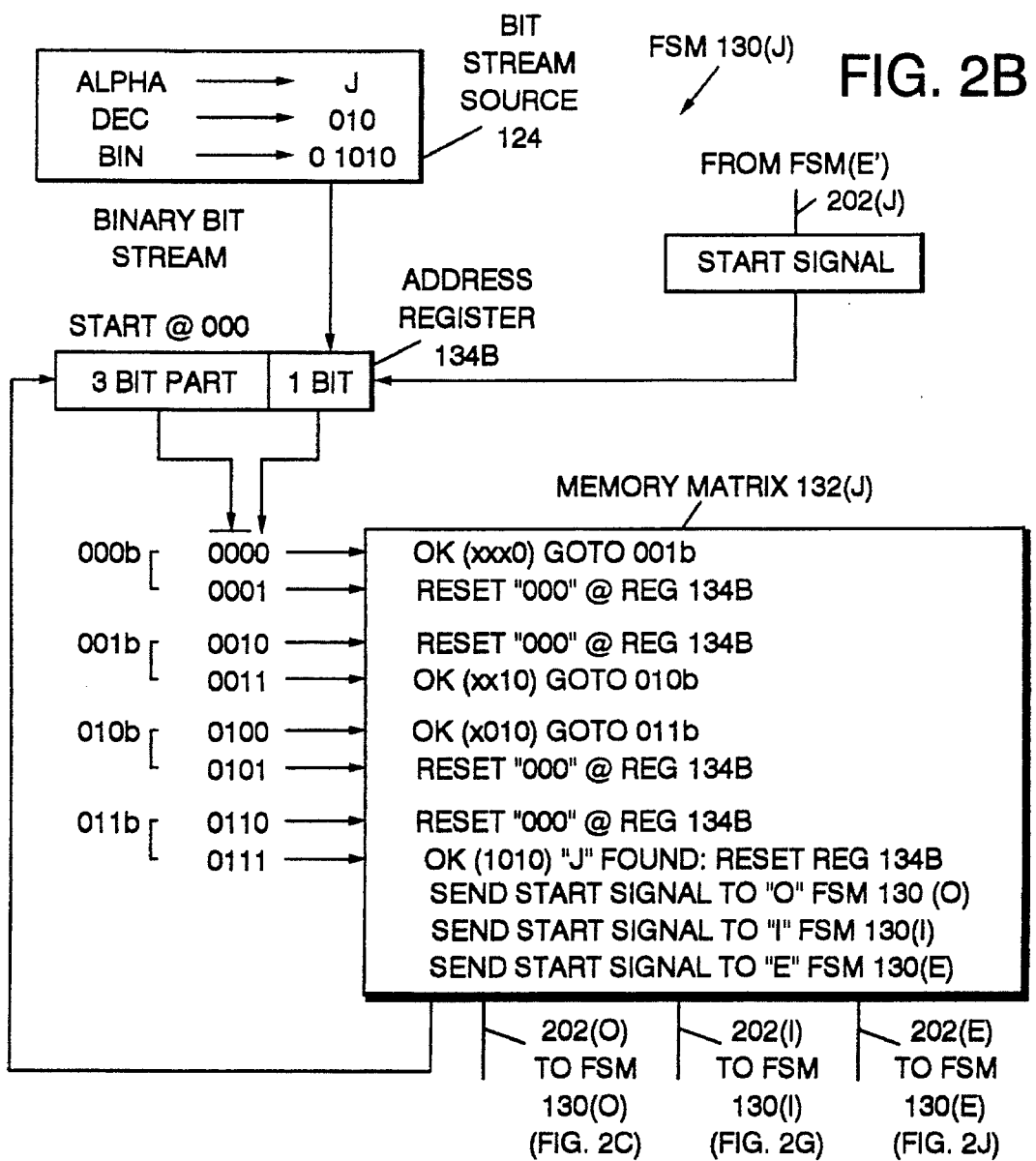
FIG. 2B illustrates the finite state machine 130(J), which is a predecessor machine configured to start the simultaneous, parallel operation of a plurality of successor finite state machines.

In FIG. 2B, the finite state machine 130(J) is illustrated. The bit stream 124 applies a one bit input to the one bit partition of the address register 134B. The three bit partition of the address register 134B contains three bit values which are derived from the data output of the memory matrix 132(J). When a start signal 202(J) is received from the FSM(E'), the three bit partition contents and the one bit partition contents are combined into a first, four bit address which is applied to the address input of the memory matrix 132(J). It is seen that if the first bit input from the bit stream's source 124 is a zero bit, then the memory matrix entry is "OK" and the data portion of the entry outputs the value 001b, the lower case b representing a blank bit position, which is input to the three bit partition of the address register 134B. The second consecutive bit input from the bit stream source 124, is combined as the least significant bit with a three bit part of the address register 134B, to derive the second four bit address which is applied to the memory matrix 132(J). In the example of FIG. 2B, the second address value is one from the bit stream source 124. This combined with the 001 value in the three bit part of register 134B, gives a value of 0011 as the second address to the memory matrix 132(J). This entry in the matrix 132(J) is represented as "OK" and the data portion of that entry is output to apply 010b to the three bit part of the address register 134B. If the third bit from bit stream 124 is zero, then the value 0100 is applied as the third address to the address input of the matrix resulting in the entry "OK." The data portion outputs a 011b to the three bit part of the address register 134B. If the fourth bit received from the bit stream 124 is a one, then the value 0111 is the fourth address applied to the matrix 132(J). The corresponding data entry says "OK," the "J" character has been found and the data output resets the register 134B. The data output also outputs three starting signals. The first starting signal is 202(O) to the FSM 132(O) seen in FIG. 2C. The second starting signal output by the matrix 132(J) is 202(I) which goes to the FSM 130(I) in FIG. 2G. The third output signal is 202(E) which goes to the FSM 130(E) in FIG. 2J. Thus it is seen that by satisfying the FSM 130(J) by applying the bit stream sequence 0101 (starting with the least significant bit as zero), to the FSM 130(J), the termination signals output from the matrix 132(J) are the three starting signals described.

Figure 2C:
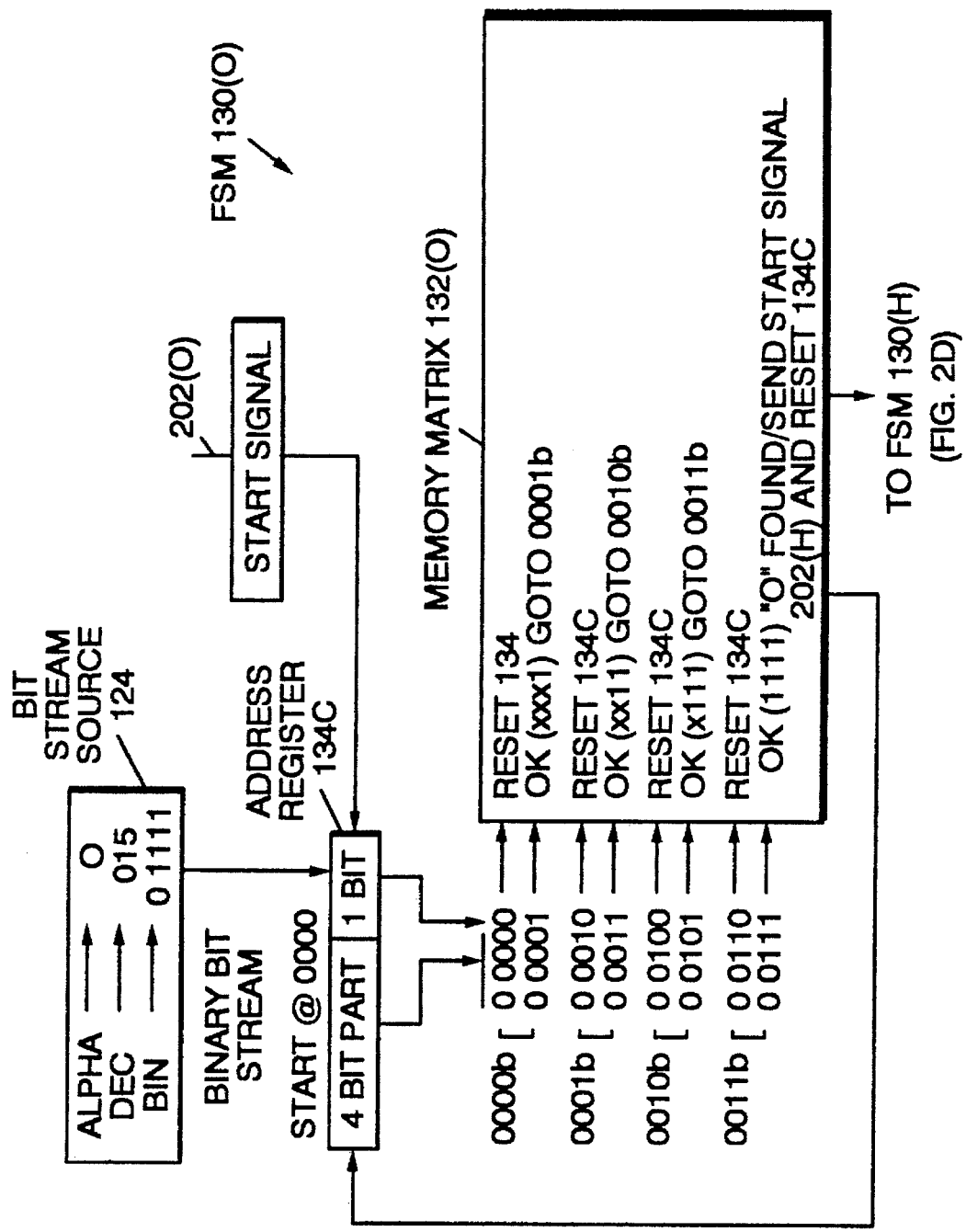
FIG. 2C is an illustration of finite state machine 130(O).

FIG. 2C shows the FSM 130(O) receives the starting signal 202(O). If the memory matrix 132(O) is satisfied by receiving an expression 1111 from the bit stream source 124, then it outputs to the FSM 130(H) the starting signal 202(H).

Figure 2D:
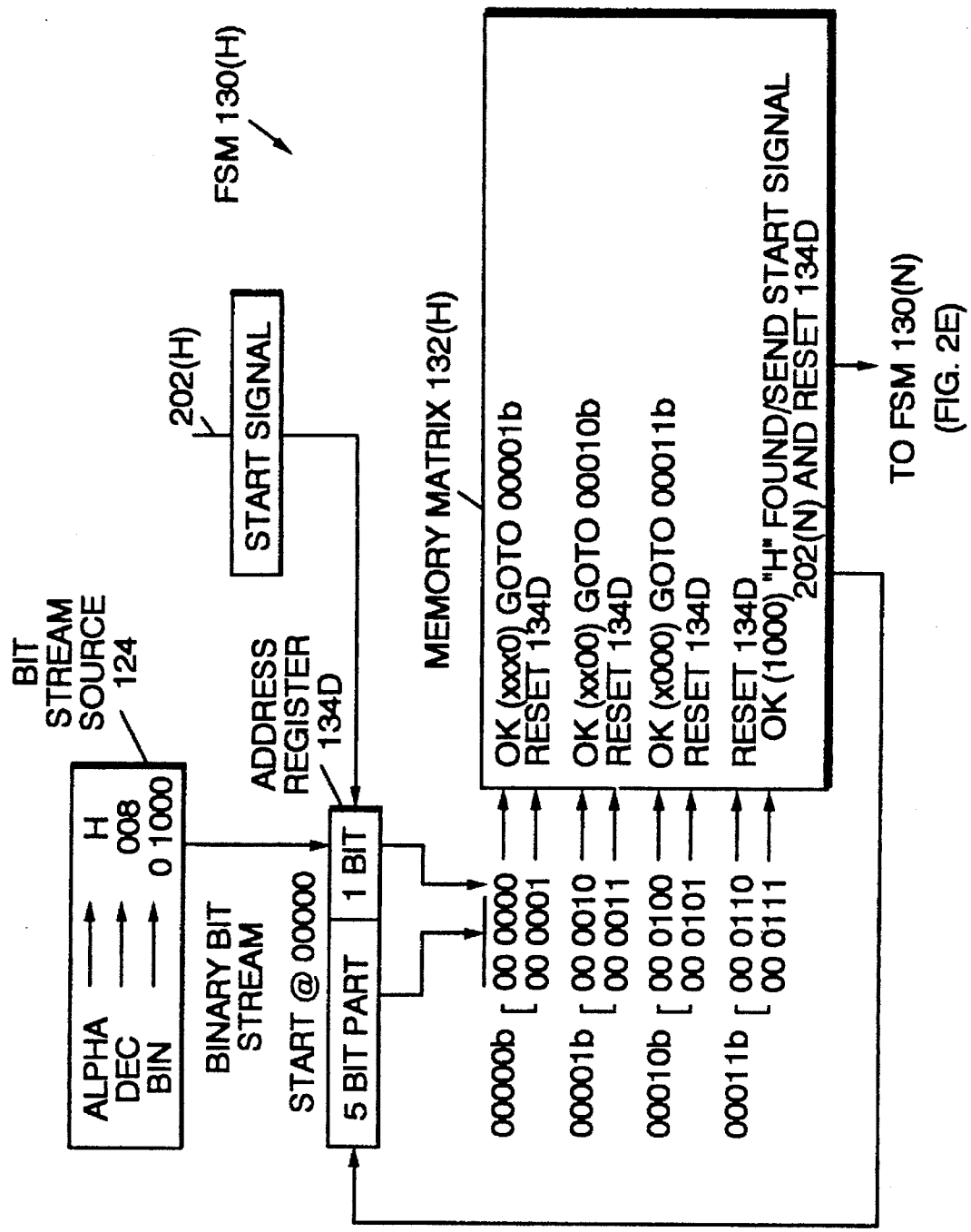
FIG. 2D illustrates finite state machine 130(H).

FIG. 2D illustrates the FSM 130(H), which receives the starting signal 202(H) and examines the input bit stream 124, for the pattern "1000." If this pattern is successfully detected, then the memory matrix 132(H) outputs the start signal 202(N) to the FSM 130(N).

Figure 2E:
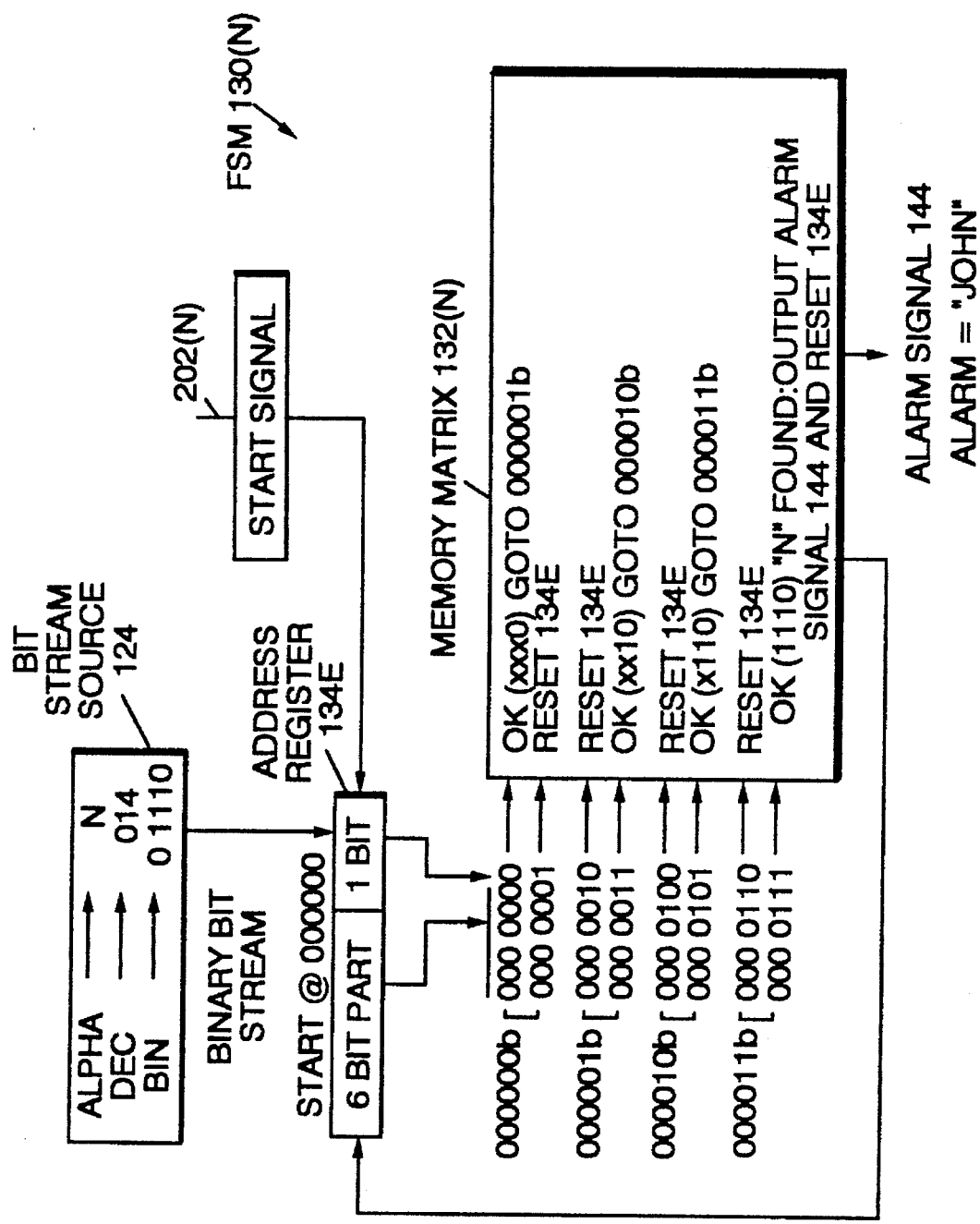
FIG. 2E illustrates finite state machine 130(N).

FIG. 2E shows the FSM 130(N) which receives the starting signal 202(N) and examines the bit pattern "1110" from the bit stream source 124. If the memory 132(N) is satisfied by detecting the pattern, then it outputs an output alarm signal 144 with the alarm equal "JOHN." It also resets the address register 134E. The alarm signal 144 indicates that a successful detection has been made of the pattern "JOHN" which follows the pattern "FRAME," detected as described in connection with FIG. 2.

Figure 2F:
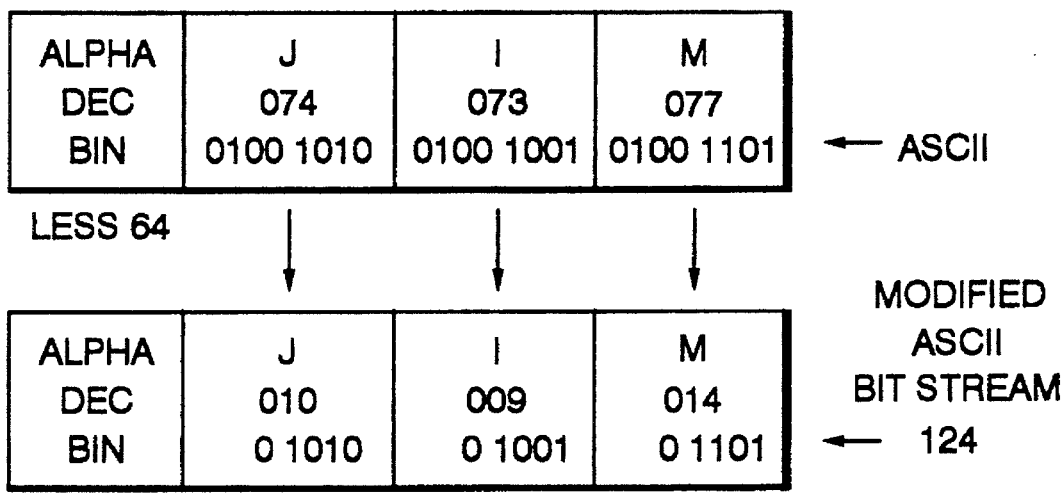
FIG. 2F illustrates a second occurring pattern to be analyzed and its modified bit stream.

To further explain the example for the character sequence "JIM," FIG. 2F shows the ASCII expression for the character sequence and the modified ASCII bit stream 124 which subtracts the value 64 from each ASCII expression. The corresponding modified bit stream 124 is then applied to each respective finite state machine 130(I) and 130(M). FIG. 2G shows the FSM 130(I) which receives the start signal 202(I) and searches for the pattern "1001." If the memory matrix 132(I) successfully detects the pattern, then it outputs a start signal 202(M) and it resets the register 134G.

Figure 2I:
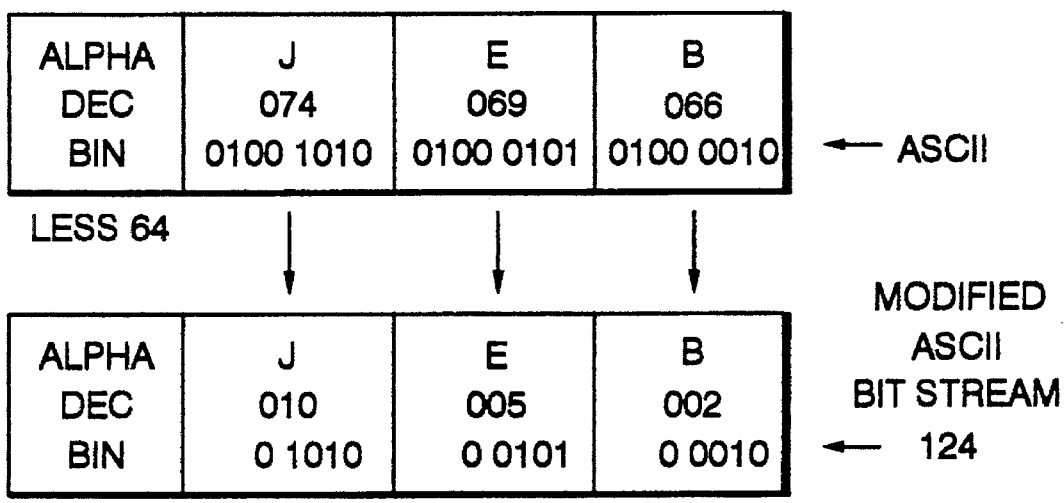
FIG. 2I is still another example of a data pattern and its corresponding transformation into a modified bit stream.
Figure 2H:
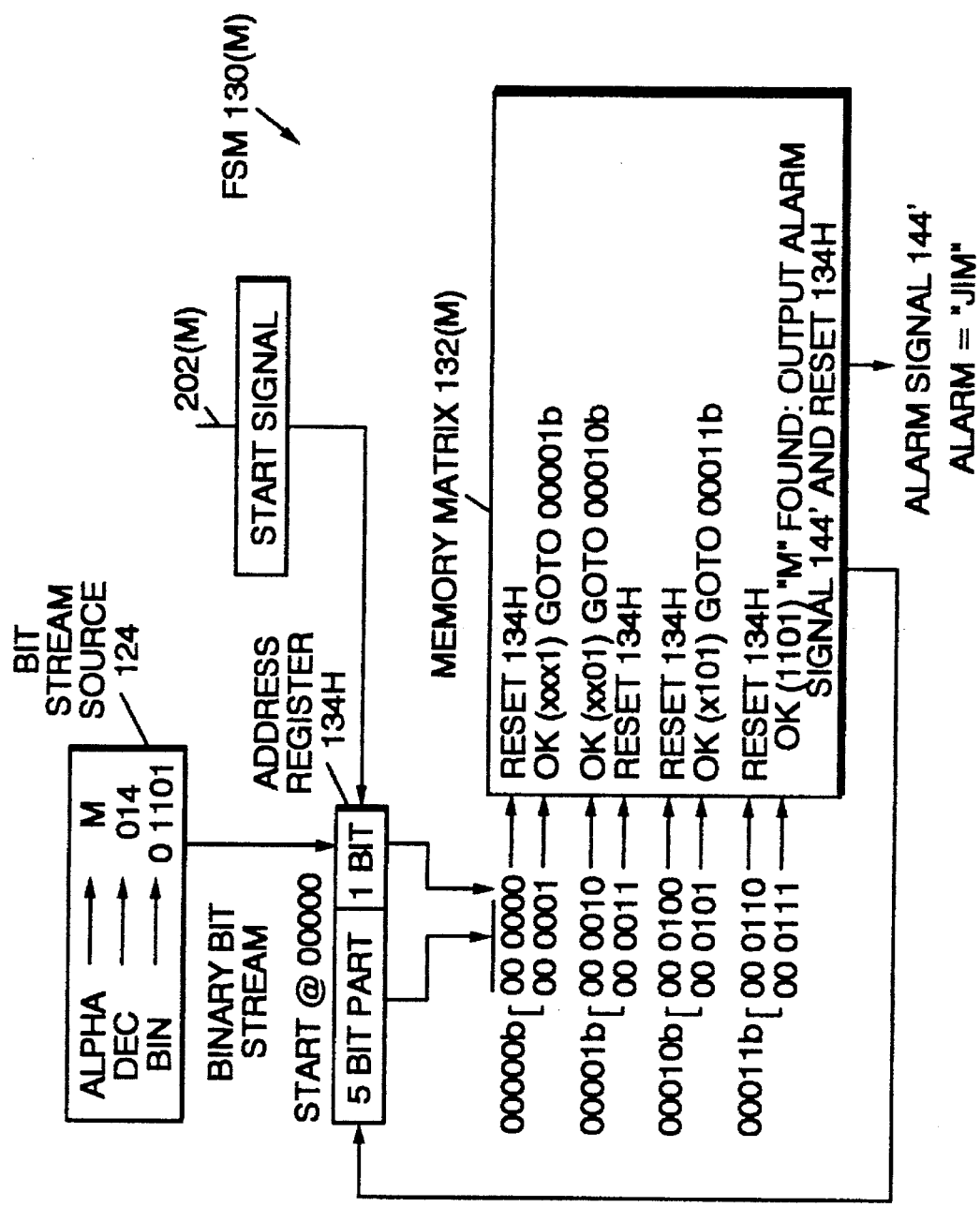
FIG. 2H illustrates the finite state machine 130(M).

FIG. 2H shows the FSM 130(M) which receives the start signal 202(M) and searches for the pattern "1101." If the memory matrix 132(M) successfully detects the pattern, then the matrix outputs an alarm signal 144' with the alarm equal to "JIM." This indicates that the finite state machine array has detected the character pattern "FRAME," which is followed by the character pattern "JIM."

FIG. 2I further illustrates the example with regard to the second character pattern "JEB." FIG. 2I shows the ASCII expression for "JEB," and the modified ASCII bit stream 124, where the value of 64 is subtracted from each ASCII value.

Figure 2J:
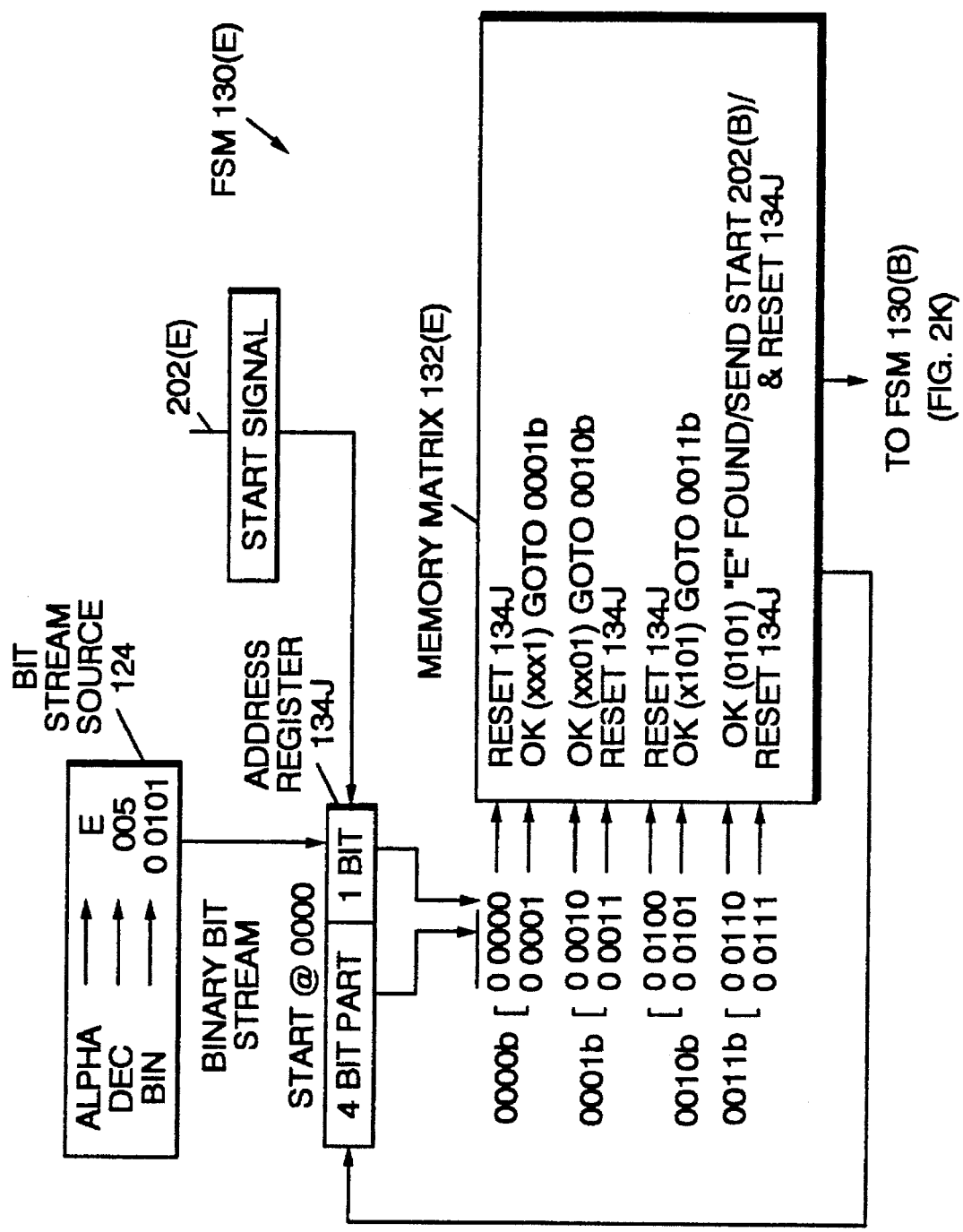
FIG. 2J illustrates the finite state machine 130(E).

FIG. 2J shows the FSM 130(E), which receives the starting signal 202(E) and searches for the pattern "0101." If the memory matrix 132(E), successfully detects this pattern, it outputs a start signal 202(B), and resets the register 134J.

Figure 2K:
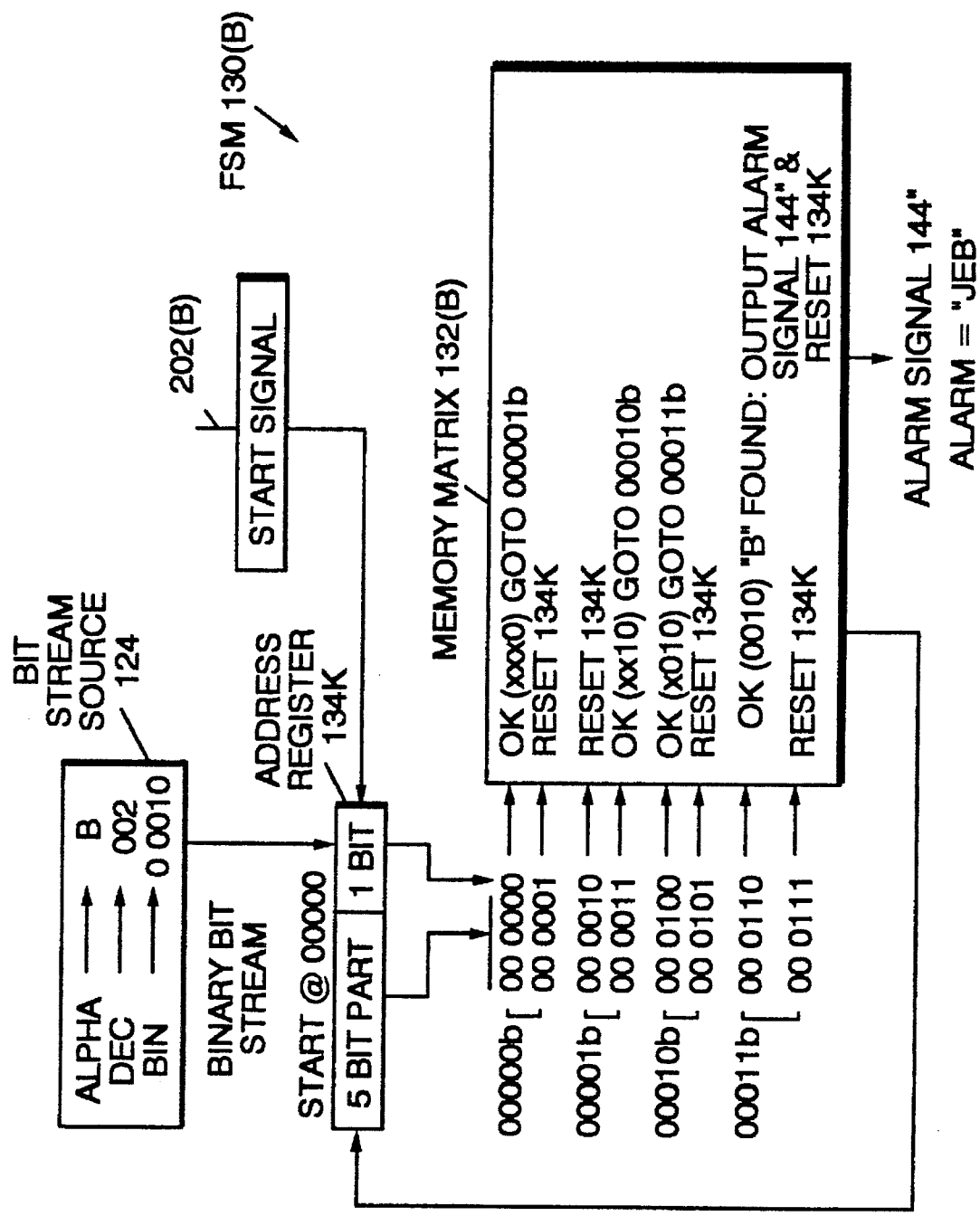
FIG. 2K illustrates the finite state machine 130(B).

FIG. 2K illustrates the FSM 130(B) which receives the start signal 202(B), for the bit pattern "0010." If the memory matrix 132(B), successfully detects the pattern, it outputs the alarm signal 144", equal to the alarm equal "JEB." It also resets the register 134K. The alarm "JEB" indicates that the FSM array has successfully detected the character pattern "FRAME," followed by the character pattern "JEB."

It is seen that three parallel simultaneous independent finite state machine sequences are started by the finite state machine FSM 130(J). This feature of the invention increases the speed of detection of the characteristic data pattern, decreases the number of component parts necessary to perform such detection, and is an effective, realtime control for high speed data networks.

A first component pattern such as "FRAME" need not be followed immediately by a second component pattern such as "JOHN." If there is a counter connected to the address register 134B in FIG. 2B, which counts the number of reset signals following the start signal 202(J), then a maximum number M of "filler bits" can be preprogrammed in the counter. This would enable a quantity of from zero to M filler bits to separate the first component "FRAME" from the second component "JOHN." If more than M filler bits are received after the start signal 202(J), then the start signal register 202(J) is reset. In this case, only the successful detection of a second "FRAME" component and the receipt of a second start signal 202(J), would turn on FSM 130(J), again.

Figure 3A:
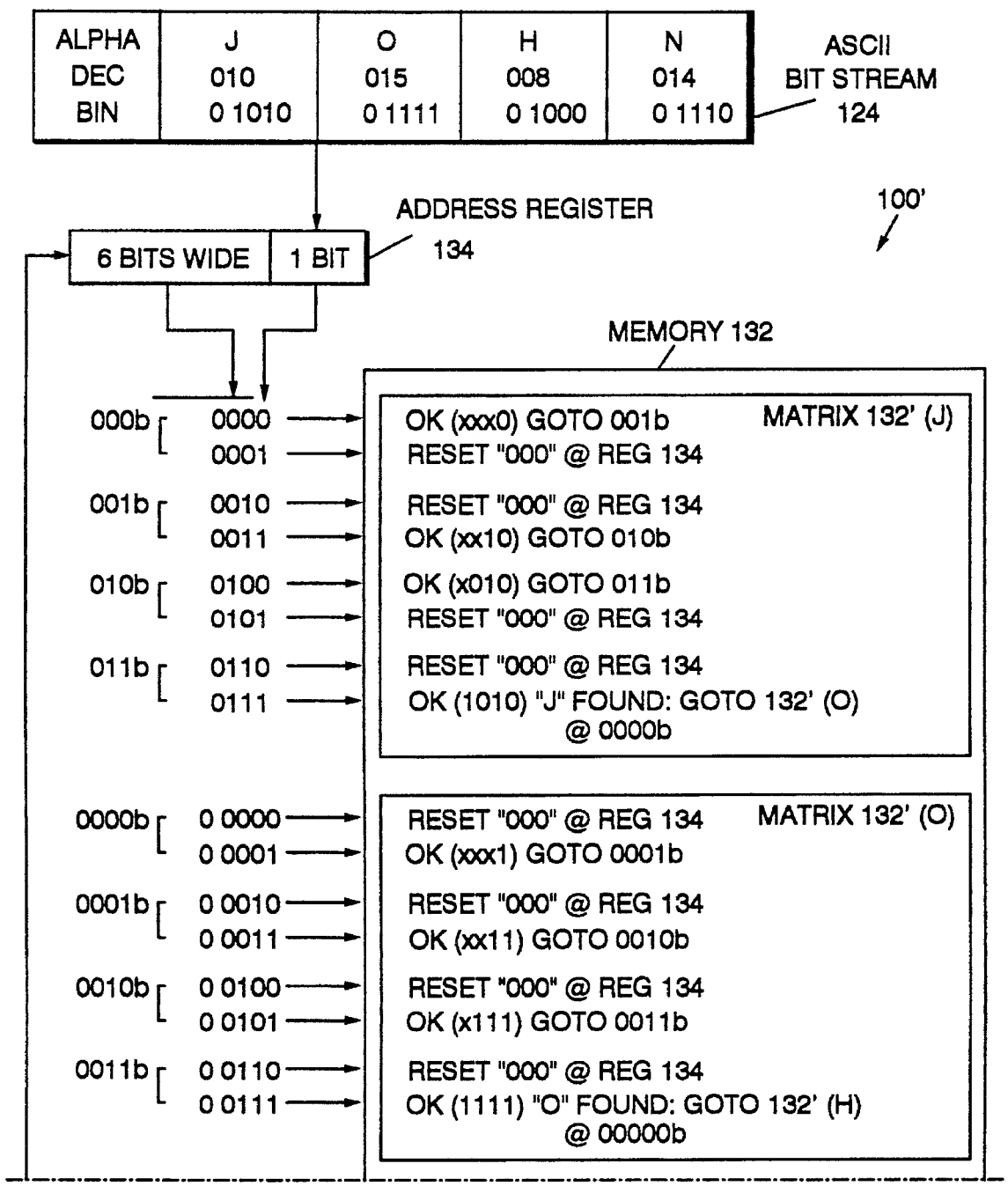
FIG. 3 illustrates an alternate embodiment of the invention capable of performing a single, sequential multiple finite state machine sequence.
Figures 3, 3B:
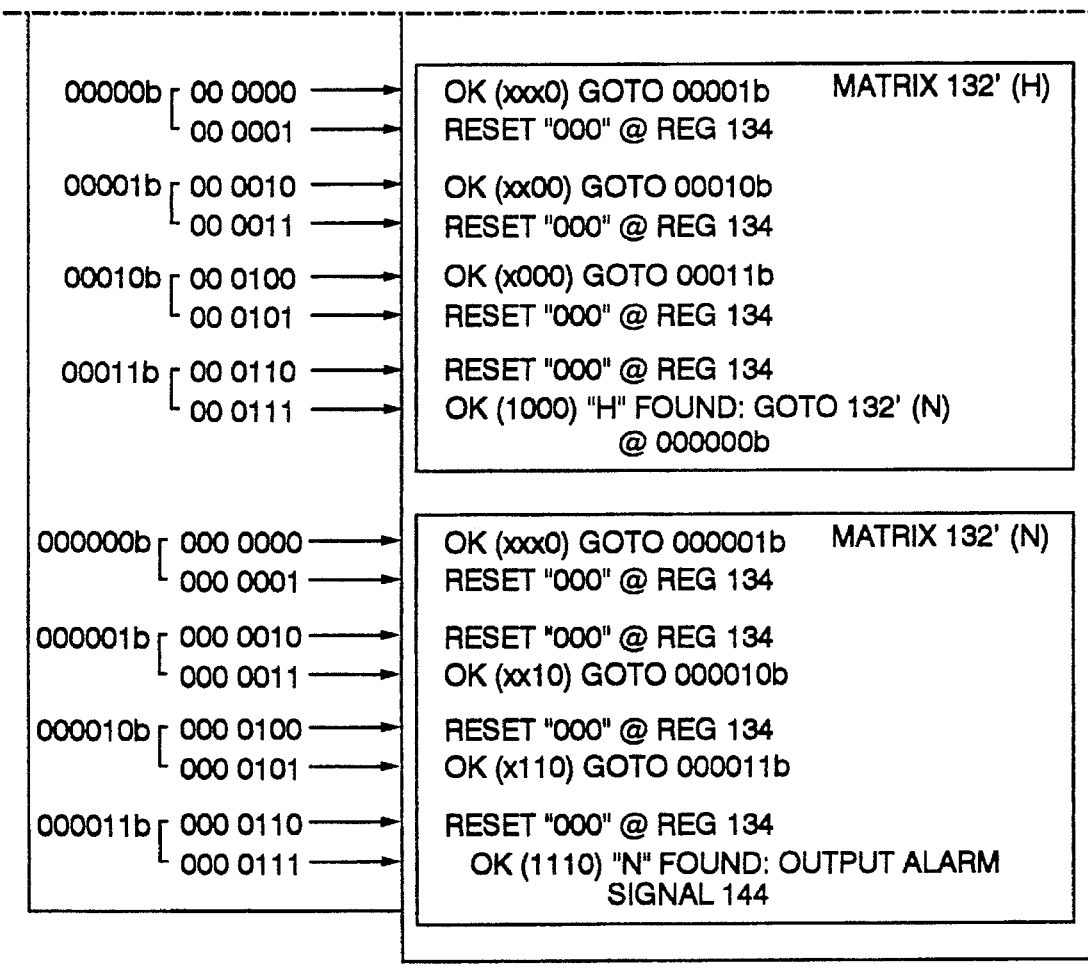

Reference to FIG. 3 illustrates a subsidiary feature of the invention which is the provision of a sequence of finite state machines which perform a single sequential pattern testing operation. The ASCII bit stream 124 is applied to the finite state machine array 100' in FIG. 3. The address register 134 receives the one bit from the bit stream 124, and a six bit wide data output from the memory 132. The memory 132 includes the matrix 132'(J), 132'(O), 132'(H), and 132'(N). The address register 134', using the seven bit wide address value derived from the one bit from the bit stream 124 and the six bits from the data output from the memory 132, sequentially propagates itself through the four matrices and will output an alarm signal 144 if the character pattern "JOHN" is detected. It is seen that by including the four matrices within the same address space of the memory 132, a single sequential analysis of a single bit pattern can be quickly completed. However, multiple, parallel, independent analyses of several different bit patterns cannot be accomplished, as was in fact accomplished by the parallel FSM adaptive monitor 100 discussed above.

Figure 4A:
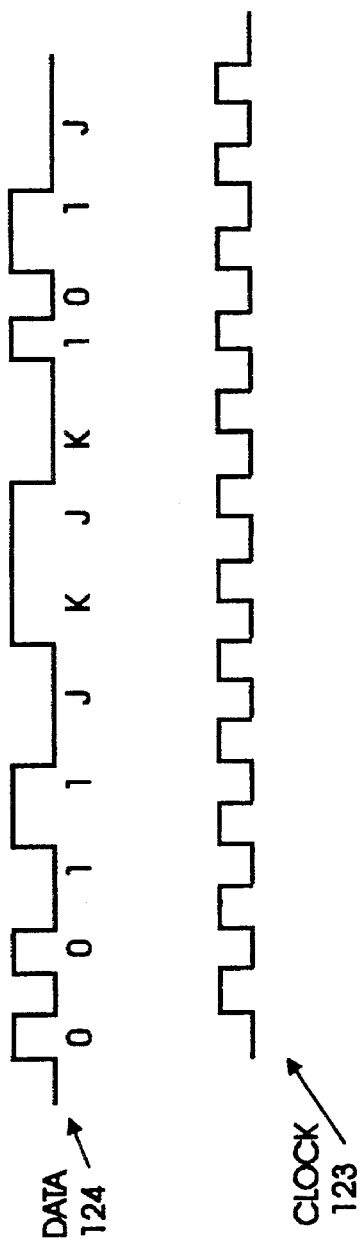
FIG. 4A is a timing diagram showing Manchester coding in an IEEE 802.5 token ring protocol.

FIG. 4A shows a timing diagram for Manchester coding in the IEEE 802.5 token ring protocol. Waveform 124 is the Manchester encoded data, which is characterized by zero transitions which normally occur at the beginning of a clock period and one transitions that occur at the midpoint, with respect to the clock waveform 123. The J waveform and the K waveform shown in the data 124, are intentional coding violations in accordance with the Manchester coding scheme described in the 802.5 protocol. Collectively, the four symbols J, K, 0, 1 represent a four symbol or four state encoding of the data 124.

Figure 4B:
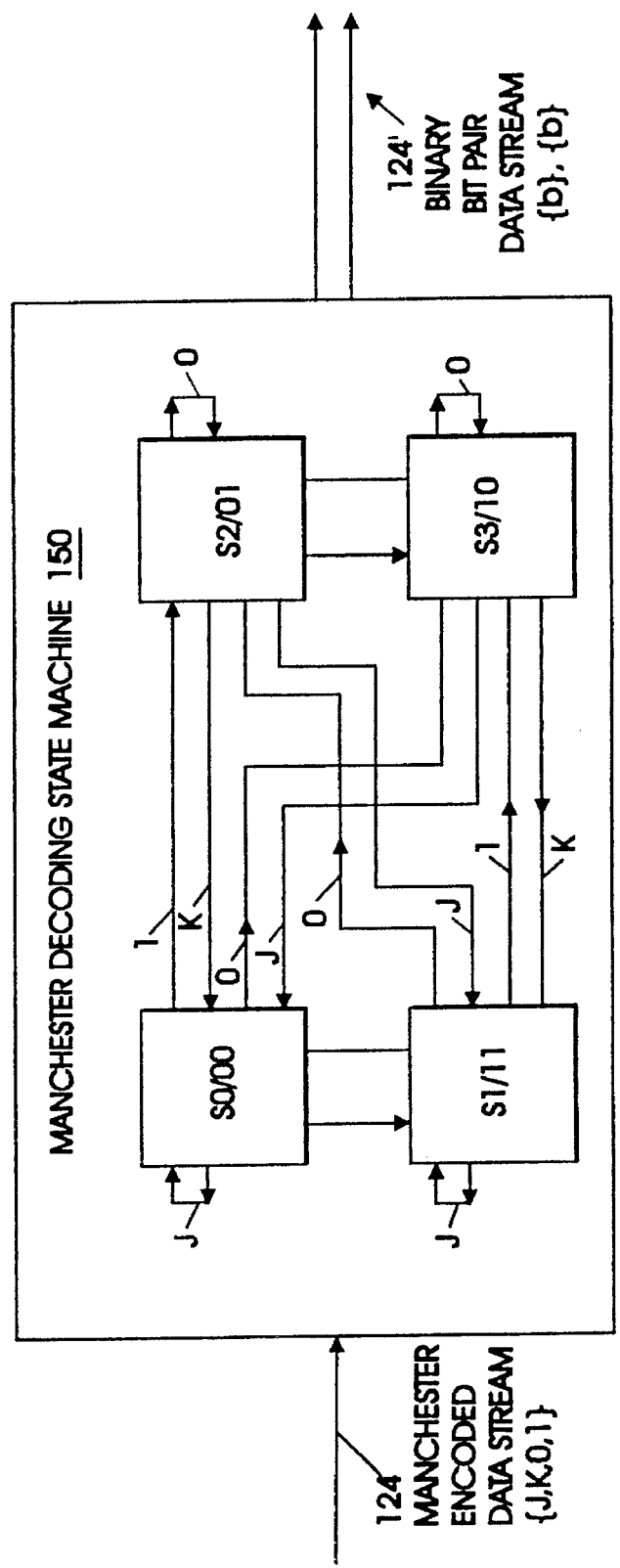
FIG. 4B is an schematic diagram of a Manchester decoding state machine.

FIG. 4B illustrates a Manchester decoding state machine 150, which receives the Manchester encoded data stream 124, and converts it into a pair of binary bits 124' for each respective J, K, 0 or 1 symbol received on line 124. The Manchester decoding state machine 150 operates as is described in the IEEE 802.5 token ring protocol. There are four states provided, S0, S1, S2 and S3. The transition from one state to another in the machine 150 depends upon the consecutive symbols received on the line 124. FIG. 4C illustrates the Manchester decoding table 150', which explains the relationship between a present state in the machine 150, and the next state, in response to the receipt of the next symbol on the line 124, and the output of the corresponding binary bit pair on the line 124'.

FIG. 4D is an example finite state machine sequence for the IEEE 802.5 token ring, in accordance with the invention. The Manchester decoder 150, has the Manchester encoded data stream 124 input to it, and it outputs the binary bit pair data stream 124'. The starting delimiter finite state machine 130(SD), which is shown in greater detail in FIGS. 5A, 5B and 5C, has applied to its input the binary bit pair data stream 124'. In accordance with the invention, the starting delimiter finite state machine 130(SD) has two starting signal outputs, the first going to the token finite state machine 30(T), and the second going to the ending delimiter abort (EDAB) FSM 130(EDAB). The token finite state machine 130(T) is shown in greater detail in FIGS. 6A, 6B and 6C. The ending delimiter abort finite state machine 130(EDAB), is shown in greater detail in FIGS. 8A, 8B and 8C. Still further in accordance with the invention, the output of the token finite state machine 130(T) is a starting signal which is applied to the ending delimiter token (EDT) finite state machine 130(EDT), which is shown in greater detail in FIGS. 7A, 7B and 7C.

Still further in accordance with the invention, FIG. 4E shows an example information collection architecture for the IEEE 802.5 token ring. In FIG. 4E, the Manchester decoder 150 receives the Manchester encoded data stream 124, and outputs the binary bit pair data stream 124' to the starting delimiter finite state machine 130(SD). The interconnections of the starting delimiter finite state machine 130(SD), the token finite state machine 130(T), the token end delimiter finite state machine 130(EDT) and the abort end delimiter finite state machine (EDAB), are the same as was described for FIG. 4D. In accordance with the invention, when the starting delimiter at FSM 130(SD) successfully detects the pattern for the starting delimiter, it outputs its starting signal not only to the token FSM 130(T) and the abort end delimiter FSM 130(EDAB), but also to the starting delimiter counter 170(SD). The starting delimiter counter will count the number of occurrences of a starting delimiter received from the data communications network 124. The output of the starting delimiter counter 170(SD) is applied to the event vector register 180. The event vector register 180 was previously described in the copending patent applications by Paul Hershey, et al. and by John Waclawsky, et al. cited above. The event vector constructed in the event vector register 180, is output to the information collection architecture 190, for monitoring and control of the data communications network 124.

Further in accordance with the invention, the abort end delimiter FSM 130(EDAB) will provide an output to the abort end delimiter counter 170(EDAB), when the FSM 130(EDAB) successfully detects an abort end delimiter (EDAB). Similarly, the token finite state machine 130(T), which outputs a starting signal to the token end delimiter finite state machine 130(EDT), will also apply that signal to the input of the token counter 170(T). Similarly, the token end delimiter finite state machine 130(EDT), will output a signal to the token end delimiter counter 170(EDT), when it successfully detects a token end delimiter (EDT). In accordance with the invention, the event vector register 180, will assemble the counted occurrences of the starting delimiter output from the counter 170(SD), the abort end delimiter output from the counter 170(EDAB), the tokens output from the counter 170(T), and the token end delimiters output from the counter 170(EDT), assembling them into an event vector. The event vector is then output to the information collection architecture 190, as was described in the above referenced Paul Hershey, et al. and John Waclawsky, et al. patent applications.

FIG. 5A is a state diagram of the starting delimiter finite state machine FSM 130(SD). There it is seen that the inputs are the serial bit stream 124 (labeled I) and the global reset 204 (labeled RES). The output of the finite state machine of FIG. 5A is the starting signal "SD" which is the two starting signals sent to the finite state machines FSM 130(T) and FSM 130(EDAB). Table 1 defines the reference symbols and Table 2 is the state stable for FIG. 5A.

Figure 5B:
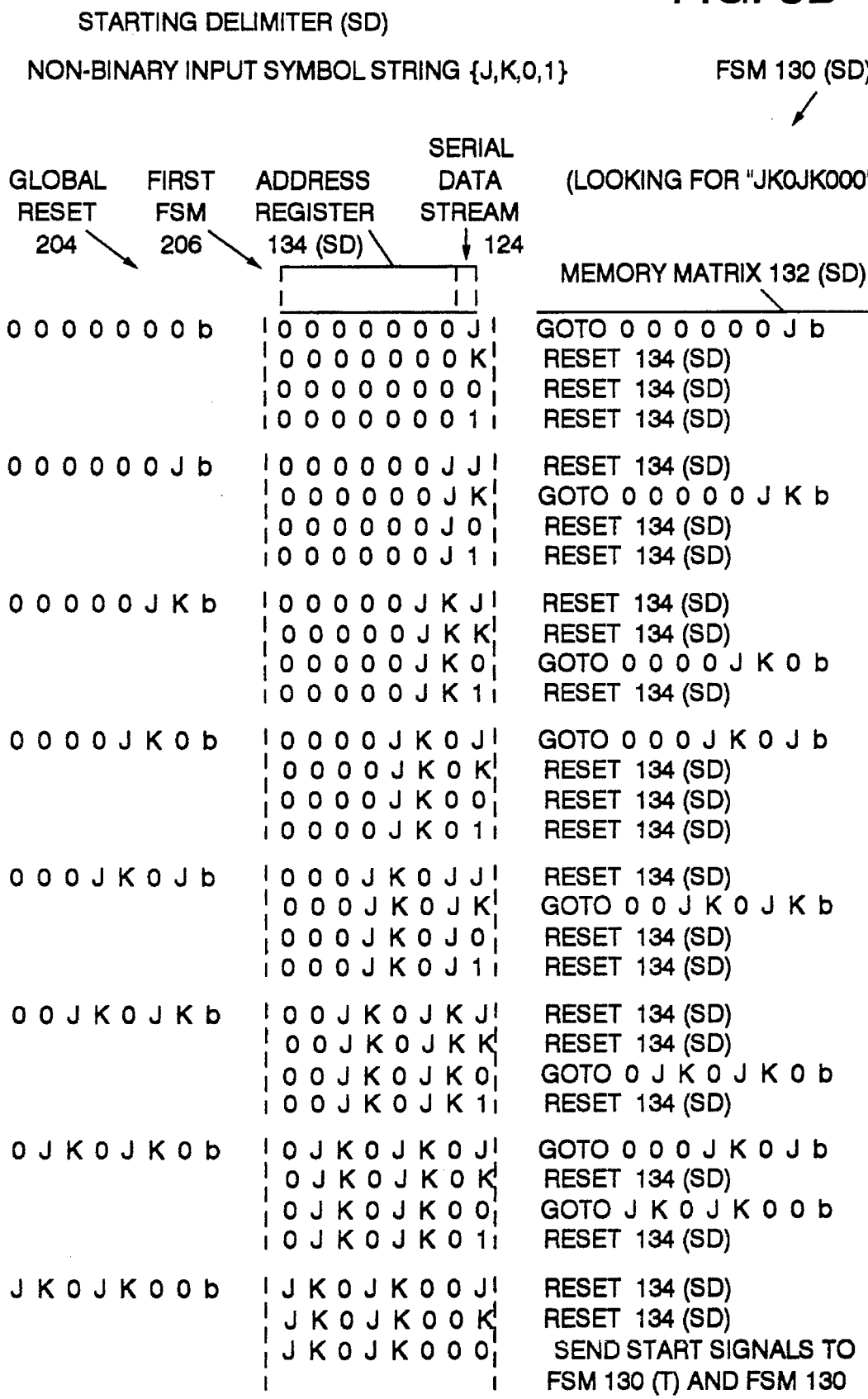
FIG. 5B illustrates the starting delimiter machine of FIG. 5A, using a non-binary input symbol string.

FIG. 5B shows the starting delimiter finite state machine FSM 130(SD) using the non-binary input symbol string directly applied as the Manchester encoded data stream from line 124. It is seen since the starting delimiter finite state machine is the first finite state machine applied to the input data stream, it includes a global reset input 204 and a first finite state machine designation 206. The address register 134(SD) receives the serial data stream 124 and applies the combined symbols as the address input to the memory matrix 132(SD).

FIG. 5C illustrates the starting delimiter finite state machine FSM 130(SD)', which receives the binary bit pair data stream 124' output from the Manchester decoding state machine 150, to perform finite state machine operations using a binary numbering system. The global reset 204 and the first FSM designation 206 are applied as shown in FIG. 5C. The address register 134(SD)' receives the serial binary bit pairs 124' and assembles the binary address expressions which are applied to the memory matrix 132(SD)'. This results in the detection of the starting delimiter SD which results in sending the start signals to the finite state machines 130(T) and 130(EDAB).

Figure 6A:
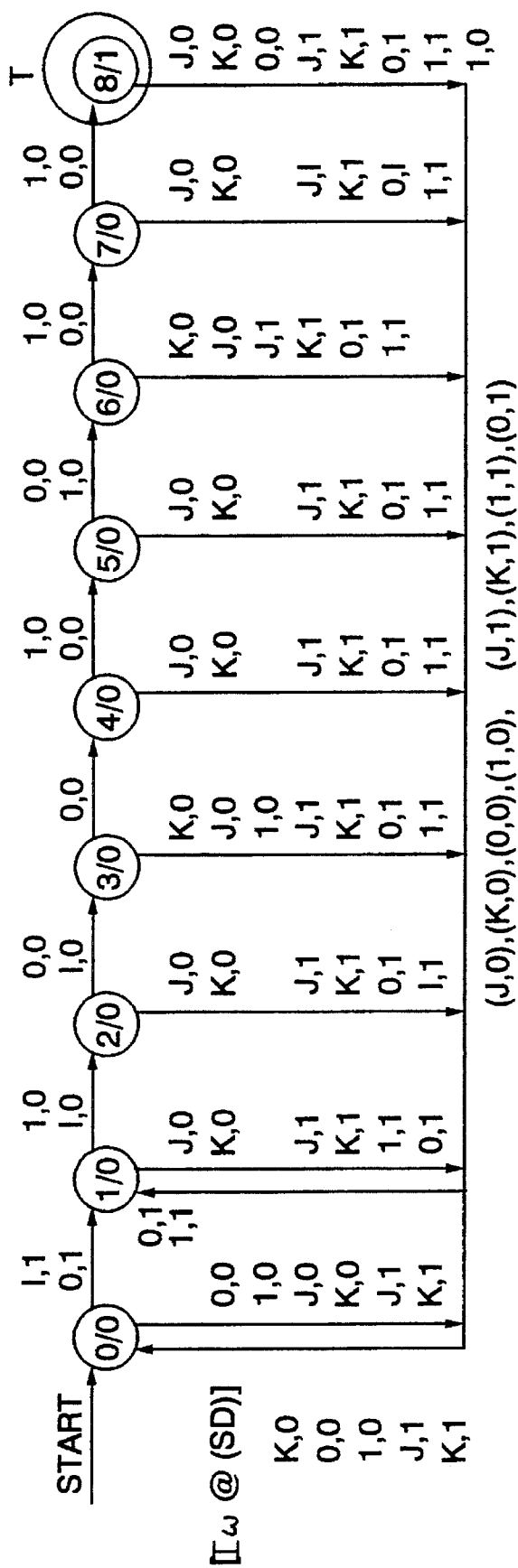
FIG. 6A is a state diagram of a token detecting finite state machine.
Figure 6B:
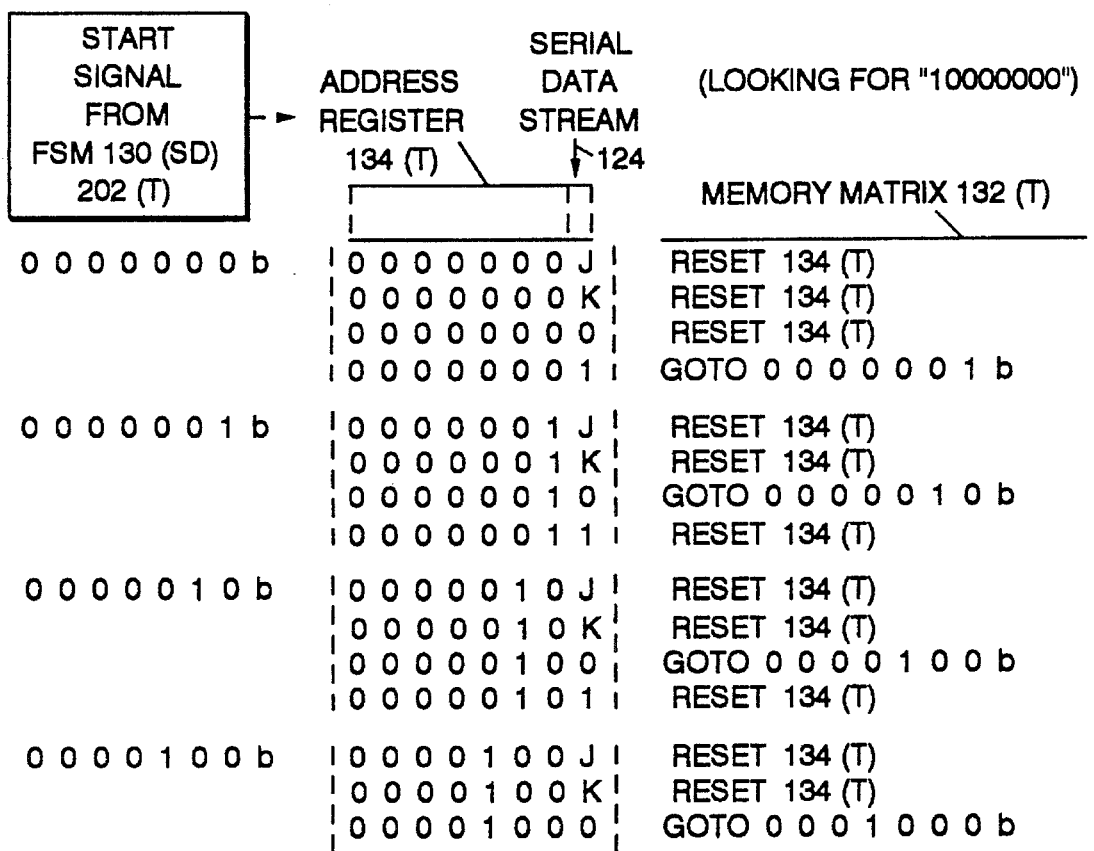
FIG. 6B illustrates the token detecting finite state machine of FIG. 6A, for a non-binary input symbol string.
Figure 6B:
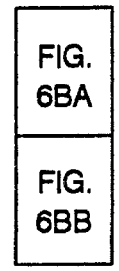
Figure 6C:
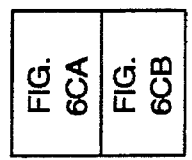
FIG. 6C illustrates the token detecting finite state machine of FIG. 6A, with a binary bit pair representing non-binary input symbols in the input string.

FIG. 6A illustrates the state diagram for the token finite state machine. The input (labeled I) to the finite state machine FSM 130(T) shown in FIG. 6A is the input data stream 124 and the starting signal (labeled SD) from the starting delimiter FSM 130(SD). The output of the token detecting finite state machine of FIG. 6A is the token output signal T. Table 1 defines the reference symbols and Table 4 is the state table for FIG. 6A. FIG. 6B shows the token detecting finite state machine 130(T) which receives the non-binary input symbol string which is the Manchester encoded data stream 124. The address register 134(T) and the serial data stream 124 are combined to form a symbol string address which is applied to the memory matrix 132(T). After the starting signal is received from the finite state machine FSM 130(SD) in the register 202(T), the successful detection of a token in the data stream 124 will result in outputting a starting signal to the finite state machine 130(EDT). FIG. 6C shows the finite state machine 130(T)' which receives the binary bit pairs representing the nonbinary input symbol string on line 124' from the Manchester decoder 150. The address register 134(T)' combines the address with the serial binary bit pairs 124' to apply a binary address expression to the memory matrix 132(T)'. The successful recognition of a token in the serial binary bit patterns on 124', results in sending start signals to the finite state machine 130(EDT).

Figure 7A:
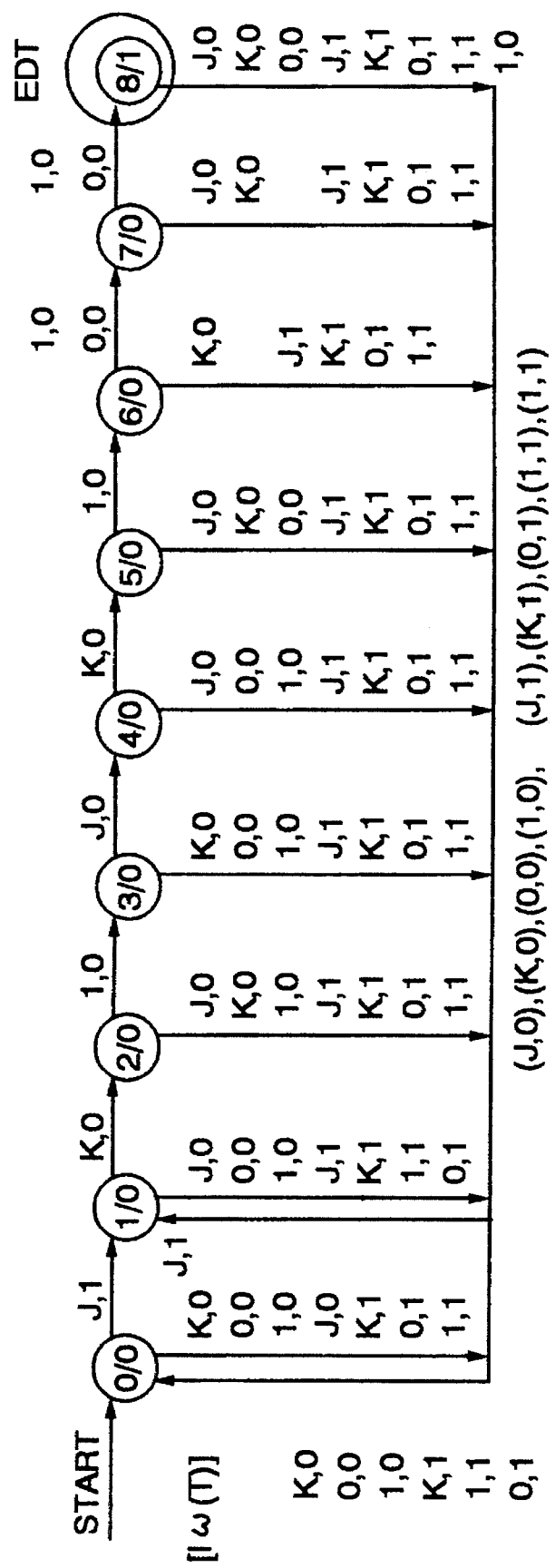
FIG. 7A illustrates the state diagram for the token ending delimiter detection finite state machine.

FIG. 7A shows a state diagram for the ending delimiter token detection finite state machine FSM 130(EDT). It has an input (labeled I) connected to the serial data stream 124 and it receives the starting signal (labeled T) from the token FSM 130(T). It outputs the ending delimiter token detection signal EDT. Table 1 defines the reference symbols and Table 5 is the state table for FIG. 7A.

Figure 7B:
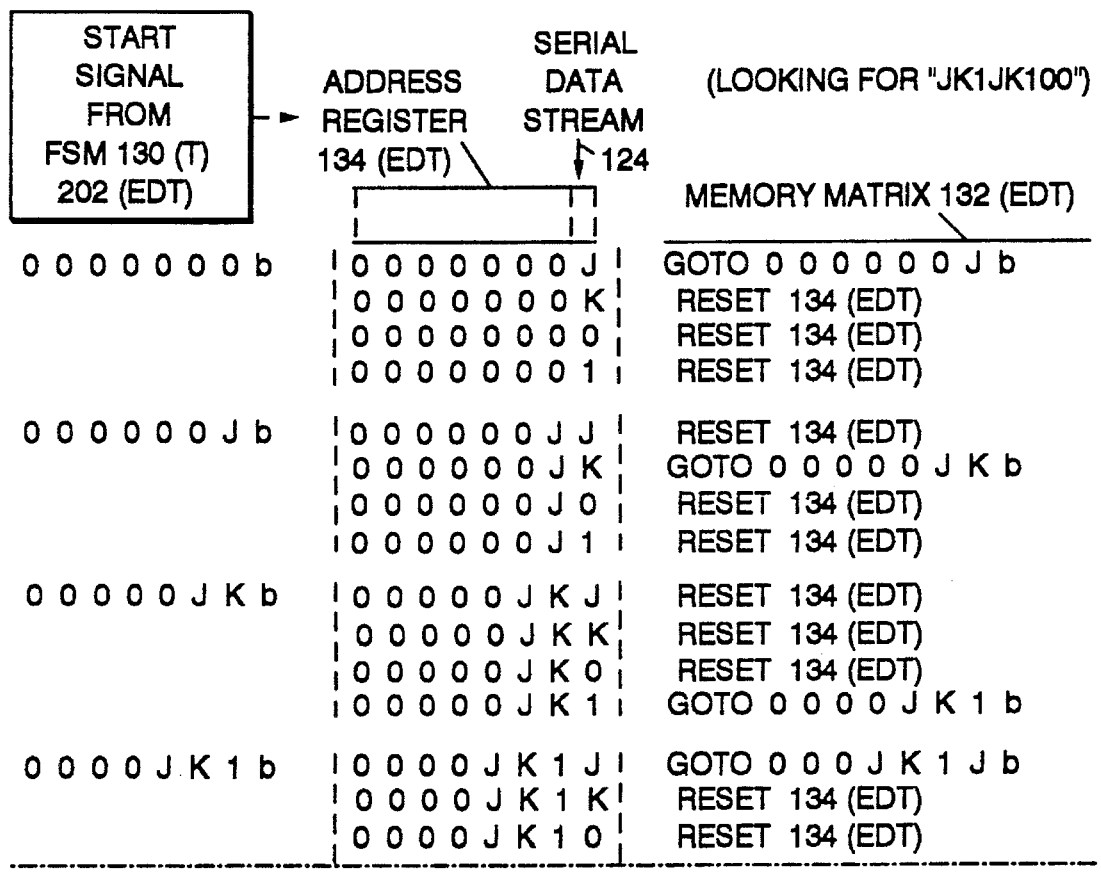
FIG. 7B illustrates the ending delimiter token finite state machine of FIG. 7A, for non-binary input symbol strings.
Figure 7B:
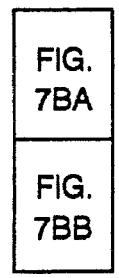

FIG. 7B illustrates the ending delimiter token detecting finite state machine 130(EDT), for a non-binary input symbol string which is the Manchester encoded data stream on line 124. When it receives the starting signal from FSM(T) in the register 202(EDT), the address register 134(EDT) combines serial data stream 124 with the symbol expression in the address register to form the multi-symbol address applied to the memory matrix 132(EDT). The successful detection of the ending delimiter token EDT will result in sending a starting signal to the next selected finite state machine. A typical destination for the starting signal output from the ending delimiter token detection finite state machine is the starting delimiter detecting finite state machine 130(SD). This is because in many applications the next valid message on the token ring bus will be another starting delimiter.

Figure 7C:
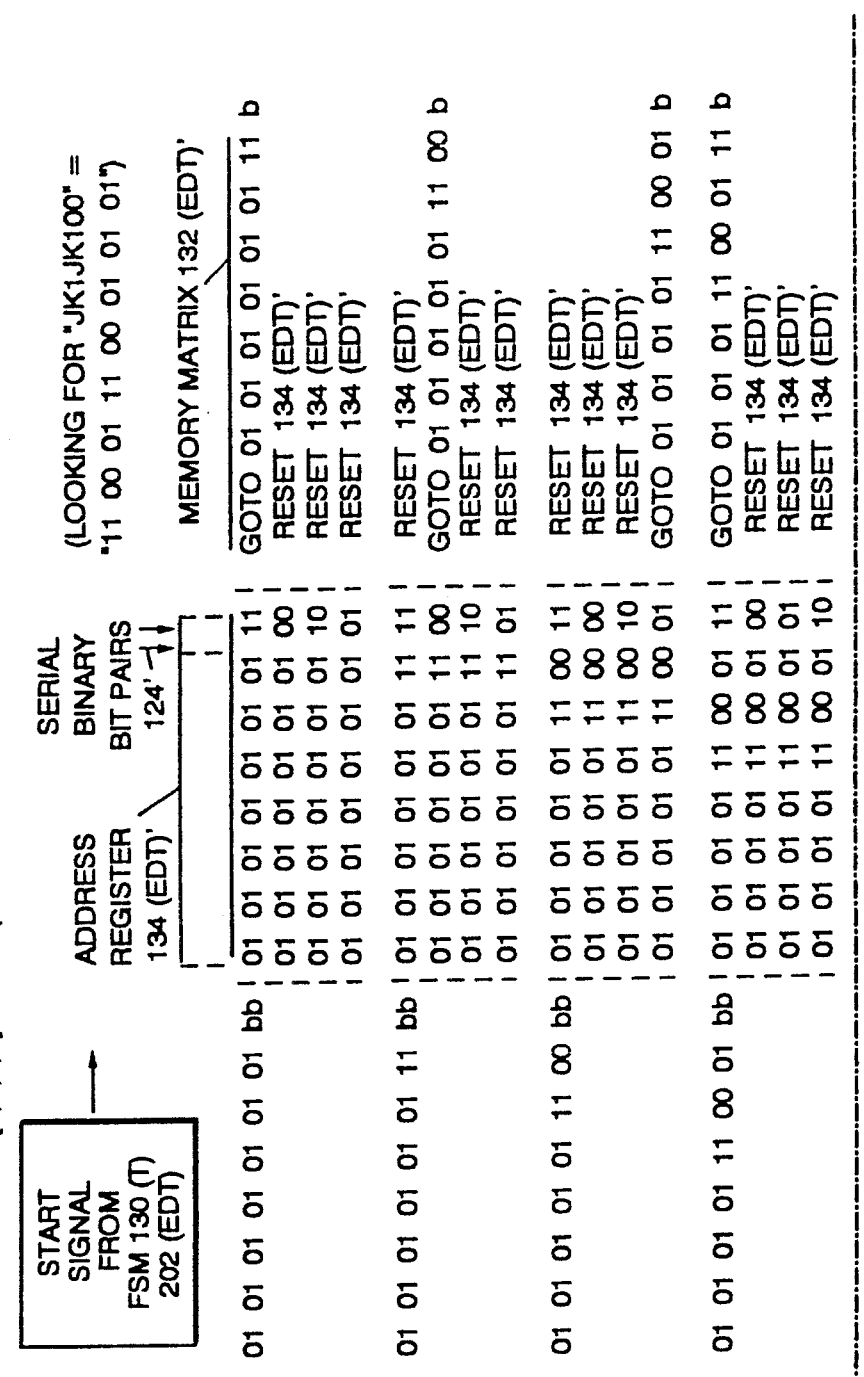
FIG. 7C illustrates the ending delimiter token detecting finite state machine of FIG. 7A, for binary bit pairs representing non-binary input symbol strings.
Figure 7C:
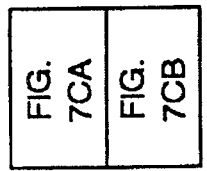

FIG. 7C shows the ending delimiter token finite state machine 130(EDT)' for binary bit pairs representing nonbinary input symbol strings, which is the binary bit pair data stream on line 124' from the Manchester decoding state machine 150. After a starting signal is received from the finite state machine FSM(T), the address register 124(EDT)' combines serial binary bit pairs 124' with the binary expression in the address register, to form the binary composite address applied to the memory matrix 132(EDT)'. The successful detection of the ending delimiter token EDT, results in sending a starting signal to the next selected finite state machine. The starting delimiter finite state machine FSM 130(S) is a suitable next finite state machine.

Figure 8A:
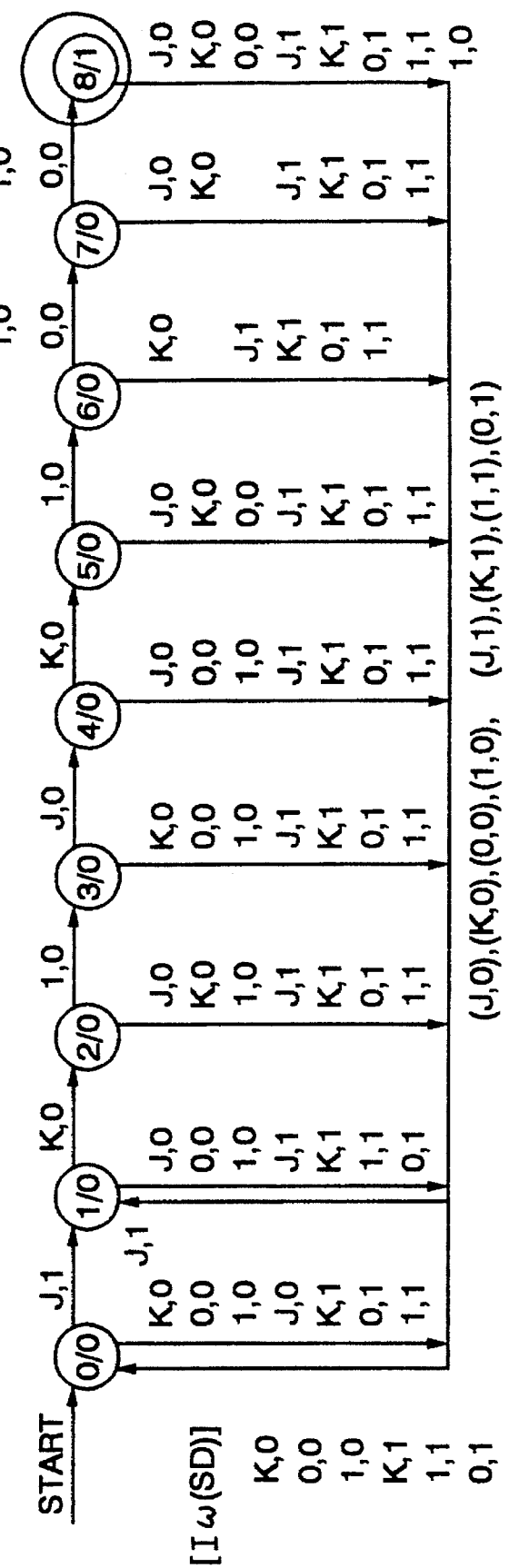
FIG. 8A illustrates the state diagram for the ending delimiter abort finite state machine.
Figure 8B:
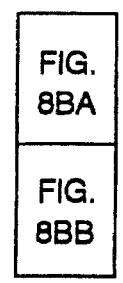
FIG. 8B illustrates the ending delimiter abort finite state machine of FIGS. 8A, for non-binary input symbol strings.

FIG. 8A is a state diagram for the ending delimiter abort (EDAB) detection finite state machine. Its input (labeled I) is the serial data stream 124 and the starting signal (labeled SD) from the starting delimiter finite state machine 130(SD). Table 1 defines the reference symbols and Table 3 is the state table for FIG. 8A. FIG. 8B shows the ending delimiter abort (EDAB) finite state machine FSM 130(EDAB), with a non-binary input symbol string which is the Manchester encoded data stream 124. When a starting signal is applied from the FSM 130(SD) and received in the register 202(EDAB), the address register 134(EDAB) combines the serial data stream 124 with the symbols in the address register, to form a composite symbol address which is applied to the memory matrix 132(EDAB). The successful detection of an ending delimiter abort (EDAB) message, results in sending a start signal to a suitable destination finite state machine. A suitable destination finite state machine in this case can be the starting delimiter finite state machine FSM 130(SD).

Figure 8C:
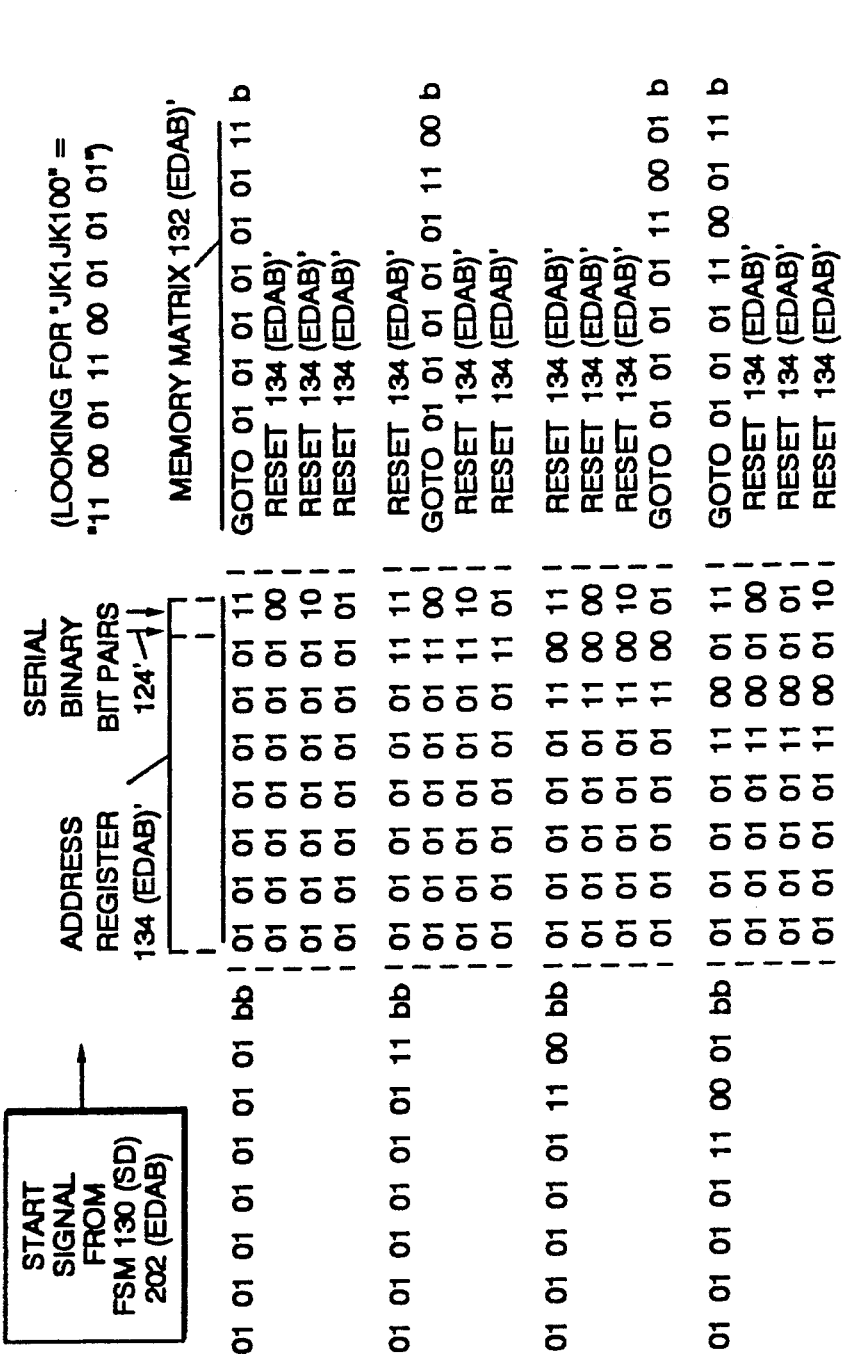
FIG. 8C illustrates the ending delimiter abort detecting finite state machine of FIG. 8A, for binary bit pairs representing non-binary input symbol strings.

FIG. 8C shows the ending delimiter abort (EDAB) detection finite state machine FSM 130(EDAB)', that receives a binary bit pair input representing a non-binary input symbol string which is the Manchester encoded data stream on line 124, after conversion by the Manchester coding table 150' into the binary bit pair data stream on line 124'. Binary bit pairs are input on line 124' to the address register 134(EDAB)' after the receipt of the starting signal from the FSM 130(SD), the address register 134(EDAB)' combines the serial binary bit pairs on line 124' with the binary address expression in the register 134(EDAB)', to form a composite binary address which is applied to the memory matrix 132(EDAB)'. The successful detection of an ending delimiter abort EDAB message, results in sending a start signal to a suitable destination FSM. A suitable FSM in this example would be the starting delimiter FSM 130(SD).

Thus it is seen that the adaptive active monitoring invention can be applied to a serial data stream composed of non-binary symbols, each symbol of which can be represented by two or more binary bits. The IEEE 802.5 token ring network, which uses the four symbol Manchester encoded data stream, is merely one example of multiple symbol data communications protocols which can be accommodated by the invention. Another example communications protocol is the fiber optical distributed data interface (FDDI) which uses a five bit equivalent symbol set of 26 symbols to carry information over that medium. A suitable state machine converter for converting the FDDI multiple symbol set into a five binary bit word, can be inserted between the data communications network 124 and finite state machines constructed in accordance with the invention, to provide the selective detection of predefined symbol patterns managed on the FDDI network. Outputs from such suitably configured finite state machines can be applied to counters connected to event vector registers 180, for the transfer of event vectors to an information collection architecture 190, similar to that described above in FIG. 4E for the IEEE 802.5 token ring network protocol.

FIG. 9A shows a timing diagram of the fiber optical distributed data interface (FDDI) coding. This is described in further detail in the ANSI Standard X3.139, Fiber Distributed Data Interface (FDDI) Token Access Control (MAC), ANSI, Incorporated, New York, N.Y., 1987. It is significant that the communications medium for the fiber optical distributed data interface employs 26 symbols, encoded as the waveform 124(F), and transmitted with respect to the clock waveform 123. The data stream includes the symbols 0–9 and A–F for hexadecimal data. The symbols also include J and K for starting delimiters. The symbols also include Q, I and H for line state. The symbols also include T for an ending delimiter. The symbols also include R and S for control indicators. The symbols also include V and H for invalid code indications.

FIG. 9B is a schematic diagram of the fiber optical distributed data interface decoding machine 150(F). The decoding machine 150(F) converts the FDDI encoded data stream 124(F) to a five bit binary data stream 124(F)'. This is described in greater detail in the ANSI Standard ANSI X3T9.5/8315.

Figure 9C:
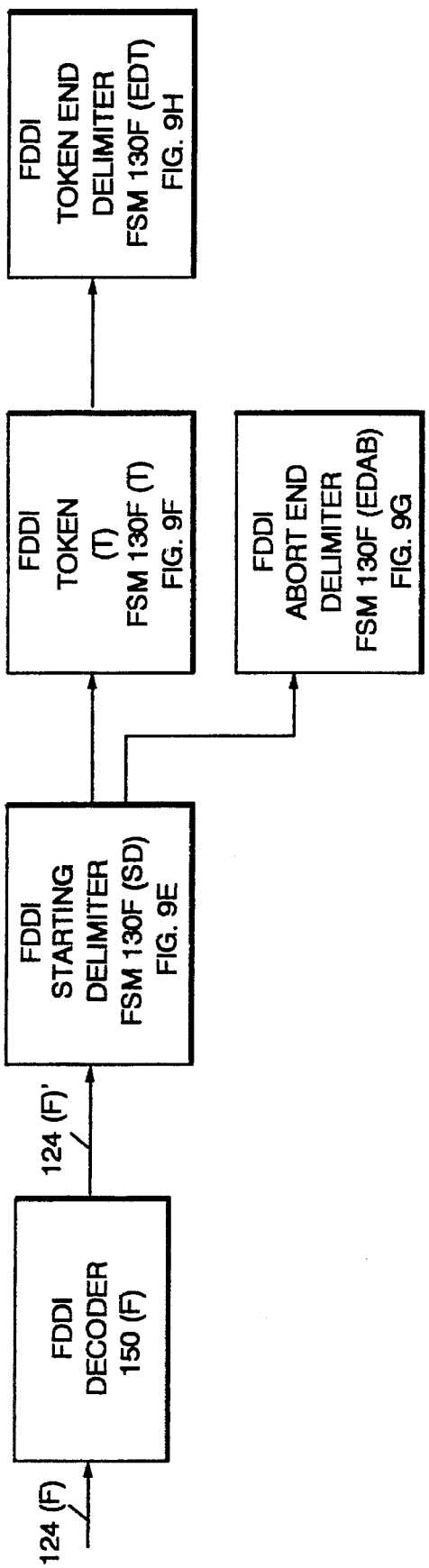
FIG. 9C shows an example finite state machine sequence for fiber optical distributed data interface.

FIG. 9C is an example finite state machine sequence for the fiber optical distributed data interface. The figure shows the FDDI decoder 150(F) receiving the FDDI encoded data stream 124(F) and outputting the five bit binary data stream 124(F)', which goes to the FDDI starting delimiter finite state machine 130F(SD). The FDDI staring delimiter finite state machine is shown in greater detail in FIG. 9E. A first starting signal is output from the FSM 130F(SD) to the FDDI token finite state machine 130F(T). A second starting signal is output from the FDDI starting delimiter FSM 130F(SD) to the FDDI abort end delimiter finite state machine 130F(EDAB). The FDDI token finite state machine 130F(T) is shown in greater detail in FIG. 9F. The FDDI abort end delimiter finite state machine 130F(EDAB), is shown in greater detail in FIG. 9G. The output of the FDDI token finite state machine 130F(T) is a starting signal sent to the FDDI token end delimiter finite state machine 130F(EDT), which is shown in greater detail in FIG. 9H.

Figure 9D:
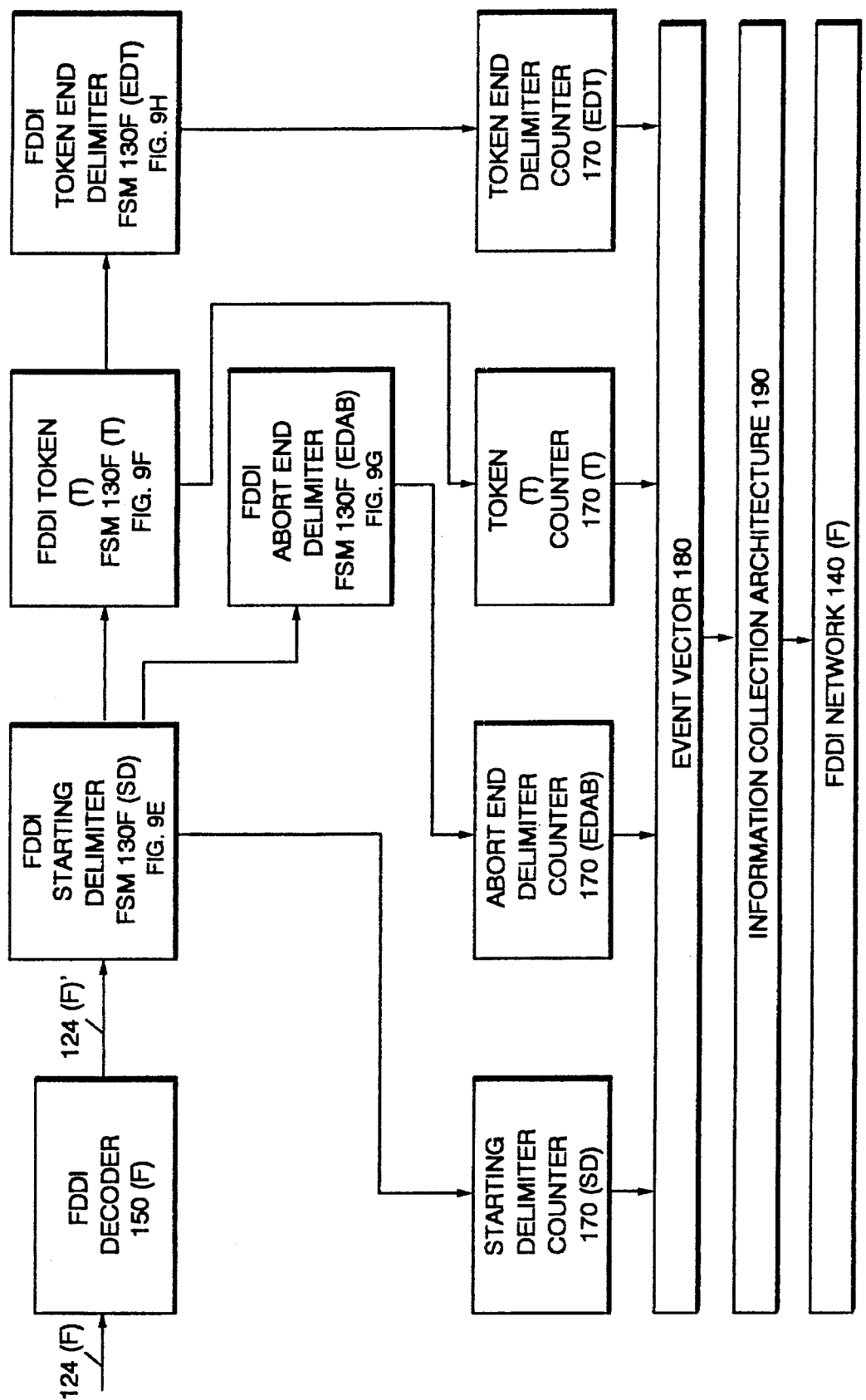
FIG. 9D shows an example information collection architecture for a fiber optical distributed data interface.

FIG. 9D shows an example information collection architecture for the fiber optical distributed data interface. The finite state machine sequence shown in FIG. 9C is connected to counters shown in FIG. 9D. The starting delimiter counter 170(SD) receives the starting signal output from the FDDI starting delimiter finite state machine 130F(SD), and counts the number of occurrences for staring delimiters. The abort end delimiter counter 170(EDAB) receives the starting signal output from the FDDI abort end delimiter finite state machine 130F(EDAB), and counts the number of occurrences of abort end delimiters. The token counter 170(T) receives the starting signal output from the FDDI token finite state machine 130F(T), and counts the number of occurrences of tokens. The token end delimiter counter 170(EDT), receives starting signals output from the FDDI token end delimiter finite state machine 130F(EDT), and counts the number of occurrences of token end delimiters.

The accumulated counts in the counters 170(SD), 170(EDAB), 170(T), and 170(EDT), arc assembled in the event vector register 180, to form an event vector. The event vector is output to the information collection architecture 190, for processing in accordance with the description provided in the above referenced Paul Hershey, et al. and John Waclawsky, et al. patent applications. The information collection architecture 190 will monitor the operation of the FDDI network 140(F) and will provide control signals to reroute messages and modify the operation of the FDDI network 140(F).

Figure 9E:
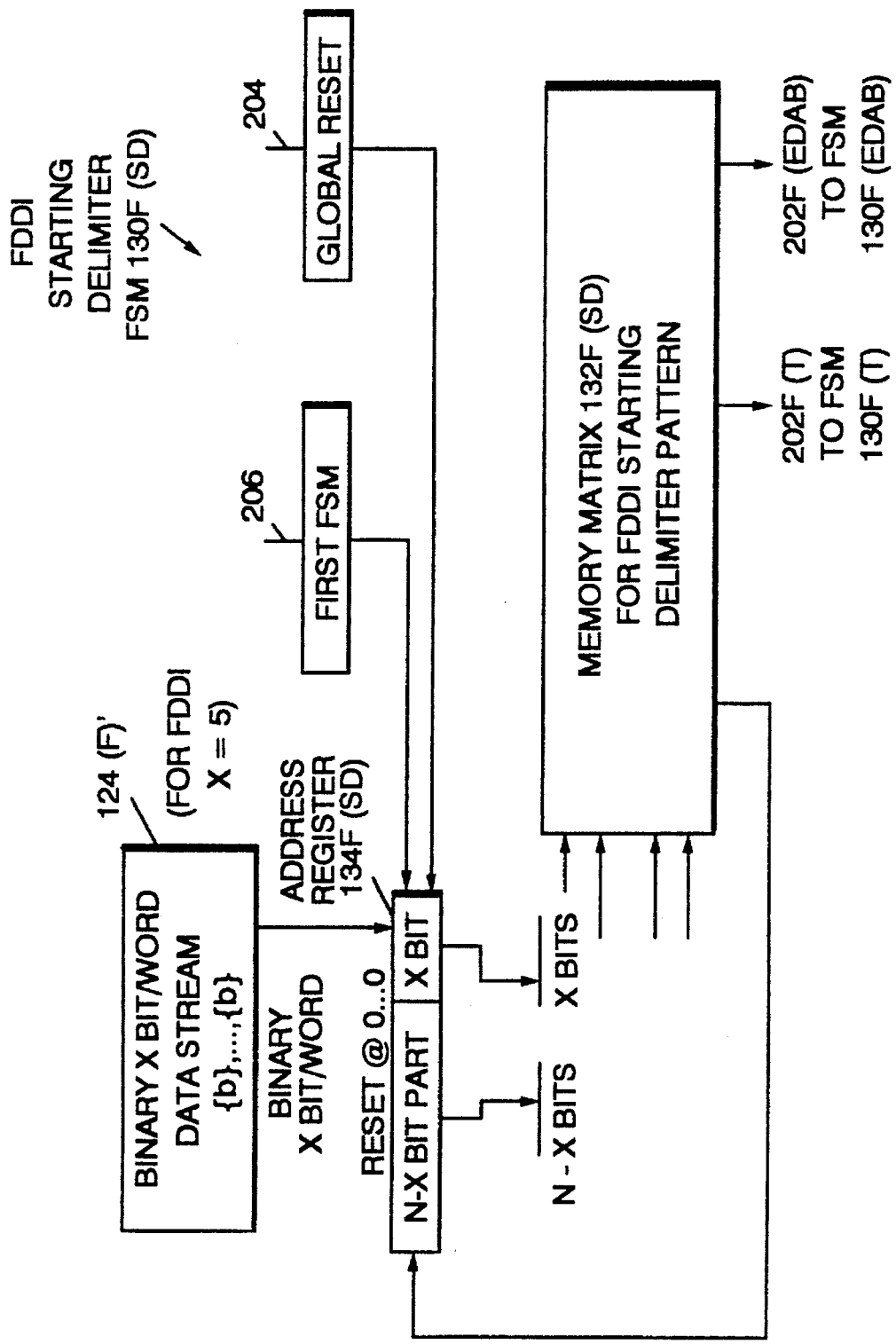
FIG. 9E shows the FDDI starting delimiter detection finite state machine.

FIG. 9E shows a schematic diagram of the FDDI starting delimiter detection finite state machine 130F(SD). It receives the five bit binary data stream 124(F)' from the decoding machine 150(F). The binary data stream 124(F)' is applied, five bits at a time, to the X bit portion of the address register 134F(SD). For FDDI, X is equal to five. The N-X bit portion of the address register receives the data output from the last access of the memory matrix 132F(SD). The memory matrix stores the finite state machine steps for the FDDI starting delimiter pattern. It is noted that the FDD starting delimiter FSM 130F(SD) is designated the first FSM by the designation 206 and receives the global reset signal 204. When a FDDI starting delimiter pattern is successfully detected by the memory matrix 132F(SD), it outputs the starting signal 202F(T) to the FDDI token finite state machine 130F(T), and it also outputs the starting signal 202F(EDAB), to the FDDI abort end delimiter finite state machine 130F(EDAB).

Figure 9F:
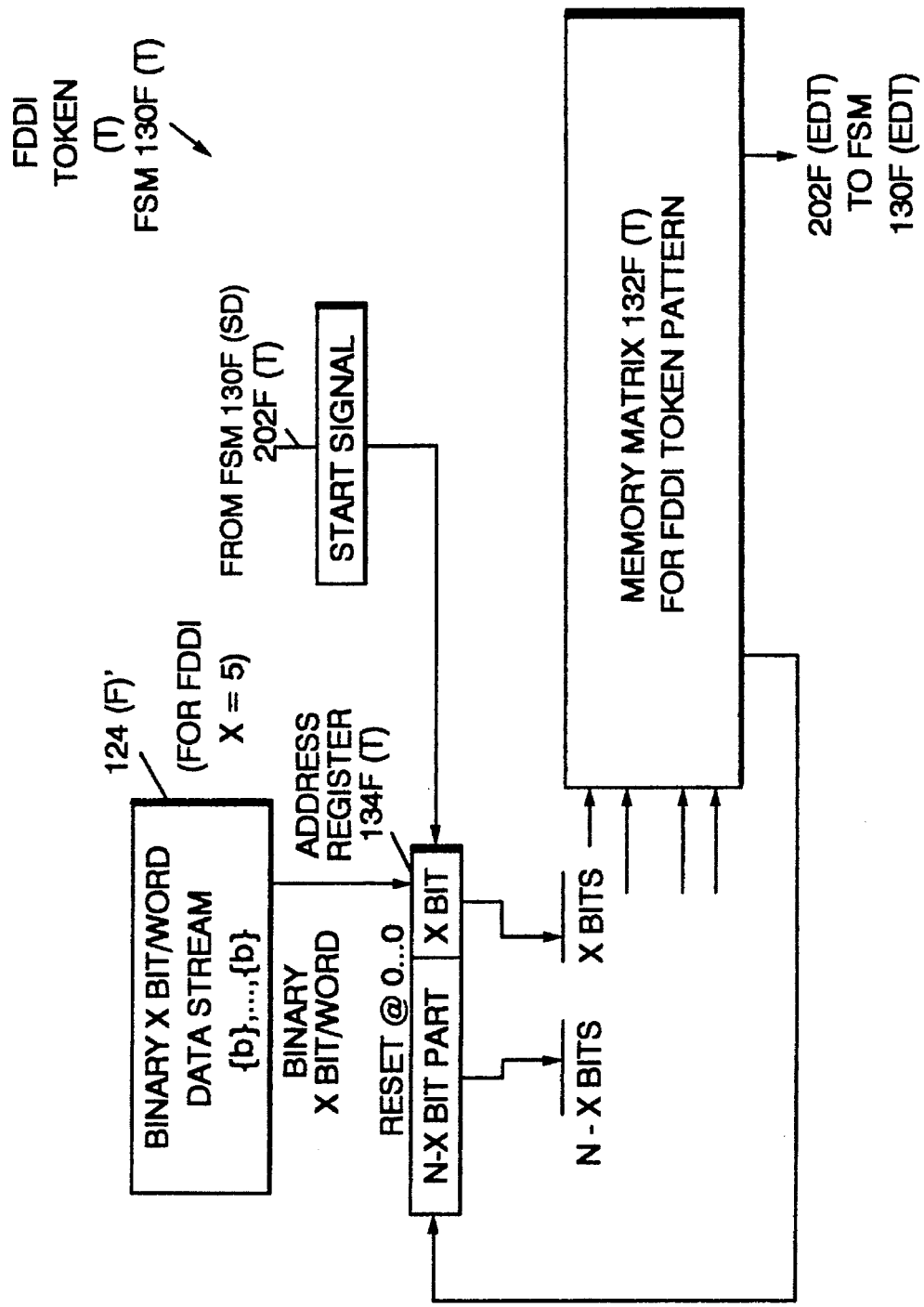
FIG. 9F shows the FDDI token detector finite state machine.

FIG. 9F shows the FDDI token detection finite state machine 130F(T). It receives the five bit binary data stream 124(F)' from the decoding machine 150(F). It begins monitoring the data stream 124(F)' when the starting signal 202F(T) is received from the finite state machine 130F(SD). At that point, the address register 134F(T), receives the data stream 124(F)', five bits at a time, which can be thought of as five bit words, and places them in the X bit portion. The N-X bit portion of the address register had received the data output from the memory matrix 132F(T), upon the last previous access. The memory matrix 132F(T) stores the steps for the FDDI token pattern. If the FDDI token pattern is successfully detected by the matrix 132F(T), it outputs a starting signal 202F(EDT) to the FDDI token end delimiter finite state machine 130F(EDT).

FIG. 9G illustrates the FDDI abort end delimiter detection finite state machine 130F(EDAB). It receives the five bit binary data stream 124(F)' output by the decoder machine 150(F). When it receives the starting signal 202F(EDAB) from the finite state machine 130F(SD), the address register 134F(EDAB), begins receiving the data stream 124(F)', five bits at a time, and places into the X bit portion. The N-X bit portion holds the data output from the last previous access of the memory matrix 132F(EDAB). The memory matrix 132F(EDAB) stores the FDDI abort end delimiter pattern. If the FDDI abort end delimiter is successfully detected by the memory matrix 132F(EDAB), it outputs a starting signal to a suitable destination finite state machine. A suitable finite state machine in this example would be the FSM 130F(SD). Thus, a starting signal 202F(SD), is output to the finite state machine 130F(SD).

FIG. 9H shows the FDDI token end delimiter detection finite state machine 130F(EDT). It receives the five bit binary data stream 124(F)' output from the decoding machine 150(F). When it receives the starting signal 202F(EDT), from the finite state machine 130F(T), the address register 132F(EDT) begins receiving the data stream 124(F)', five bits at a time, which are placed in the X bit portion. The N-X bit portion stores the data last previously accessed from the memory matrix 132F(EDT). The memory matrix stores the FDDI token end delimiter pattern. If the FDDI token end delimiter pattern is successfully detected by the matrix 132F(EDT), it outputs a starting signal to a suitable destination finite state machine. A suitable destination finite state machine in this example is FSM 130F(SD). Thus, the memory matrix outputs the starting signal 202F(SD), to the FSM 130F(SD). Thus it is seen that the invention can be readily applied to the detection of characteristic patterns in communications networks which use a variety of symbol sets in their protocols.

The adaptive, parallel finite state machine feature 100" of the invention is more particularly described with reference to FIGS. 10A, 10B and 10C. FIG. 10D shows the flow diagram of a complete finite state machine sequence for the IEEE 802.5 token ring network protocol, in accordance with the invention. It is the objective of the information collection architecture to monitor the IEEE 802.5 token ring 140 in FIGS. 10A, 10B and 10C, and to apply ICA control signals 152 to control the traffic patterns on the network 140. This is accomplished by the information collection architecture 190 applying control signals to reroute traffic and control signals to adjust frame sizes, for example. This is done in response to monitoring the bit stream 124 from the network 140. In accordance with the invention, the information collection architecture 190, can specify configuration vectors and line 146 to configure the RAM 148 of the programmable cross point switch 210. The configuration vectors are described in greater detail in the above referenced Paul Hershey, et al. patent application and the above referenced John Waclawsky, et al. patent applications. By selectively reprogramming the programmable cross point switch 210, the starting signal interconnections between respective finite state machines in the array of FIG. 10D, can be customized for particular applications. Further, the interconnections of starting signals from finite state machines to corresponding counters 170 which contribute event count values to the event vector 180, can be established by appropriate configuration vectors applied over connection 146 from the information collection architecture 190 to the programmable cross point switch 210. The information collection architecture 190, will process event vectors 180 assembled from the counters 170, and will provide new configuration vectors over the connection 146, to refine measurements of the token ring 140. In this manner, the control of the traffic on the token ring 140 is achieved.

Figure 10A:
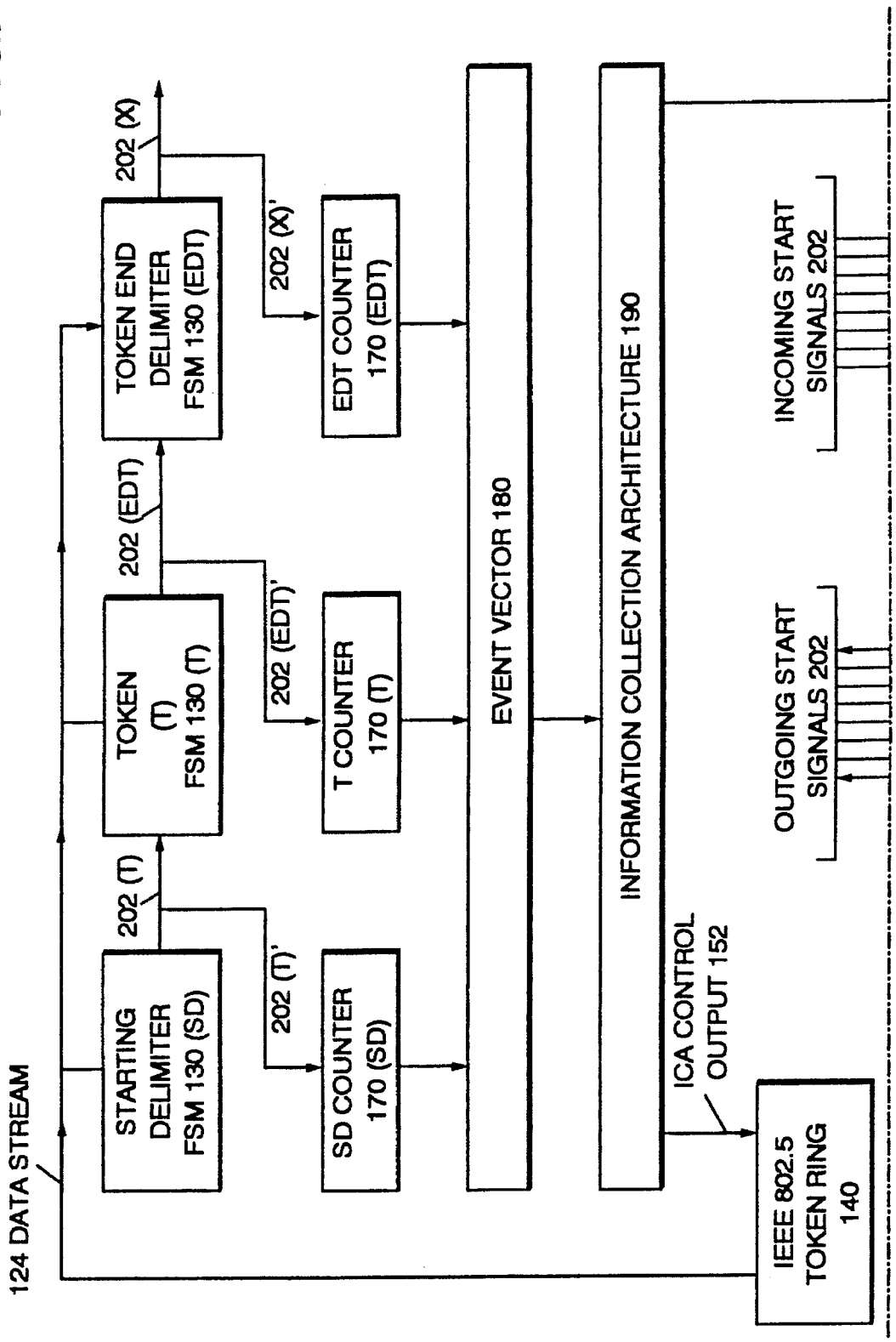
FIG. 10A is a functional block diagram of the information collection architecture to control token ring traffic by coarse measurement of LAN utilization using token activity.
Figure 10A:
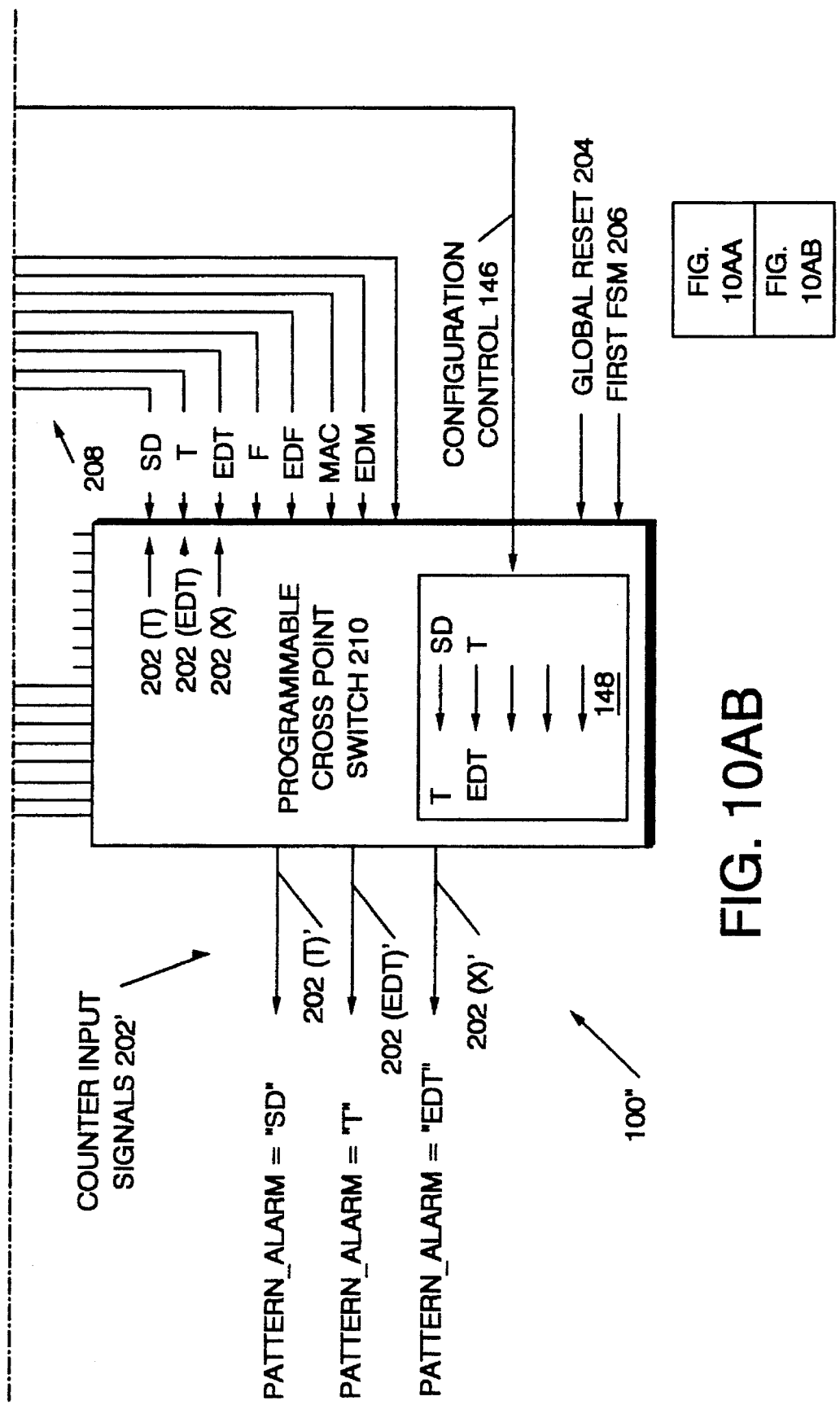

Turning now to FIG. 10A, the information collection architecture 190 has applied a configuration control 146 to the RAM 148 in the programmable cross point switch 210, to connect the starting delimiter starting signal 202(T), to the token FSM 130(T). It is also configured the starting signal output 202(EDT) from the token FSM, to the token end delimiter FSM 130(EDT). Accordingly, the event vector 180 assembled from the counters 170 in FIG. 10A, will reflect the number of staffing delimiters, tokens, and token end delimiters detected over a predetermined period.

In FIG. 10A, a data stream 124 is output from the token ring 140, to the starting delimiter 130(SD). The starting signal 202(T) is applied to the token FSM 130(T). The starting signal 202(EDT) is applied to the token end delimiter 130(EDT). The starting signal output from the starting delimiter 130(SD), is applied as 202(T)' to the starting delimiter SD counter 170(SD). The starting signal output by the token FSM 130(T), is applied as 202(EDT)' to the token T counter 170(T). The token end delimiter 130(EDT) outputs a starting signal 202(X)' which is applied to the token end delimiter EDT counter 170(EDT). The counters 170(SD), 170(T), and 170(EDT) accumulate counts for a predetermined period of time. The corresponding counts are then assembled in the event vector 180 which is output to the information collection architecture 190. The information collection architecture 190, in accordance with the operations described in the above referenced Hershey, et al. and Waclawsky, et al. patent applications, processes the event vector and then outputs ICA control signals on the output 152 to the token ring 140. If the information collection architecture 190 determines that a refined measurement of LAN utilization is required, it will output a new configuration control signal on line 146 to the RAM 148 in the programmable cross point switch 210. This is further illustrated in FIG. 10B.

In FIG. 10B, adaptive, parallel finite state machine monitor 100" is shown, with the new configuration established in the RAM 148. The starting delimiter 130(SD) output 202(T) is configured to go to the token FSM 130(T), the token FSM output 202(EDT) is configured to the 130(EDT). The starting delimiter 130(SD) output is also configured to go to the frame FSM 130(F). The frame FSM output 202(EDF) is configured to go to the frame end delimiter EDF FSM 130(EDF). Further, the starting signal output from the starting delimiter 130(SD) is applied as 202(F)' to the starting delimiter SD counter 170(SD). The starting signal output from the frame FSM 130(F), is applied as starting signal 202(EDF)' to the frame F counter 170(F). The frame end delimiter finite state machine 130(EDF), has its starting signal applied as 202(Y)' to the frame end delimiter EDF counter 170(EDF). The accumulated counts for the starting delimiter in counter 170(SD), for the frame in counter 170(F), and for the frame end delimiter in counter 170(EDF), are accumulated over a predetermined period of time. Then the respective counts are assembled in the event vector register 180 which outputs an event vector to the information collection architecture 190. In accordance with the operation for the information collection architecture 190 described in the above referenced Hershey, et al. and Waclawsky, et al. patent applications, an ICA control signal is output on line 152 to the token ring 140. In addition, if the information collection architecture 190 determines that an additional measurement is required of the token ring, using control frame activity, then a new configuration vector is applied over line 146 to the programmable cross point switch 210. This new configuration results in the arrangement shown in FIG. 10C.

Figure 10C:
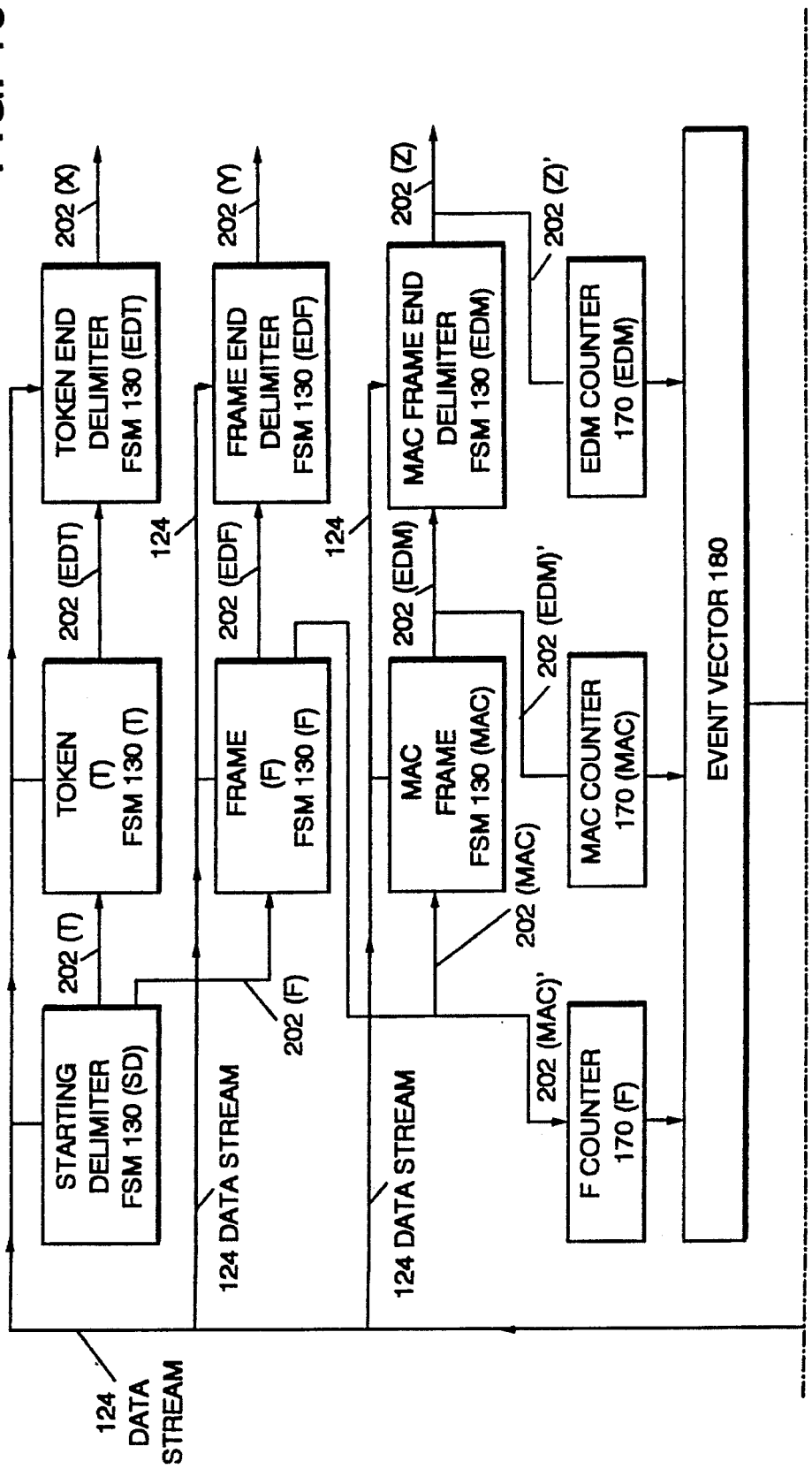
FIG. 10C is a functional block diagram of the information collection architecture controlling token ring traffic by measurement of LAN utilization using control frame activity.
Figure 10D:
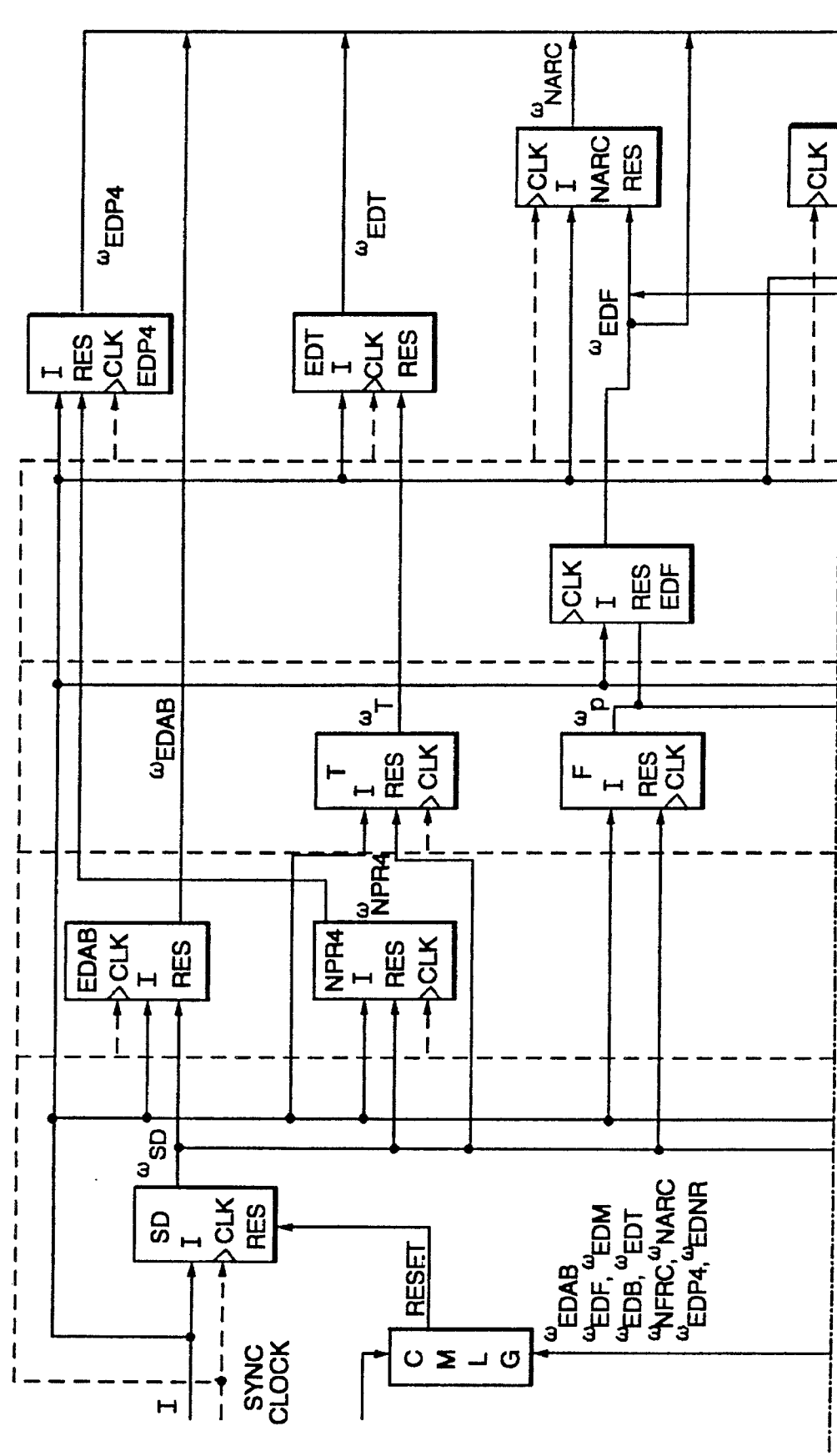
FIG. 10D is a flow diagram of the finite state machine sequence for the IEEE 802.5 token ring network protocol.

FIG. 10C shows the control of a token ring traffic by measurement of LAN utilization using control frame activity. The configuration vector applied on line 146 to the RAM 148, results in connecting the output 202(T) of the starting delimiter 130(SD) to the token FSM 130(T), applies the output of the token FSM 130(T) to the EDT 130(EDT), applies a second output 202(F) from the starting delimiter 130(SD) to the frame FSM 130(T), applies the output 202(EDF) of the frame FSM 130(F) to the EDF 130(EDF), applies a second output 202(MAC) of the frame FSM 130(F) to the MAC frame FSM 130(MAC), and applies the output 202(EDM) of the MAC frame FSM 130(MAC) to the MAC frame end delimiter FSM 130(EDM). The new configuration also applies the starting signal output from the frame FSM 130(F), as the signal 202(MAC)' to the frame counter 170(F), to count the number of occurrences of frames. The MAC frame FSM 130(MAC) outputs a starting signal which is applied as 202(EDM)' to the MAC counter 170(MAC), to count the number of MAC frame occurrences during a predetermined period of time. The MAC end delimiter FSM 130(EDM) applies a starting signal as 202(Z)' to the MAC frame end delimiter EDM counter 170(EDM). This count is accumulated over a predetermined period of time. The event vector register 180 assembles the accumulated counts in the counters 170(F), 170(MAC), and. 170(EDM), to form an event vector which is output to the information collection architecture 190. In accordance with the description in the above referenced Hershey, et al. and Waclawsky, et al. patent applications, the information collection architecture 190 will process the event vector and in response thereto, will output an ICA control signal on line 152 to the token ring 140, controlling its traffic by adjusting muting parameters and adjusting frame sizes, for example. If the information collection architecture 190 determines that further monitoring of the token ring 140 is required to perform additional control actions, additional configuration vectors will be output over the line 146 to the programmable cross point switch 210.

The adaptive finite state machine feature 100" of the invention enables the flexible reconfiguration of the finite state machine elements shown in FIG. 10D, to provide the information collection architecture 190, with a wide range of event counts to assemble event vectors for the purpose of monitoring and controlling communications network to which it is attached. An additional degree of freedom in configuring the finite state machines monitoring the data stream 124, is accomplished by reloading the finite state machine matrices 132 in the respective finite state machines 130. For example, a frame finite state machine 130(F), can be reloaded with an alterative matrix 132, to enable the identification of specific frames or frame types or source nodes and destination nodes for frames.

FIGS. 11, 11A, 11B and 11C describe a configurable array of finite state machines 100" which can be configured by the information collection architecture 190, to perform a large variety of finite state machine sequential operations and finite state machine parallel, simultaneous operations, in accordance with the invention. FIG. 11 shows the array of finite state machines 100" which are not yet configured to perform finite state machine operations. The are labeled with conventional matrix notations, such as FSM(2,3) is at the second row and the third column in the array 100". Each finite state machine shown in FIG. 11, for example the FSM 130(1,1), has a matrix which is a random access memory (RAM) 132(1,1). After the RAM matrix 132(1,1) has been configured to perform a particular finite state machine operation, as previously described, it is capable of detecting a predefined data pattern. If the finite state machine 130(1,1) successfully detects the predetermined pattern for which its matrix has been configured, then it will output a starting signal 202(1,1). A similar description can be made for each of the finite state machines shown in the array 100" of FIG. 11.

The information collection architecture 190, which is described in the above referenced Hershey, et al. and the Waclawsky, et al. patent applications, will configure each RAM matrix 132(1,1), for example, by loading the RAM over line 142, with an appropriate sequence of finite state machine steps as previously described.

The interconnection of the starting signals 202(1,1), for example, from the FSM 130(1,1), for example, to one or more other finite state machines in the array 100" of FIG. 11, is controlled by the information collection architecture 190 outputting configuration control information on line 146 to the configuration RAM 148A in the programmable cross point switch 210. The information collection architecture 190 outputs the matrix RAM configuration data on line 142 to the RAM matrices of the finite state machines. The configuration RAM 148A in the programmable cross point switch 210, will interconnect a starting signal from a predecessor finite state machine to one or more successor finite state machines in the array of FIG. 11, and it will also connect the starting signals for selected finite state machines to be output as pattern alarms on lines 202(1)', for example, to the counter 170(1), for example.

The counters 170(1), 170(2), and 170(3), count the number of occurrences of patterns by finite state machines whose starting signal outputs are connected to the counters. After a predetermined period of time, as determined by the information collection architecture 190, the contents of the counters are assembled in the event vector register 180, as an event vector. The event vector is output to the information collection architecture 190, where it is processed to measure the performance of the token ring network 140, and to prepare ICA control signals which it will output on line 152 to the token ring 140.

Figure 11A:
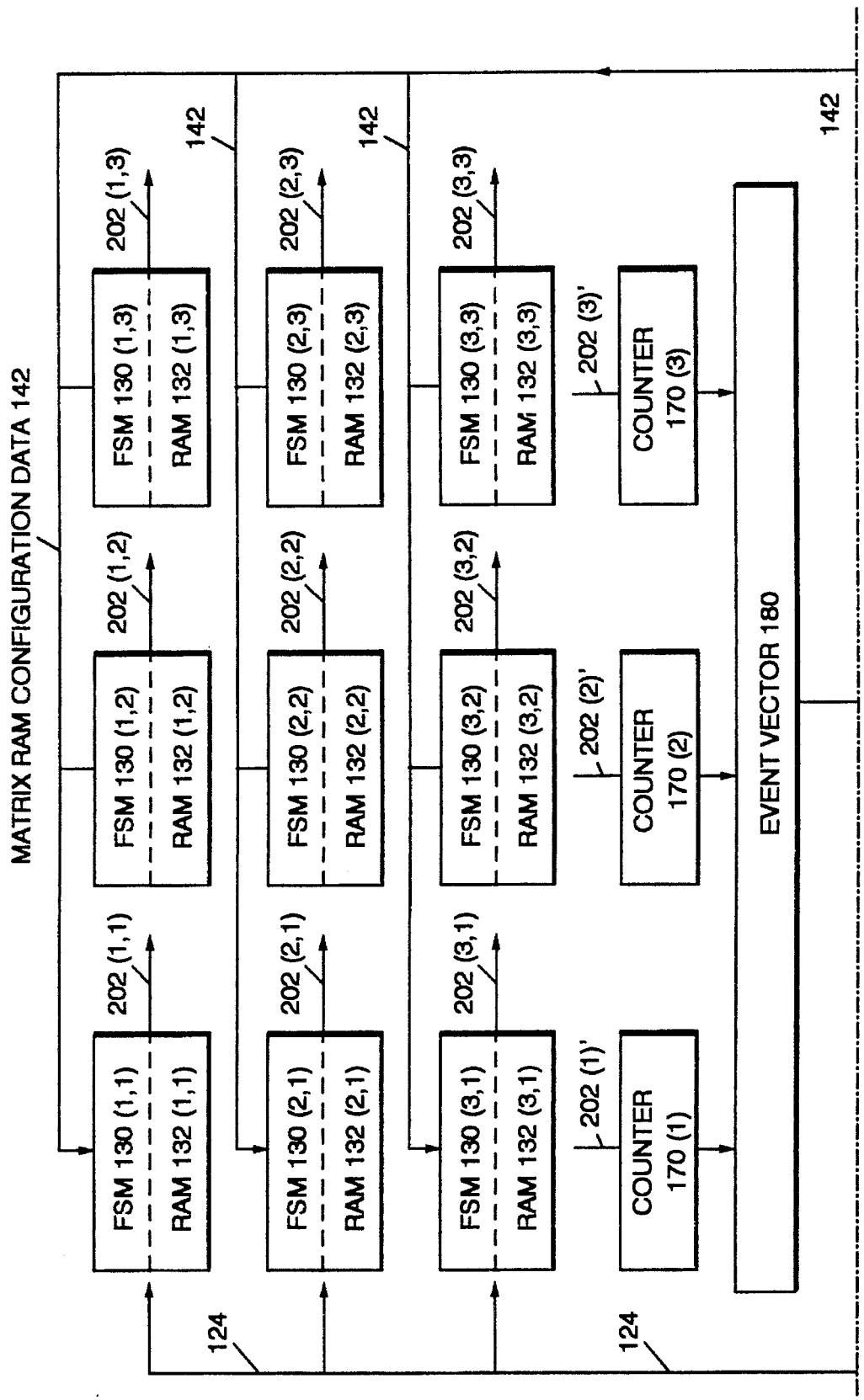
FIG. 11A is a functional block diagram of the array shown in FIG. 11, after configuration by the information collection architecture to perform coarse measurement of LAN utilization using token activity.
Figure 11A:
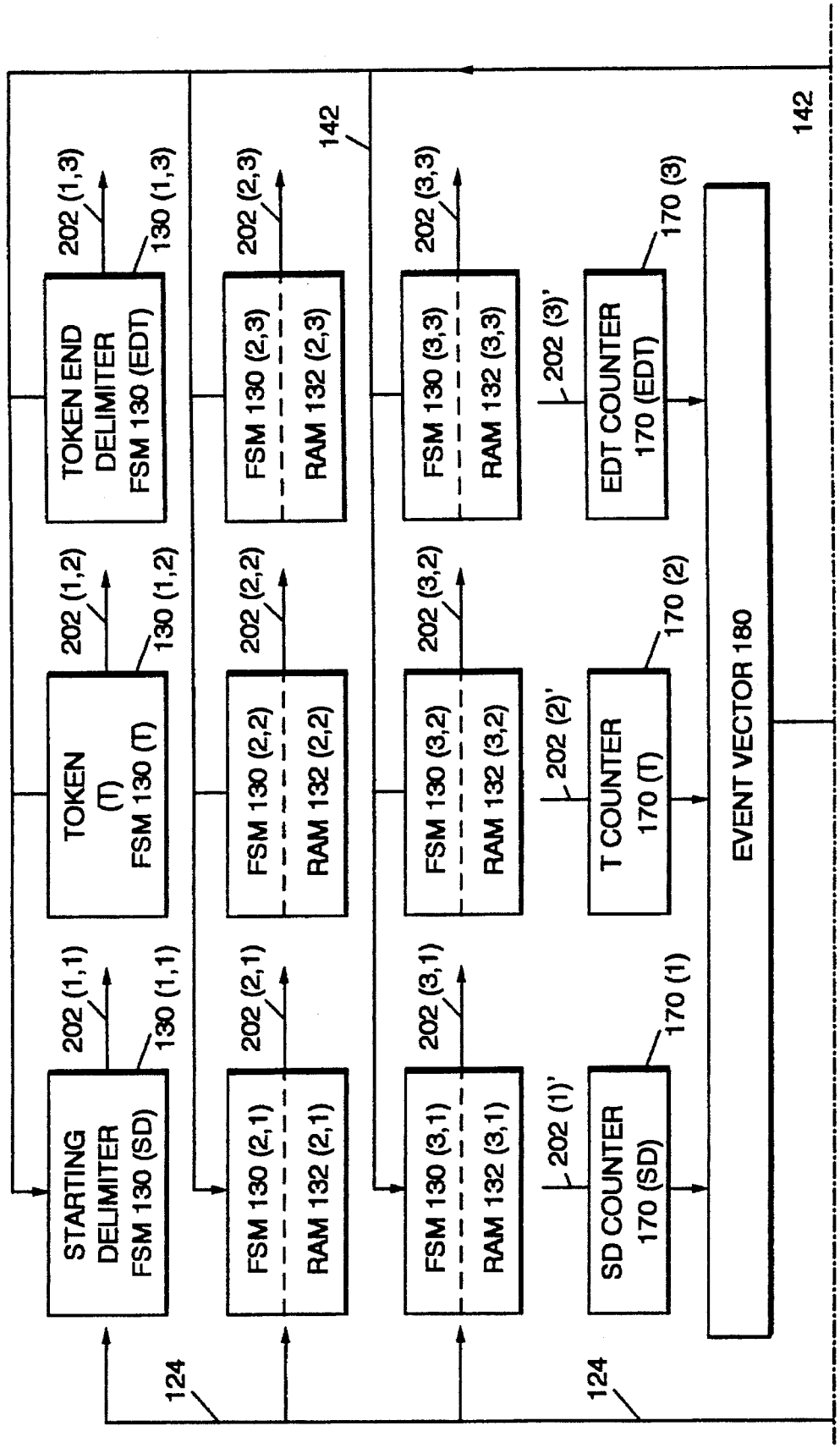

FIG. 11A shows the array 100" of finite state machines which are shown in FIG. 11. The array of FIG. 11A is configured by the information collection architecture 190, to perform a coarse measurement of LAN utilization using token activity, in the manner described for FIG. 10A. In FIG. 11A, the information collection architecture 190 outputs matrix RAM configuration data on line 142 to the FSM 130(1,1), FSM 130(1,2), and FSM 130(1,3), configuring these finite state machines to perform starting delimiter detection 130(SD), token detection 130(T), and token end delimiter detection 130(EDT), respectively. The information collection architecture 190 outputs configuration control information on line 146 to the configuration RAM (labeled 148) in the programmable cross point switch 210, to connect the starting signal 202(1,1) output from 130(SD) to the token FSM 130(T) and to connect the starting signal 202(1,2) output from the token 130(T), to the token end delimiter FSM o 130(EDT). The configuration control information on line 146 also configures the programmable cross point switch 210 to connect the counter 170(1) to the starting signal 202(1,1) from the FSM 130(SD), it connects the counter 170(2) to the starting signal 202(1,2) of the FSM 130(T), and it connects the counter 170(3), to the starting signal 202(1,3) from the token end delimiter FSM 130(EDT). When the array 100" shown in FIG. 11A is configured as described, it performs the coarse measurement of the LAN utilization using token activity, as was previously described for FIG. 10A.

Figure 11B:
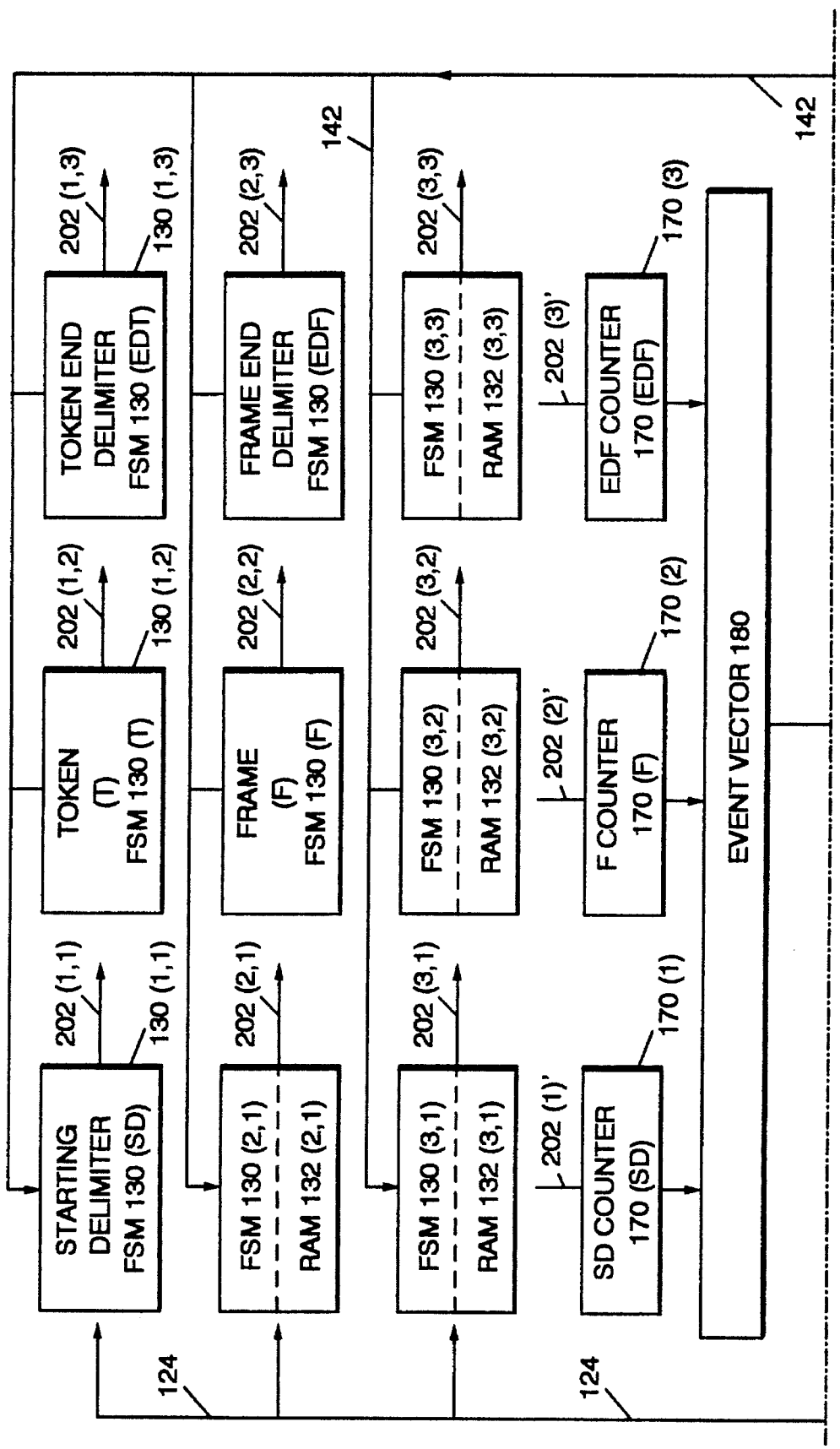
FIG. 11B is a functional block diagram of the array of FIG. 11, after configuration by the information collection architecture to perform a fine measurement of LAN utilization using frame activity.
Figure 11B:
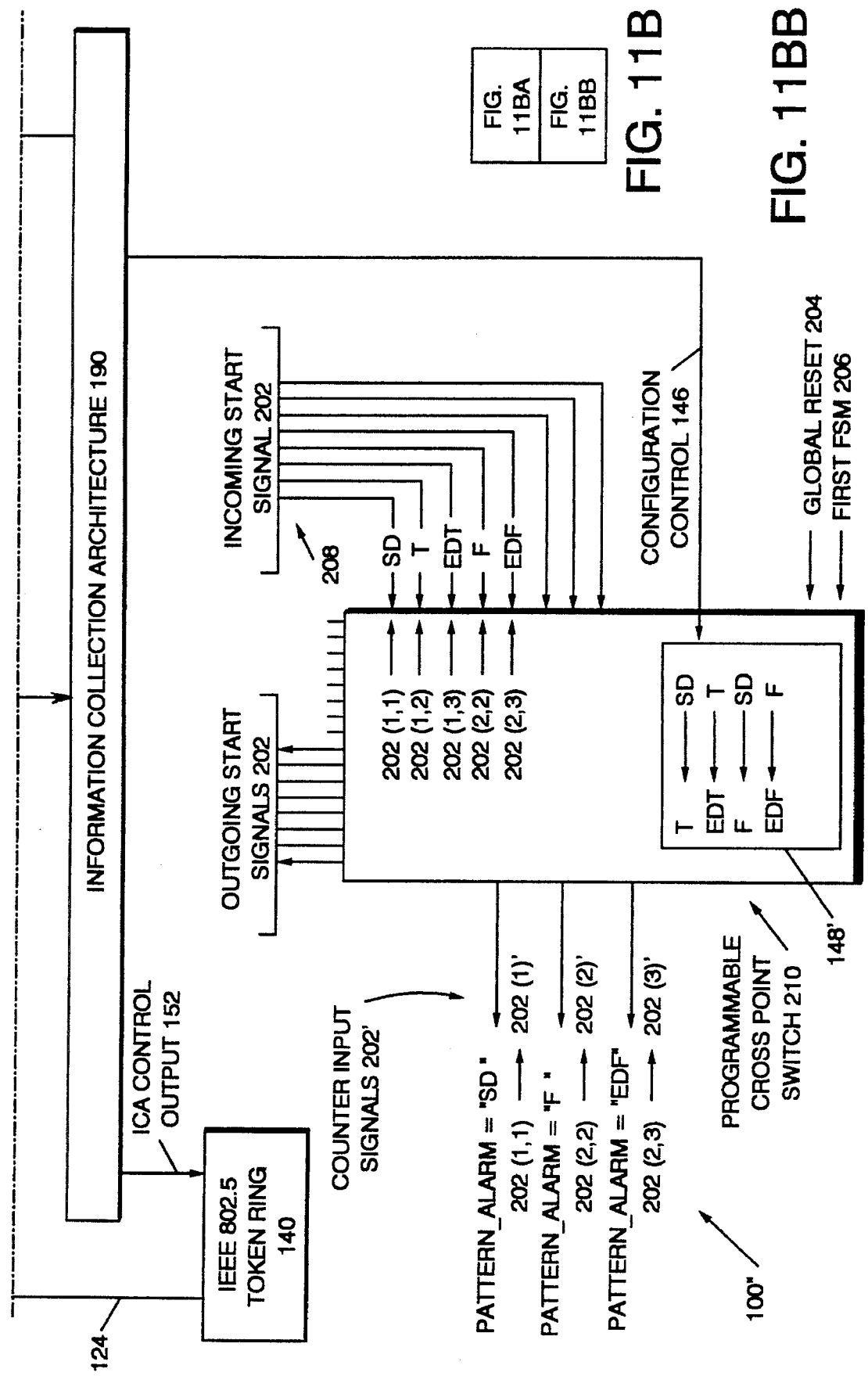

FIG. 11B shows the array of FIG. 11, which has been configured by the information collection architecture 190, to perform fine measurement of LAN utilization using frame activity, in the same manner as was described for FIG. 10B. In FIG. 11B, the configuration of FIG. 11A is extended by additional configuration information output from the information collection architecture 190 on the lines 142 and 146. The FSM 130(2,2) is configured to perform the frame detection finite state machine 130(F), and the FSM 130(2,3) is configured to perform the frame end delimiter detection FSM 130(EDF), by the matrix RAM configuration data output on line 142 from the information collection architecture 190. The programmable cross point switch 210 is reconfigured by the configuration control information on line 146 from the information collection architecture 190, to connect the starting signal 202(2,2) to the frame end delimiter FSM 130(EDF), and also to connect the starting signal 202(1,1) to the frame FSM 130(F). The configuration control information on line 146 further configures the programmable cross point switch 210 to connect the counter 170(1) to the starting signal 202(1,1) from the starting delimiter 130(SD), to connect the counter 170(2) to the starting signal 202(2,2) from the frame FSM 130(F), and also to connect counter 170(3) to the starting signal 202(2,3) from the frame end delimiter 130(EDF). The counters 170(SD), 170(F) and 170(EDF) then accumulate the number of occurrences of starting delimiters, frames and frame end delimiters, respectively, and at the end of a predetermined time interval, output these values to be assembled in the event vector register 180. The resulting event vector is then transferred to the information collection architecture 190, for monitoring the operation of the token ring 140 and for preparing ICA control signals to be output on line 152 to the token ring 140.

Figure 11C:
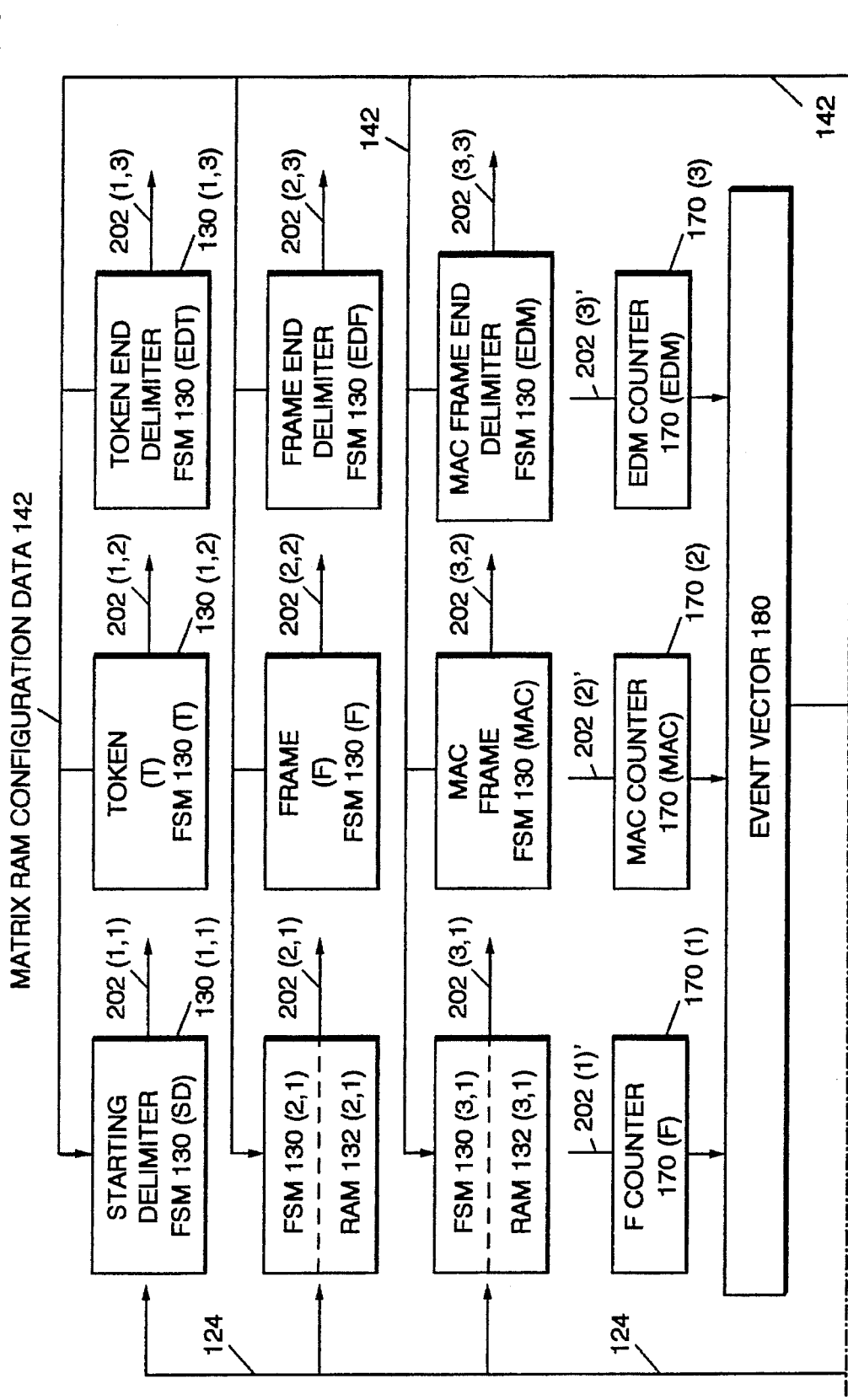
FIG. 11C is a functional block diagram of the array of FIG. 11, after configuration by the information collection architecture, to perform a measurement of LAN utilization using control frame activity.

FIG. 11C shows the array 100" of finite state machines shown in FIG. 11, configured to perform a measurement of the LAN utilization using control frame activity, in the same manner as was described for FIG. 10C. The configuration shown in FIG. 11B, is extended by additional configuration information output by the information collection architecture 190 over lines 142 and 146. The finite state machine FSM 130(3,2) is configured to perform MAC frame detection FSM 130(MAC), and the finite state machine 130(3,3) is configured to perform the MAC frame end delimiter detection FSM 130(EDM). This is achieved by additional configuration information output by the information collection architecture 190 over the line 142. In addition, information collection architecture 190 outputs on line 146, additional configuration control information to configure the configuration RAM 148" in the programmable cross point switch 210. Cross point switch 210 connects the starting signal 202(2,2) to the input of counter 170(1), it connects the starting signal 202(3,2) for the MAC frame to the input of counter 170(2), and it connects the starting signal 202(3,3) from the MAC frame end delimiter to the counter 170(3). The counters 170(F), 170(MAC), and 170(EDM), accumulates counts for the number of occurrences of frames, MAC frames, and MAC frame and delimiters, respectively, and at the end of a predetermined interval, apply these values to the event vector register 180. The event vector assembled in the register 180, is then transferred to the information collection architecture, to perform monitoring of the token ring 140 and to compile ICA control signals to be output on line 152 to the token ring 140, to control the traffic on the token ring.

Thus it is seen that the invention provides for the adaptive sequential and parallel configuration and reconfiguration of finite state machines to perform a wide variety of pattern recognition operations on data from a communications medium.

FIGS. 12, 12A, 12B and 12C describe the data processor 102 which has its memory 104 configured into a plurality of task partitions, each of which runs a finite state machine. The processor 102 includes the memory 104 connected by the bus 106 to the CPU 108, disk drive 114, keyboard and display 116, LAN adaptor 118. The LAN adaptor 118 is connected to receive the data stream 124 from the LAN 140. Included in the memory 104 is the bit stream 124, configuration data 142, configuration control data 146. Also included in the memory 104 is the event vector partition 180, and the information collection architecture program 190, which is described in further detail in the copending U.S. patent applications by Hershey, et al. and by Waclawsky, et al. cited above. The multi-tasking operating system program 128 in the memory 104, manages the multi-tasking processing of the plurality of task partitions 120(1,1), etc., shown in FIG. 12. The task partitions are numbered in standard matrix notation, such as task 120(2,3) being in the second row, third column of the memory area. Each task partition, for example task 120(1,1), includes a start register which stores the identity of the starting signal which is to be received by that task to start its analysis of the bit stream 124. If a particular task has been designated as the first FSM, then that designated task does not require a starting signal, but instead, continuously analyzes the bit stream 124. Each task, such as task 120(1,1), for example, also includes an address register 134(1,1), and a partition for a finite state machine matrix 132(1,1), for example. In accordance with the invention, the finite state machine matrix 132(1,1), for example, is programmed with finite state machine steps as previously described, to carry out the finite state machine operation within that task partition. The multi-tasking operating system program 128, can run a plurality of such finite state machines in a corresponding plurality of task partitions in the memory 104. FIG. 12 for the processor 102, corresponds to the unprogrammed array 100" of finite state machines shown in FIG. 11.

FIG. 12A shows the data processor 102 of FIG. 12, after it has been configured by the information collection architecture 190, to perform the coarse measurement of LAN utilization using token activity, in the same manner as was described for FIG. 11A and for FIG. 10A. Task 120(1,1) has been configured to perform the starting delimiter detection FSM 132(SD). It is designated as the first FSM, and will therefore continuously monitor the bit stream 124 for a starting delimiter pattern. The task 120(1,2) has been configured to perform the token detection FSM 132(T). It has a starting signal designation of 202(1,1) which means that the task 120(1,1) will provide the necessary starting signal to the task 120(1,2). The task 120(1,3), has been configured to perform the token end delimiter detection FSM 132(EDT). Its staffing signal has been designated as 202(1,2) which means that the task 120(1,2) must output its starting signal to task 120(1,3) before the token end delimiter detection operation will begin. The input for the counter 170(1) is designated as the starting signal 202(1,1) so that counter 170(1) will count the number of occurrences of a starting delimiter as the SD counter 170(SD). The input to the counter 170(2), has been designated as 202(1,2), so that the counter 170(2) will count the number of occurrences of tokens as the T counter 170(T). The input to the counter 170(3), is designated as 202(1,3), which causes the counter 170(3), to count token end delimiters as the counter 170(EDT). At the end of a predetermined interval, the accumulated counts in the counters 170(SD), 170(T) and 170(EDT) will be assembled as an event vector in the event vector register 180, which is transferred to the information collection architecture program 190. The information collection architecture program 190 will perform a monitoring of the LAN 140 and will compile control signals which will be output to the LAN 140 to control its traffic as has been previously described. The operation of the data processor 102 in FIG. 12A is similar to the operation described for the array 100" of finite state machines in FIG. 11A.

FIG. 12B is a functional block diagram of the data processor 102 of FIG. 12, configured to perform the fine measurement of LAN utilization using frame activity, as was described for the array shown in FIG. 11B and for the arrangement of finite state machines shown in FIG. 10B. The data processor 102 of FIG. 12B has had its configuration extended from that shown in FIG. 12A, by the additional configuration of task 120(2,2) to perform the frame detection FSM 132(F) and by configuring task 120(2,3) to perform the frame end delimiter detection FSM 132(EDF). The operation of the data processor of 102 is substantially the same as was described for the array shown in FIG. 11B.

FIG. 12C shows the data processor 102 of FIG. 12, configured to perform measurement of LAN utilization using control frame activity, the operation of which is similar to that described for the array of FIG. 11C and the arrangement shown in FIG. 10C. The configuration of the data processor 102 shown in FIG. 12B has been extended in FIG. 12C by configuring task 120(3,2) to perform the MAC frame detection FSM 132(MAC), and configuring the task 120(3,3) to perform the MAC frame end delimiter detection FSM 132(EDM). The operation of the data processor 102 of FIG. 12C is substantially the same as the operation of the array of FIG. 11C, as previously described.

Thus it is seen that in accordance with the invention adaptive finite state machine configurations can be flexibly implemented in a memory 104 of a data processor to perform a wide variety of sequential and simultaneous, parallel finite state machine operations.

The following are tables which illustrate the IEEE 802.5 token ring protocol. Table 1 is a listing of reference terms used in FIGS. 5A, 6A, 7A and 8A for the state diagrams shown therein. Table 2 is the state table for the starting delimiter state diagram of FIG. 5A. Table 3 is the state table for the abort ending delimiter machine state diagram of FIG. 8A. Table 4 is the state table for the token machine state diagram of FIG. 6A. Table 5 is the state table for the token ending delimiter machine state diagram of FIG. 7A.

Figure 13A:
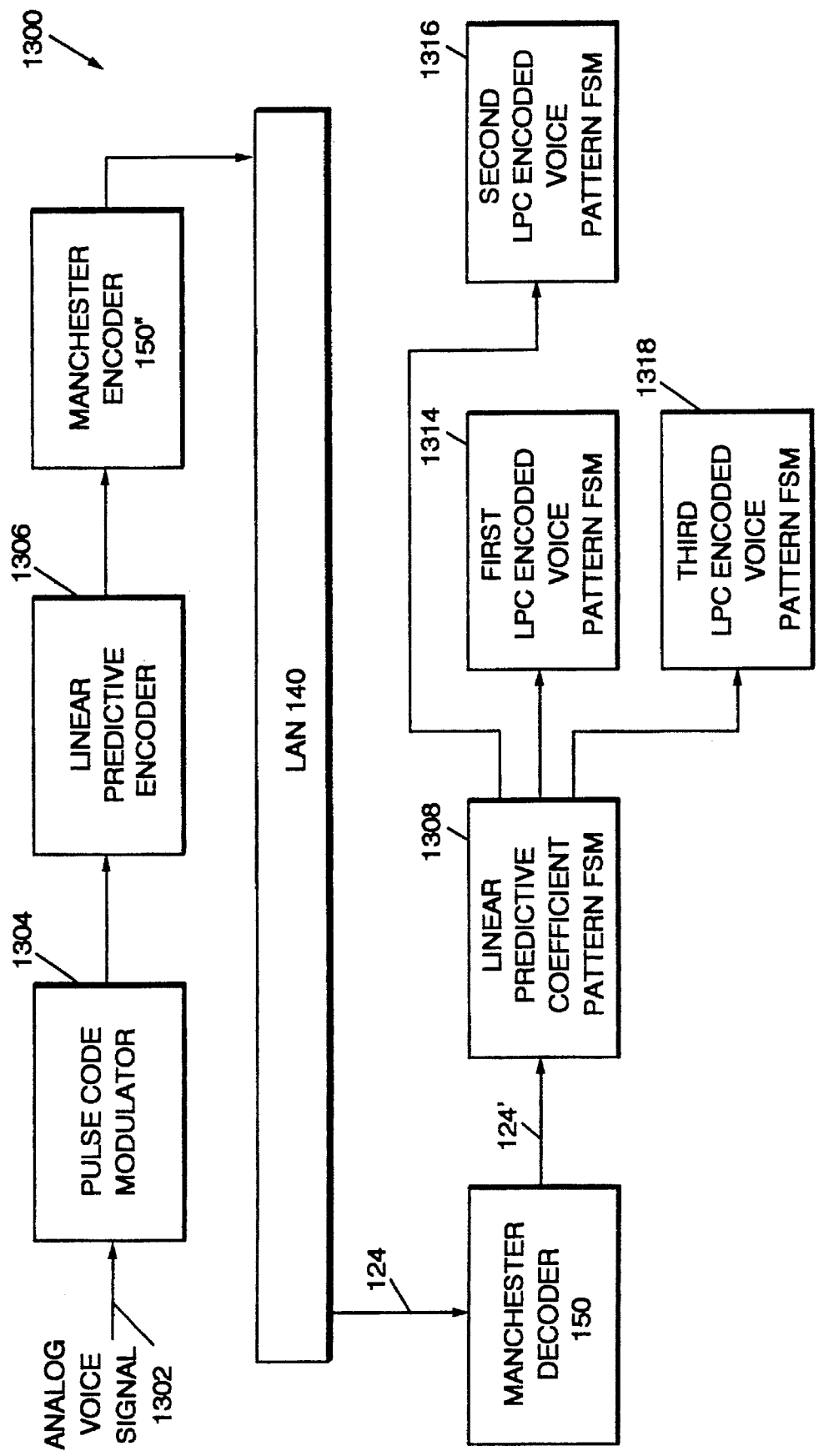
FIG. 13A is an example finite state machine sequence for linear predictive encoded voice signals on a local area network.

The inventive adaptive, active monitoring invention for a serial data stream having a characteristic pattern, is applicable to the detection of digitized voice signals on a communications medium. The adaptive active monitoring invention requires a digitized bit stream. For the example of voice communications, the analog signal is converted into a binary data stream by a voice encoder. Reference can be made to FIG. 13A which shows an example finite state machine sequence for linear predictive encoded voice signals on a local area network. The system 1300 has an analog voice signal 1302 input to a pulse code modulator 1304, which outputs a pulse code modulated signal to the linear predictive encoder 1306. The linear predictive coding (LPC) is described for example in the article by B. S. Atal and S. L. Hanauer, "Speech Analysis and Synthesis by Linear Prediction and Speech Wave," *Journal of Acoustics Society of America,* 50 (1971), pp. 637–655.

In linear predictive encoding, speech is modeled as the output of an all-pole filter with an input of pulses separated by the pitch period for the voice to sounds or pseudo random noise for unvoiced sounds. For a further explanation of this technique, see for example the article by M. R. Sambur and N. S. Jayany, "Speech Encryption by Manipulations of LPC Parameters," *The Bell System Technical Journal,* Nov. 1976, pp. 1373–1389.

A linear predictive encoding speech compression system includes a pulse generator, white noise generator, a low pass filter, and an adaptive linear predictor. The LPC coefficients modeled the combined glottal voice source, and radiation load in each frame of speech. The LPC coefficient parameters are encoded into a digital bit stream before they are transmitted. A suitable transmitter is described in the article by T. E. Tremain, "The Government Standard Linear Predictive Coding Algorithm, LPC-10," *Speech Technology,* Apr. 1982, pp. 40–49. The LPC receiver uses a table lookup to decode the LPC parameters, as is shown in the Tremain reference.

In accordance with the invention, the adaptive active monitoring invention is used in conjunction with an LPC receiver, to identify specific LPC parameters of interest, such as pitch of the speaker's voice. Using these parameters, along with an expert system, the adaptive active monitor invention can identify a specific person by virtue of that person's speech parameters. Phonetic speech patterns can also be identified by the adaptive active monitor invention.

FIG. 13A shows the analog voice signal 1302 applied to a pulse code modulator 1304 which outputs a pulse code modulated signal to the linear predictive encoder 1306. The output of the linear predictive encoder 1306 is applied to the Manchester encoder 150". The output of the Manchester encoder 150" is input to the local area network 140.

The Manchester decoder 150, is connected by means of line 124 to the local area network 140.

The Manchester decoder 150, receives the Manchester encoded, linear predictive encoded voice signals from the local area network 140, and applies the linear predictive encoded voice signal coefficients on line 124' to the linear predictive coefficient pattern finite state machine 1308. In accordance with the invention, the linear predictive coefficient pattern finite state machine 1308 has three outputs, the first to the first LPC encoded voice pattern finite state machine 1314, the second output to the second LPC encoded voice pattern finite state machine 1316, and the third output to the third LPC encoded voice pattern finite state machine 1318. The first voice pattern can be from a first person, the second voice pattern can be from a second person, and a third voice pattern can be from a third person. Each respective finite state machine 1314, 1316 and 1318, can output a pattern detection alarm, as was described above, indicating the successful detection of a predetermined voice pattern.

Figure 13B:
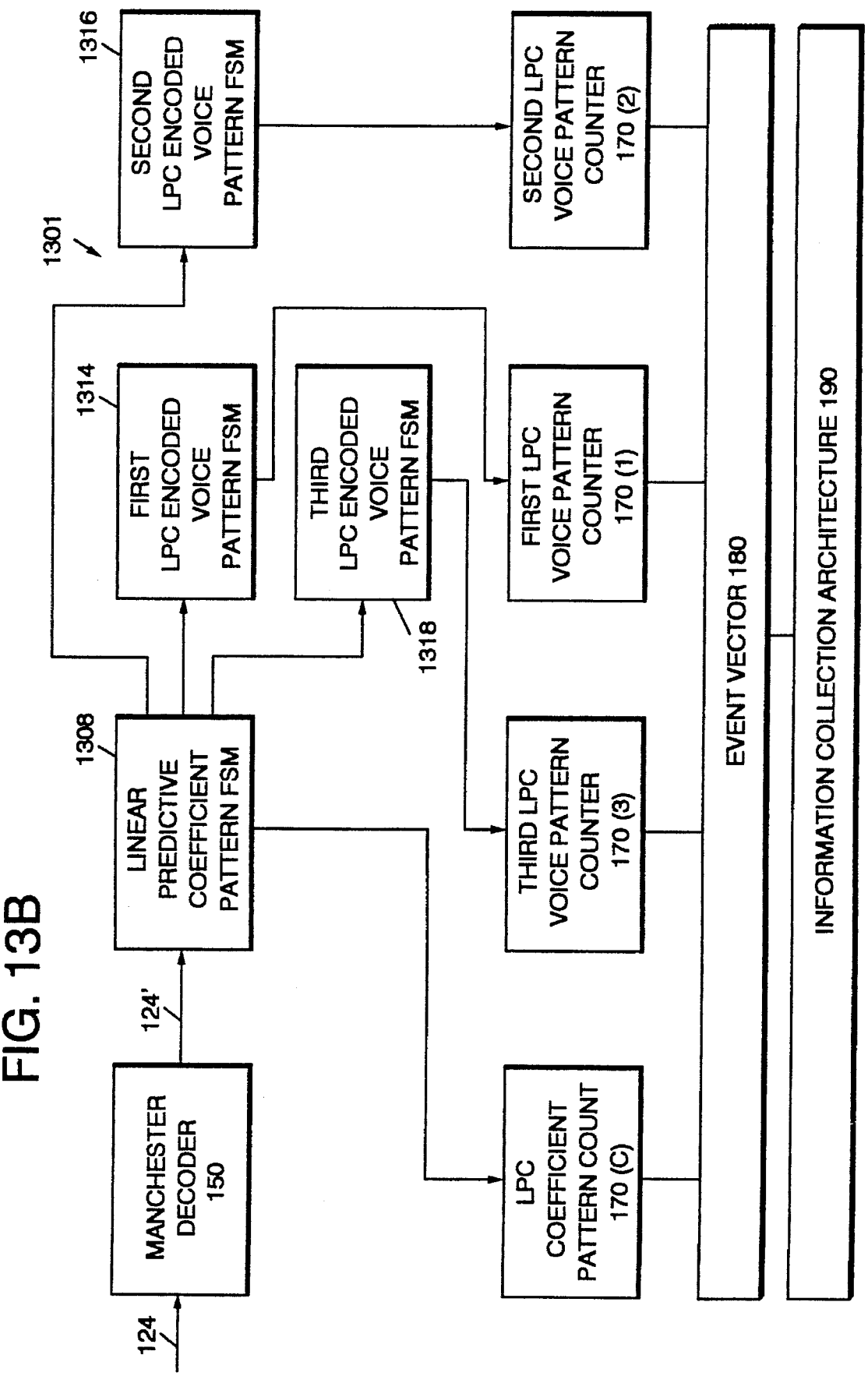
FIG. 13B is an example information collection architecture for linear predictive encoded voice signals on a local area network.

FIG. 13B illustrates an example information collection architecture 1301. It uses the finite state machine sequence of FIG. 13A. The output of the linear predictive coefficient pattern finite state machine 1308, is applied to the LPC coefficient pattern counter 170(C), which counts the number of occurrences of linear predictive coefficient patterns received from the Manchester decoder 150.

The output of the first LPC encoded voice pattern finite state machine 1314 is applied to the first LPC voice pattern counter 170(1). The output of the second LPC encoded voice pattern finite state machine 1316 is applied to the second voice pattern counter 170(2). The output of the third LPC encoded voice pattern finite state machine 1318, is applied to the third LPC voice pattern counter 170(3). In accordance with the invention, after a predetermined period of time during which events have been accumulated, each of the counters 170(C), 170(1), 170(2) and 170(3) will output the respective counts to the event vector register 180, forming a voice event vector. The voice event vector will then be output to the information collection architecture 190, for further analysis of the voice patterns received from the local area network 140. The linear predictive encoding speech parameters can be processed by the information collection architecture 190, to identify a specific person speaking the analog voice signal 1302, by virtue of that person's LPC speech parameters. In addition, by counting the frequency of occurrence of specific speech patterns using the information collection architecture 190, characteristic phonetic speech patterns can be identified.

Although a specific embodiment of the invention has been disclosed, it will be understood by those having skill in the art that changes can be made to that specific embodiment without departing from the spirit and the scope of the invention.

TABLE 1

I: Input to Component Machine
Clk: Synchronous Clock Machine
SD: Starting Delimiter Machine
NPR4: Number of Priority 4 Machine
T: Token Machine
F: Frame Machine
MAC: MAC Frame Machine
BEAC: BEACON Frame Machine
NARC: Not Address Copied Machine
NFRC: Frame Not Copied Machine
NRES: Number of Reservations Machine
EDAB: Abort Ending Delimiter Machine
EDP4: Ending Delimiter Number of Priority 4 Machine
EDT: Token Ending Delimiter Machine
EDF: Frame Ending Delimiter Machine
EDM: MAC Ending Delimiter Machine
EDNR: Number of Reservations Ending Delimiter Machine
EDB: BEACON Ending Delimiter Machine
$\omega_{SD}$: Starting Delimiter Output Function
$\omega_{NPR4}$: Number of Priority 4 Output Function
$\omega_T$: Token Output Function
$\omega_F$: Frame Output Function
$\omega_{MAC}$: MAC Frame Output Function
$\omega_{BEAC}$: BEACON Frame Output Function
$\omega_{NARC}$: Not Address Copied Output Function
$\omega_{NFRC}$: Frame Not Copied Output Function
$\omega_{NRES}$: Number of Reservations Output Function
$\omega_{EDAB}$: Abort Ending Delimiter Output Function
$\omega_{EDP4}$: Ending Delimiter Number of Priority 4 Output Function
$\omega_{EDT}$: Token Ending Delimiter Output Function
$\omega_{EDF}$: Frame Ending Delimiter Output Function
$\omega_{EDM}$: MAC Ending Delimiter Output Function
$\omega_{EDNR}$: Number of Reservations Ending Delimiter Output Function
$\omega_{EDB}$: BEACON Ending Delimiter Output Function

TABLE 2

| PS | \multicolumn{8}{c|}{NS VS (I, $\omega_{RES}$)} | OUTPUT $\omega_{SD}$ |
|---|---|---|---|---|---|---|---|---|---|
|    | (J,0) | (J,1) | (K,0) | (K,1) | (0,0) | (0,1) | (1,0) | (1,1) | |
| S0 | S0 | S1 | S0 | S0 | S0 | S0 | S0 | S0 | 0 |
| S1 | S0 | S1 | S2 | S0 | S0 | S0 | S0 | S0 | 0 |
| S2 | S0 | S1 | S0 | S0 | S3 | S0 | S0 | S0 | 0 |

TABLE 2-continued

| PS | (J,0) | (J,1) | (K,0) | (K,1) | (0,0) | (0,1) | (1,0) | (1,1) | $\omega_{SD}$ |
|---|---|---|---|---|---|---|---|---|---|
| S3 | S4 | S1 | S0 | S0 | S0 | S0 | S0 | S0 | 0 |
| S4 | S0 | S1 | S5 | S0 | S0 | S0 | S0 | S0 | 0 |
| S5 | S0 | S1 | S0 | S0 | S6 | S0 | S0 | S0 | 0 |
| S6 | S4 | S1 | S0 | S0 | S7 | S0 | S0 | S0 | 0 |
| S7 | S0 | S1 | S0 | S0 | S8 | S0 | S0 | S0 | 0 |
| S8 | S0 | S1 | S0 | S0 | S0 | S0 | S0 | S0 | 1 |

TABLE 3

| PS | \multicolumn{8}{c|}{NS VS (I, $\omega_{SD}$)} | OUTPUT $\omega_{EDAB}$ |
|---|---|---|---|---|---|---|---|---|---|
|    | (J,0) | (J,1) | (K,0) | (K,1) | (0,0) | (0,1) | (1,0) | (1,1) | |
| S0 | S0 | S1 | S0 | S0 | S0 | S0 | S0 | S0 | 0 |
| S1 | S0 | S1 | S2 | S0 | S0 | S0 | S0 | S0 | 0 |
| S2 | S0 | S1 | S0 | S0 | S0 | S0 | S3 | S0 | 0 |
| S3 | S4 | S1 | S0 | S0 | S0 | S0 | S0 | S0 | 0 |
| S4 | S0 | S1 | S5 | S0 | S0 | S0 | S0 | S0 | 0 |
| S5 | S0 | S1 | S0 | S0 | S0 | S0 | S6 | S0 | 0 |
| S6 | S0 | S1 | S0 | S0 | S7 | S0 | S7 | S0 | 0 |
| S7 | S0 | S1 | S0 | S0 | S8 | S0 | S8 | S0 | 0 |
| S8 | S0 | S1 | S0 | S0 | S0 | S0 | S0 | S0 | 1 |

TABLE 4

| PS | \multicolumn{8}{c|}{NS VS (I, $\omega_{SD}$)} | OUTPUT $\omega_T$ |
|---|---|---|---|---|---|---|---|---|---|
|    | (J,0) | (J,1) | (K,0) | (K,1) | (0,0) | (0,1) | (1,0) | (1,1) | |
| S0 | S0 | S0 | S0 | S0 | S0 | S1 | S0 | S1 | 0 |
| S1 | S0 | S0 | S0 | S0 | S2 | S1 | S2 | S1 | 0 |
| S2 | S0 | S0 | S0 | S0 | S3 | S1 | S3 | S1 | 0 |
| S3 | S0 | S0 | S0 | S0 | S4 | S1 | S4 | S1 | 0 |
| S4 | S0 | S0 | S0 | S0 | S5 | S1 | S5 | S1 | 0 |
| S5 | S0 | S0 | S0 | S0 | S6 | S1 | S6 | S1 | 0 |
| S6 | S0 | S0 | S0 | S0 | S7 | S1 | S7 | S1 | 0 |
| S7 | S0 | S0 | S0 | S0 | S8 | S1 | S8 | S1 | 0 |
| S8 | S0 | S0 | S0 | S0 | S0 | S1 | S0 | S1 | 1 |

TABLE 5

| PS STATE | \multicolumn{8}{c|}{NS VS (I, $\omega_T$)} | OUTPUT $\omega_{EDT}$ |
|---|---|---|---|---|---|---|---|---|---|
|    | (J,0) | (J,1) | (K,0) | (K,1) | (0,0) | (0,1) | (1,0) | (1,1) | |
| S0 | S0 | S1 | S0 | S0 | S0 | S0 | S0 | S0 | 0 |
| S1 | S0 | S1 | S2 | S0 | S0 | S0 | S0 | S0 | 0 |
| S2 | S0 | S1 | S0 | S0 | S0 | S0 | S3 | S0 | 0 |
| S3 | S4 | S1 | S0 | S0 | S0 | S0 | S0 | S0 | 0 |
| S4 | S0 | S1 | S5 | S0 | S0 | S0 | S0 | S0 | 0 |
| S5 | S0 | S1 | S0 | S0 | S0 | S0 | S6 | S0 | 0 |
| S6 | S0 | S1 | S0 | S0 | S7 | S0 | S7 | S0 | 0 |
| S7 | S0 | S1 | S0 | S0 | S8 | S0 | S8 | S0 | 0 |
| S8 | S0 | S1 | S0 | S0 | S0 | S0 | S0 | S0 | 1 |

What is claimed is:

1. A system for adaptive, active monitoring of a serial stream of data having a characteristic pattern including a first occurring and a second occurring pattern portions, comprising:

a first n-bit address register having a first portion with n-1 bits and an second portion with one bit and an input to said second portion coupled to said serial stream, for receiving a bit from said serial bit stream;

first addressable memory having a plurality of data storage locations, each having a first portion with n-1 bits, said first memory having an n-bit address input coupled an output of said first address register, said first memory configured with data stored in first and second ones of said data storage locations to represent a first digital filter for said first occurring pattern;

a feedback path from an output of said first memory to an input of said first register, for transferring said data from said first one of said data storage locations in said first memory to said first portion of said first address register, for concatenation with said bit from said serial bit stream to form an address for said second one of said data storage locations of said first memory;

said second one of said data storage locations of said first memory having a start signal value stored therein, which is output when said first occurring portion of said characteristic pattern is detected by said digital filter;

a second p-bit address register having a first portion with p-1 bits and a second portion with one bit and an input to said second portion coupled to said serial stream, for receiving a bit from said serial bit stream;

said second address register coupled to said first memory, for receiving said start signal value from said first memory;

second addressable memory having a plurality of data storage locations, each having a first portion with p-1 bits, said second memory having a p-bit address input coupled an output of said second address register, said second memory configured with data stored in first and second ones of said data storage locations to represent a second digital filter for said second occurring pattern;

a feedback path from an output of said second memory to an input of said second register, for transferring said data from said first one of said data storage locations in said second memory to said first portion of said second address register in response to said start signal value, for concatenation with said bit from said serial bit stream to form an address for said second one of said data storage locations of said second memory;

said second one of said data storage locations of said second memory having a pattern alarm value stored therein, which is output when said second portion of said characteristic pattern is detected by said second digital filter.

2. The system of claim 1, wherein said first address register and said first addressable memory are formed in a first integrated circuit chip; and said second address register and said second addressable memory are formed in a second integrated circuit chip, coupled to said first integrated circuit chip.

3. The system of claim 1, wherein said first address register and said first addressable memory are formed in a first multi-tasking memory partition of a data processor; and said second address register and said second addressable memory are formed in a second multi-tasking memory partition of said data processor, coupled to said first memory partition.

4. The system of claim 1, wherein said characteristic pattern is a bit pattern in a data communications medium.

5. The system of claim 4, wherein said characteristic pattern is a bit pattern in a data communications protocol.

6. A system for adaptive, active monitoring of a serial stream of data having a first characteristic pattern including a first occurring and a second occurring pattern portions, and having a second characteristic pattern including said first occurring and a next occurring pattern portions, comprising:

a first n-bit address register having a first portion with n-1 bits and an second portion with one bit and an input to said second portion coupled to said serial stream, for receiving a bit from said serial bit stream;

first addressable memory having a plurality of data storage locations, each having a first portion with n-1 bits, said first memory having an n-bit address input coupled an output of said first address register, said first memory configured with data stored in first and second ones of said data storage locations to represent a first digital filter for said first occurring pattern;

a feedback path from an output of said first memory to an input of said first register, for transferring said data from said first one of said data storage locations in said first memory to said first portion of said first address register, for concatenation with said bit from said serial bit stream to form an address for said second one of said data storage locations of said first memory;

said second one of said data storage locations of said first memory having a start signal value stored therein, which is output when said first occurring portion of said characteristic pattern is detected by said digital filter;

a second p-bit address register having a first portion with p-1 bits and a second portion with one bit and an input to said second portion coupled to said serial stream, for receiving a bit from said serial bit stream;

said second address register coupled to said first memory, for receiving said start signal value from said first memory;

second addressable memory having a plurality of data storage locations, each having a first portion with p-1 bits, said second memory having a p-bit address input coupled to an output of said second address register, said second memory configured with data stored in first and second ones of said data storage locations to represent a second digital filter for said second occurring pattern;

a feedback path from an output of said second memory to an input of said second register, for transferring said data from said first one of said data storage locations in said second memory to said first portion of said second address register in response to said start signal value, for concatenation with said bit from said serial bit stream to form an address for said second one of said data storage locations of said second memory;

said second one of said data storage locations of said second memory having a first pattern alarm value stored therein, which is output when said second portion of said characteristic pattern is detected by said second digital filter;

a third p-bit address register having a first portion with p-1 bits and a second portion with one bit and an input to said second portion coupled to said serial stream, for receiving a bit from said serial bit stream;

said third address register coupled to said first memory, for receiving said start signal value from said first memory;

third addressable memory having a plurality of data storage locations, each having a first portion with p-1 bits, said third memory having a p-bit address input coupled an output of said second address register, said third memory configured with data stored in first and second ones of said data storage locations to represent a third digital filter for said next occurring pattern;

a feedback path from an output of said third memory to an input of said third register, for transferring said data from said first one of said data storage locations in said third memory to said first portion of said third address register in response to said start signal value, for concatenation with said bit from said serial bit stream to form an address for said second one of said data storage locations of said third memory;

said second one of said data storage locations of said third memory having a second pattern alarm value stored therein, which is output when said next portion of said second characteristic pattern is detected by said third digital filter.

7. The system of claim 6, wherein said first address register and said first addressable memory are formed in a first integrated circuit chip;

said second address register and said second addressable memory are formed in a second integrated circuit chip, coupled to said first integrated circuit chip; and said third address register and said third addressable memory are formed in a third integrated circuit chip, coupled to said first integrated circuit chip.

8. The system of claim 6, wherein said first address register and said first addressable memory are formed in a first multi-tasking memory partition of a data processor;

said second address register and said second addressable memory are formed in a second multi-tasking memory partition of said data processor, coupled to said first memory partition; and said third address register and said third addressable memory are formed in a third multi-tasking memory partition of said data processor, coupled to said first memory partition.

9. The system of claim 6, wherein said characteristic pattern is a bit pattern in a data communications medium.

10. The system of claim 6, wherein said characteristic pattern is a bit pattern in a data communications protocol.

11. A method for adaptive, active monitoring of a serial stream of data having a characteristic pattern including a first occurring and a second occurring pattern portions, comprising the steps of:

receiving a bit from said serial bit stream, in a first n-bit address register having a first portion with n-1 bits and an second portion with one bit and an input to said second portion coupled to said serial stream;

accessing a first addressable memory having a plurality of data storage locations, each having a first portion with n-1 bits, said first memory having an n-bit address input coupled an output of said first address register, said first memory configured with data stored in first and second ones of said data storage locations to represent a first digital filter for said first occurring pattern;

transferring data over a feedback path from an output of said first memory to an input of said first register, for transferring said data from said first one of said data storage locations in said first memory to said first portion of said first address register, for concatenation with said bit from said serial bit stream to form an address for said second one of said data storage locations of said first memory;

outputting a start signal from said second one of said data storage locations of said first memory having a start signal value stored therein, which is output when said first occurring portion of said characteristic pattern is detected by said digital filter; receiving a bit from said serial bit stream, in a second p-bit address register having a first portion with p-1 bits and a second portion with one bit and an input to said second portion coupled to said serial stream, for receiving a bit from said serial bit stream;

said second address register coupled to said first memory, for receiving said start signal value from said first memory;

accessing a second addressable memory having a plurality of data storage locations, each having a first portion with p-1 bits, said second memory having a p-bit address input coupled an output of said second address register, said second memory configured with data stored in first and second ones of said data storage locations to represent a second digital filter for said second occurring pattern;

transferring data over a feedback path from an output of said second memory to an input of said second register, for transferring said data from said first one of said data storage locations in said second memory to said first portion of said second address register in response to said start signal value, for concatenation with said bit from said serial bit stream to form an address for said second one of said data storage locations of said second memory;

outputting an alarm value from said second one of said data storage locations of said second memory having a pattern alarm value stored therein, which is output when said second portion of said characteristic pattern is detected by said second digital filter.

12. The method of claim 11, wherein said first address register and said first addressable memory are formed in a first multi-tasking memory partition of a data processor; and said second address register and said second addressable memory are formed in a second multi-tasking memory partition of said data processor, coupled to said first, memory partition.

13. A system for adaptive, active monitoring of a serial stream of data having a characteristic pattern including a first occurring and a second occurring pattern portions, comprising:

a first n-bit address register having a first portion with n-2 bits and an second portion with two bits and an input to said second portion coupled to said serial stream, for receiving bit pairs from said serial data stream;

first addressable memory having a plurality of data storage locations, each having a first portion with n-2 bits, said first memory having an n-bit address input coupled an output of said first address register, said first memory configured with data stored in first and second ones of said data storage locations to represent a first digital filter for said first occurring pattern;

a feedback path from an output of said first memory to an input of said first register, for transferring said data from said first one of said data storage locations in said first memory to said first portion of said first address register, for concatenation with said bit pairs from said serial data stream to form an address for said second one of said data storage locations of said first memory;

said second one of said data storage locations of said first memory having a start signal value stored therein, which is output when said first occurring portion of said characteristic pattern is detected by said digital filter;

a second p-bit address register having a first portion with p-2 bits and a second portion with two bits and an input to said second portion coupled to said serial stream, for receiving bit pairs from said serial data stream;

said second address register coupled to said first memory, for receiving said start signal value from said first memory;

second addressable memory having a plurality of data storage locations, each having a first potion with p-2 bits, said second memory having a p-bit address input coupled an output of said second address register, said second memory configured with data stored in first and second ones of said data storage locations to represent a second digital filter for said second occurring pattern;

a feedback path from an output of said second memory to an input of said second register, for transferring said data from said first one of said data storage locations in said second memory to said first portion of said second address register in response to said start signal value, for concatenation with said bit from said serial data stream to form an address for said second one of said data storage locations of said second memory;

said second one of said data storage locations of said second memory having a pattern alarm value stored therein, which is output when said second portion of said characteristic pattern is detected by said second digital filter.

14. The system of claim 13, wherein said first address register and said first addressable memory are formed in a first integrated circuit chip; and said second address register and said second addressable memory are formed in a second integrated circuit chip, coupled to said first integrated circuit chip.

15. The system of claim 13, wherein said first address register and said first addressable memory are formed in a first multi-tasking memory partition of a data processor; and said second address register and said second addressable memory are formed in a second multi-tasking memory partition of said data processor, coupled to said first memory partition.

16. The system of claim 13, wherein said characteristic pattern is a bit pair pattern from a manchester encoded data communications medium.

17. The system of claim 13, which further comprises:

a counter coupled to said pattern alarm value output, for counting occurrences of said second portion of said characteristic pattern in said data stream, and outputting a count value as an event counter; and information collection architecture means, coupled to said counter, for receiving said event vector and in response thereto, performing monitoring and control operations on a data communications medium providing said data stream.

18. A system for adaptive, active monitoring of a serial stream of data having a first characteristic pattern including a first occurring and a second occurring pattern portions, and having a second characteristic pattern including said first occurring and a next occurring pattern portions, comprising:

a first n-bit address register having a first portion with n-2 bits and an second portion with two bits and an input to said second portion coupled to said serial stream, for receiving bit pairs from said serial data stream;

first addressable memory having a plurality of data storage locations, each having a first portion with n-2 bits, said first memory having an n-bit address input coupled an output of said first address register, said first memory configured with data stored in first and second ones of said data storage locations to represent a first digital filter for said first occurring pattern;

a feedback path from an output of said first memory to an input of said first register, for transferring said data from said first one of said data storage locations in said first memory to said first portion of said first address register, for concatenation with said bit pairs from said serial data stream to form an address for said second one of said data storage locations of said first memory;

said second one of said data storage locations of said first memory having a start signal value stored therein, which is output when said first occurring portion of said characteristic pattern is detected by said digital filter;

a second p-bit address register having a first portion with p-2 bits and a second portion with two bits and an input to said second portion coupled to said serial stream, for receiving bit pairs from said serial data stream;

said second address register coupled to said first memory, for receiving said start signal value from said first memory;

second addressable memory having a plurality of data storage locations, each having a first portion with p-2 bits, said second memory having a p-bit address input coupled an output of said second address register, said second memory configured with data stored in first and second ones of said data storage locations to represent a second digital filter for said second occurring pattern;

a feedback path from an output of said second memory to an input of said second register, for transferring said data from said first one of said data storage locations in said second memory to said first portion of said second address register in response to said start signal value, for concatenation with said bit from said serial data stream to form an address for said second one of said data storage locations of said second memory;

said second one of said data storage locations of said second memory having a first pattern alarm value stored therein, which is output when said second portion of said characteristic pattern is detected by said second digital filter;

a third p-bit address register having a first portion with p-2 bits and a second portion with two bits and an input to said second portion coupled to said serial stream, for receiving bit pairs from said serial data stream;

said third address register coupled to said first memory, for receiving said start signal value from said first memory;

third addressable memory having a plurality of data storage locations, each having a first portion with p-2 bits, said third memory having a p-bit address input coupled an output of said second address register, said third memory configured with data stored in first and second ones of said data storage locations to represent a third digital filter for said next occurring pattern;

a feedback path from an output of said third memory to an input of said third register, for transferring said data from said first one of said data storage locations in said third memory to said first portion of said third address register in response to said start signal value, for concatenation with said bit from said serial data stream to form an address for said second one of said data storage locations of said third memory;

said second one of said data storage locations of said third memory having a second pattern alarm value stored therein, which is output when said next portion of said second characteristic pattern is detected by said third digital filter.

19. The system of claim 18, wherein said first address register and said first addressable memory are formed in a first integrated circuit chip;

said second address register and said second addressable memory are formed in a second integrated circuit chip, coupled to said first integrated circuit chip; and said third address register and said third addressable memory are formed in a third integrated circuit chip, coupled to said first integrated circuit chip.

20. The system of claim 18, wherein said first address register and said first addressable memory are formed in a first multi-tasking memory partition of a data processor;

said second address register and said second addressable memory are formed in a second multi-tasking memory partition of said data processor, coupled to said first memory partition; and said third address register and said third addressable memory are formed in a third multi-tasking memory partition of said data processor, coupled to said first memory partition.

21. The system of claim 18, wherein said characteristic pattern is a bit pair pattern from a manchester encoded data communications medium.

22. The system of claim 18, which further comprises:

a first counter coupled to said first pattern alarm value output, for counting occurrences of said second portion of said characteristic pattern in said data stream, and outputting a first count value;

a second counter coupled to said second pattern alarm value output, for counting occurrences of said third portion of said characteristic pattern in said data stream, and outputting a second count value;

an event vector register coupled to said first and second counters, for combining said first and second count values as an event vector; and information collection architecture means, coupled to said event vector register, for receiving said event vector and in response thereto, performing monitoring and control operations on a data communications medium providing said data stream.

23. A method for adaptive, active monitoring of a serial stream of data having a characteristic pattern including a first occurring and a second occurring pattern portions, comprising the steps of:

receiving bit pairs from said serial data stream, in a first n-bit address register having a first portion with n-2 bits and an second portion with two bits and an input to said second portion coupled to said serial stream;

accessing a first addressable memory having a plurality of data storage locations, each having a first portion with n-2 bits, said first memory having an n-bit address input coupled an output of said first address register, said first memory configured with data stored in first and second ones of said data storage locations to represent a first digital filter for said first occurring pattern; transferring data over a feedback path from an output of said first memory to an input of said first register, for transferring said data from said first one of said data storage locations in said first memory to said first portion of said first address register, for concatenation with said bit pairs from said serial bit stream to form an address for said second one of said data storage locations of said first memory;

outputting a start signal from said second one of said data storage locations of said first memory having a start signal value stored therein, which is output when said first occurring portion of said characteristic pattern is detected by said digital filter;

receiving bit pairs from said serial data stream, in a second p-bit address register having a first portion with p-2 bits and a second portion with two bits and an input to said second portion coupled to said serial stream, for receiving bit pairs from said serial data stream;

said second address register coupled to said first memory, for receiving said start signal value from said first memory;

accessing a second addressable memory having a plurality of data storage locations, each having a first portion with p-2 bits, said second memory having a p-bit address input coupled an output of said second address register, said second memory configured with data stored in first and second ones of said data storage locations to represent a second digital filter for said second occurring pattern;

transferring data over a feedback path from an output of said second memory to an input of said second register, for transferring said data from said first one of said data storage locations in said second memory to said first portion of said second address register in response to said start signal value, for concatenation with said bit pairs from said serial data stream to form an address for said second one of said data storage locations of said second memory;

outputting an alarm value from said second one of said data storage locations of said second memory having a pattern alarm value stored therein, which is output when said second portion of said characteristic pattern is detected by said second digital filter.

24. The method of claim 23, wherein said first address register and said first addressable memory are formed in a first multi-tasking memory partition of a data processor; and said second address register and said second addressable memory are formed in a second multi-tasking memory partition of said data processor, coupled to said first memory partition.

\* \* \* \* \*